(12) United States Patent
Rhe et al.

(10) Patent No.: US 10,996,806 B2
(45) Date of Patent: *May 4, 2021

(54) TOUCH DISPLAY DEVICE

(71) Applicant: LG Display Co., Ltd., Seoul (KR)

(72) Inventors: Ruda Rhe, Seoul (KR); JiHyun Jung, Gyeonggi-do (KR); DeukSu Lee, Gyeonggi-do (KR); SuChang An, Seoul (KR); JaeGyun Lee, Gyeonggi-do (KR); Hyangmyoung Gwon, Gyeonggi-do (KR); Yangsik Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,604

(22) Filed: Apr. 26, 2019

(65) Prior Publication Data

US 2019/0339818 A1 Nov. 7, 2019

(30) Foreign Application Priority Data

May 2, 2018 (KR) .................. 10-2018-0050709

(51) Int. Cl.
*G06F 3/047* (2006.01)
*G06F 3/044* (2006.01)

(52) U.S. Cl.
CPC ............ *G06F 3/0446* (2019.05); *G06F 3/047* (2013.01); *G06F 2203/04112* (2013.01)

(58) Field of Classification Search
CPC ........ G06F 3/044; G06F 3/047; G06F 3/0443; G06F 3/0446; G06F 2203/04112
See application file for complete search history.

(56) References Cited

U.S. PATENT DOCUMENTS

2018/0373104 A1* 12/2018 Qin ...................... G06F 3/0416
2019/0265820 A1*  8/2019 Li ........................... G06F 3/047

* cited by examiner

*Primary Examiner* — Robert J Michaud
(74) *Attorney, Agent, or Firm* — Morgan, Lewis & Bockius LLP

(57) ABSTRACT

A touch display device includes: a display panel comprising: a plurality of subpixels; and a plurality of touch electrodes; and a touch sensing circuit configured to: supply a touch driving signal to the display panel; and detect a touch sensing signal to sense a touch, wherein the plurality of touch electrodes comprises: a plurality of X-touch electrode (XTE) lines, each comprising a plurality of XTEs, the plurality of XTE connecting lines being configured to connect adjacent XTEs to each other, among the plurality of XTEs, and a plurality of Y-touch electrode (YTE) lines intersecting the plurality of XTE lines, each YTE line comprising a plurality of YTEs, the plurality of YTE connecting lines being configured to connect adjacent YTEs to each other, and wherein at least two YTE connecting lines, among the plurality of YTE connecting lines, are between two neighboring subpixels of the plurality of subpixels.

17 Claims, 31 Drawing Sheets

FIG.12

| Layer | Multi Layer |
|---|---|
| T-BUF | T-BUF, E2, ENCAP |
| Mask #1 (TSM1) | TSM1, T-BUF, E2, ENCAP |
| Mask #2 (ILD) | ILD, TSM1, T-BUF, E2, ENCAP |
| Mask #3 (TSM2) | TSM2, ILD, TSM1, T-BUF, E2, ENCAP |
| Mask #4 (Passivation) | TSM2, ILD, TSM1, T-BUF, E2, ENCAP, PAC, Touch Pad Area |

FIG.13
| Layer | Single Layer |
|---|---|
| T-BUF | 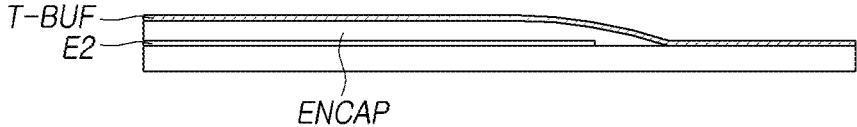 |
| Mask #1 (TSM) | 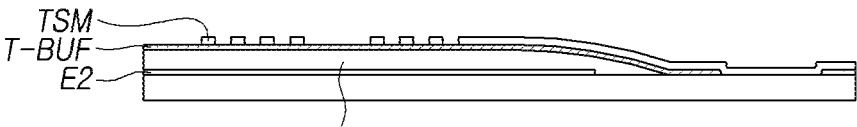 |
| Mask #2 | |
| Mask #3 | |
| Mask #4 (Passivation) | 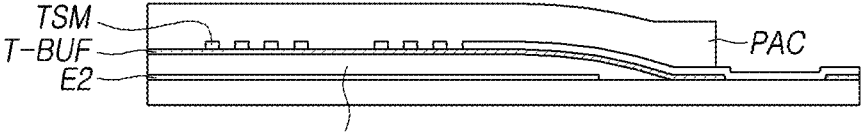 |

FIG.19

TOUCH DISPLAY DEVICE

CROSS-REFERENCE TO RELATED APPLICATION(S)

This application claims the benefit of and priority to Korean Patent Application No. 10-2018-0050709, filed on May 2, 2018, the entirety of which is hereby incorporated by reference.

BACKGROUND

1. Technical Field

The present disclosure relates to a touch display device.

2. Discussion of the Related Art

A touch display device may provide a touch-based input function that allows a user to easily input information or commands intuitively and conveniently, as well as a function of displaying videos or images. To provide a touch-based input function, the touch display device is required to recognize whether or not a user's touch is performed, and is required to sense touch coordinates accurately. To this end, the touch display device includes a touch panel having a touch sensor structure.

The touch panel has a touch sensor structure including a plurality of touch electrodes and a plurality of touch routing lines for connecting the touch electrodes to a touch sensing circuit. Because the touch panel has a touch sensor structure for example complicated or requires a plurality of layers, the manufacturing process of the touch panel may be complicated, the manufacturing yield of the touch panel may be low, or the manufacturing cost may increase.

The touch panel has a plurality of touch pads electrically connected to the touch sensing circuit. The number of touch channels or the number of touch electrodes may be increased due to an increase in the size of the touch panel or the like, thereby increasing the number of touch pads. The increase in the number of touch pads makes it difficult to design the pad area.

SUMMARY

Accordingly, the present disclosure is directed to touch display device that substantially obviates one or more of the issues due to limitations and disadvantages of the related art.

An aspect of embodiments of the present disclosure is to provide a touch display device including a touch sensor structure that enables a simple manufacturing process, a high manufacturing yield, and a low manufacturing cost.

Another aspect of embodiments of the present disclosure is to provide a touch display device having a single-layered touch sensor structure.

Another aspect of embodiments of the present disclosure is to provide a touch display device having a touch sensor structure capable of reducing the number of mask processes.

Another aspect of embodiments of the present disclosure is to provide a touch display device having a touch sensor structure capable of reducing the number of touch pads.

Another aspect of embodiments of the present disclosure is to provide a touch display device capable of preventing deterioration of touch sensitivity.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a touch display device, including: a display panel including: a plurality of subpixels, and a plurality of touch electrodes, and a touch sensing circuit configured to: supply a touch driving signal to the display panel, and detect a touch sensing signal to sense a touch, wherein the plurality of touch electrodes includes: a plurality of X-touch electrode lines, each including a plurality of X-touch electrodes, the plurality of X-touch electrode connecting lines being configured to connect adjacent X-touch electrodes to each other, among the plurality of X-touch electrodes, and a plurality of Y-touch electrode lines intersecting the plurality of X-touch electrode lines, each Y-touch electrode line including a plurality of Y-touch electrodes, the plurality of Y-touch electrode connecting lines being configured to connect adjacent Y-touch electrodes to each other, and wherein at least two Y-touch electrode connecting lines, among the plurality of Y-touch electrode connecting lines, are between two neighboring subpixels of the plurality of subpixels.

In another aspect, there is provided a touch display device, including: a display panel including: a plurality of subpixels, and a plurality of touch electrodes, and a touch sensing circuit configured to: supply a touch driving signal to the display panel, and detect a touch sensing signal to sense a touch, wherein the plurality of touch electrodes includes: a plurality of X-touch electrode lines, each including a plurality of X-touch electrodes, the plurality of X-touch electrode lines including a plurality of X-touch electrode connecting lines configured to connect adjacent X-touch electrodes to each other, among the plurality of X-touch electrodes, and a plurality of Y-touch electrode lines intersecting the plurality of X-touch electrode lines, each including a plurality of Y-touch electrodes, the plurality of Y-touch electrode lines including a plurality of Y-touch electrode connecting lines configured to connect adjacent Y-touch electrodes to each other, and wherein a width of one X-touch electrode connecting line, among the plurality of X-touch electrode connecting lines in one of the plurality of X-touch electrode lines, is greater than a width of another X-touch electrode connecting line.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure.

FIG. 12 illustrates a process of implementing a multi-layered touch sensor structure on a display panel according to an embodiment of the present disclosure.

FIG. 13 illustrates a process of implementing a single-layered touch sensor structure on a display panel according to an embodiment of the present disclosure.

FIGS. 18 and 19 illustrate a third example of a single-layered touch sensor structure in a display panel according to an embodiment of the present disclosure.

Figure 1:
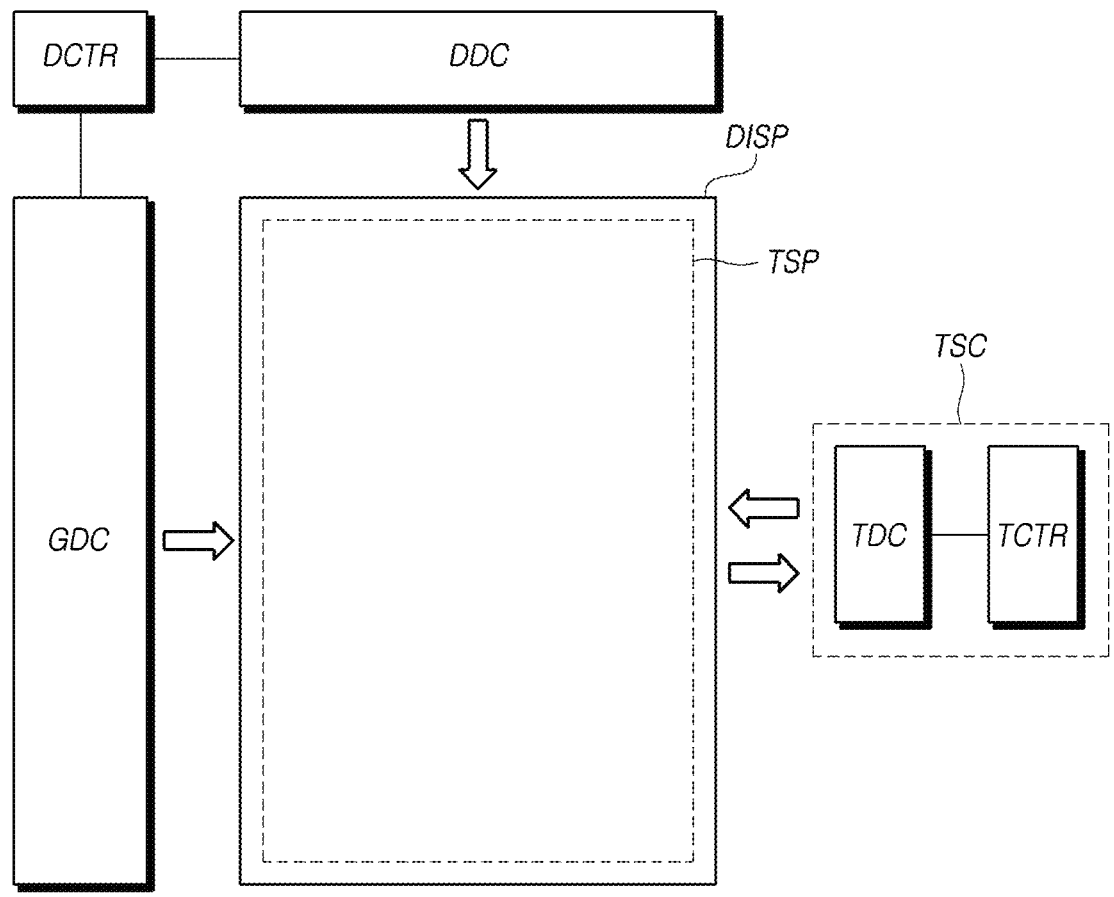
FIG. 1 illustrates a system configuration of a touch display device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, example embodiments of the present disclosure will be described in detail with reference to the accompanying drawings.

FIG. 1 illustrates a system configuration of a touch display device according to an embodiment of the present disclosure.

With reference to the example of FIG. 1, a touch display device according to an embodiment of the present disclosure may provide both a function for displaying an image and a function for touch sensing.

To provide an image display function, a touch display device according to an embodiment of the present disclosure may include a display panel (DISP) on which a plurality of data lines and a plurality of gate lines are arranged and on which a plurality of subpixels defined by the plurality of data lines and the plurality of gate lines is arranged, a data driving circuit (DDC) for driving the plurality of data lines, a gate driving circuit (GDC) for driving the plurality of gate lines, and a display controller (DCTR) for controlling operations of the data driving circuit (DDC) and the gate driving circuit (GDC). Each of the data driving circuit (DDC), the gate driving circuit (GDC), and the display controller (DCTR) may be implemented as one or more discrete components. In some cases, two or more of the data driving circuit (DDC), the gate driving circuit (GDC), and the display controller (DCTR) may be integrated into one component. For example, the data driving circuit (DDC) and the display controller (DCTR) may be implemented as a single integrated circuit chip (IC Chip).

To provide a touch sensing function, the touch display device according to an embodiment of the present disclosure may include a touch panel (TSP) including a plurality of touch electrodes and a touch sensing circuit (TSC) for supplying a touch driving signal to the touch panel (TSP), detecting a touch sensing signal from the touch panel (TSP), and sensing whether or not a user's touch is performed or a touch position (touch coordinates) on the touch panel (TSP) based on the detected touch sensing signal. The touch sensing circuit (TSC), for example, may include a touch driving circuit (TDC) for supplying a touch driving signal to the touch panel (TSP) and detecting a touch sensing signal from the touch panel (TSP), and a touch controller (TCTR) for sensing whether or not a user's touch is performed and/or a touch position on the touch panel (TSP) based on the touch sensing signal detected by the touch driving circuit (TDC).

The touch driving circuit (TDC) may include a first circuit part for supplying a touch driving signal to the touch panel (TSP) and a second circuit part for detecting a touch sensing signal from the touch panel (TSP). However, embodiments are not limited thereto. The touch driving circuit (TDC) and the touch controller (TCTR) may be implemented as separate components, or in some cases, may be integrated into one component.

Each of the data driving circuit (DDC), the gate driving circuit (GDC), and the touch driving circuit (TDC) may be implemented as one or more integrated circuits and, in terms of electrical connection with the display panel (DISP), may be implemented as a chip-on-glass (COG) type, a chip-on-film (COF) type, a tape carrier package (TCP) type, and the like. The gate driving circuit (GDC) may also be implemented as a gate-in-panel (GIP) type.

The respective circuit configurations (DDC, GDC, and DCTR) for driving the display and the respective circuit configurations (TDC and TCTR) for touch sensing may be implemented as one or more discrete components. In some cases, one or more of the circuit configurations (DDC, GDC, and DCTR) for driving the display and the circuit configurations (TDC and TCTR) for touch sensing may be functionally integrated into one or more components. For example, the data driving circuit (DDC) and the touch driving circuit (TDC) may be integrated into one or more integrated circuit chips. When the data driving circuit (DDC) and the touch driving circuit (TDC) are integrated into two or more integrated circuit chips, the two or more integrated circuit chips may have a data driving function and a touch driving function, respectively.

The touch display device according to an embodiment of the present disclosure may be various types of display devices such as an organic light-emitting display device, a liquid crystal display device, or the like. Hereinafter, for convenience of explanation, a description will be made of an example in which the touch display device is an organic light-emitting display device. For example, although the display panel (DISP) may be various types of display panels, such as an organic light-emitting display panel, a liquid crystal display panel, or the like, the following description will be made of an example in which the display panel (DISP) is an organic light-emitting display panel for convenience of explanation.

The touch panel (TSP) may include a plurality of touch electrodes, to which a touch driving signal is applied or from which a touch sensing signal is detected, and a plurality of touch routing lines for connecting the plurality of touch electrodes to the touch driving circuit (TDC). The touch panel (TSP) may be provided outside the display panel (DISP). For example, the touch panel (TSP) and the display panel (DISP) may be separately manufactured and combined with each other. This touch panel (TSP) is referred to as an "external type" or "add-on type" touch panel.

Alternatively, the touch panel (TSP) may be embedded in the display panel (DISP). For example, a touch sensor structure, such as a plurality of touch electrodes, a plurality of touch routing lines, and the like, constituting the touch panel (TSP) may be formed together with electrodes and signal lines for driving the display in manufacturing the display panel (DISP). Such a touch panel (TSP) is called an "embedded-type" touch panel. Hereinafter, for convenience of explanation, the embedded-type touch panel (TSP) will be described as an example.

Figure 2:
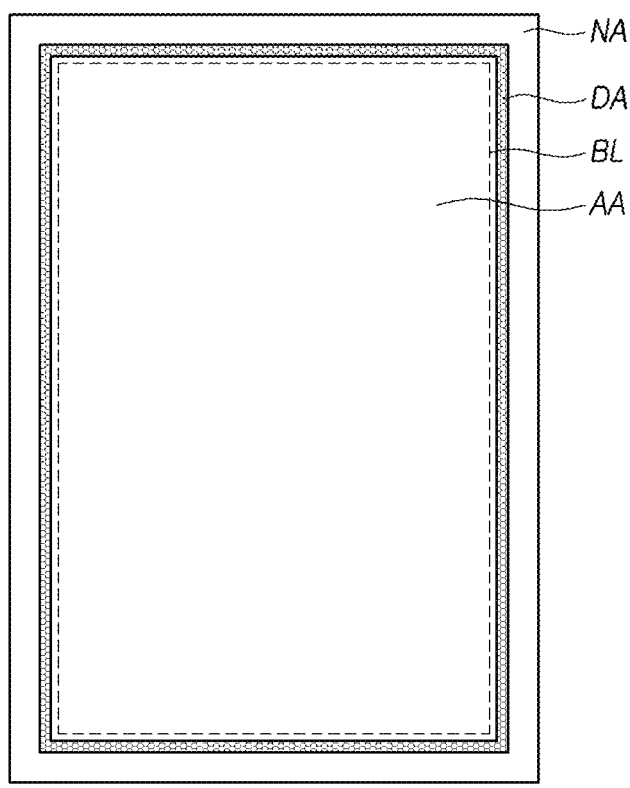
FIG. 2 illustrates a display panel of a touch display device according to an embodiment of the present disclosure.

FIG. 2 illustrates a display panel of a touch display device according to an embodiment of the present disclosure.

With reference to the example of FIG. 2, a display panel (DISP) may include an active area (AA) in which an image may be displayed, and a non-active area (NA) that may be an outer area of an outer boundary line (BL) of the active area (AA). In the active area (AA) of the display panel (DISP), a plurality of subpixels for displaying images may be provided, and various electrodes and signal lines for driving the display may be provided.

In addition, a plurality of touch electrodes for touch sensing and a plurality of touch routing lines electrically connected to the touch electrodes may be provided in the active area (AA) of the display panel (DISP). Accordingly, the active area (AA) may be referred to as a "touch sensing area" in which a touch is able to be sensed.

In the non-active area (NA) of the display panel (DISP), link lines, which are extensions of various signal lines arranged in the active area (AA), or link lines electrically connected to various signal lines arranged in the active area (AA) and pads electrically connected to the link lines, may be provided. The pads in the non-active area (NA) may be bonded or electrically connected to the display driving circuits (DDC, GDC, or the like).

In addition, in the non-active area (NA) of the display panel (DISP), link lines, which are extensions of a plurality of touch routing lines arranged in the active area (AA), or link lines electrically connected to a plurality of touch routing lines arranged in the active area (AA) and pads electrically connected to the link lines may be provided. The pads in the non-active area (NA) may be bonded or electrically connected to the touch driving circuit (TDC).

An extended portion of a part of the outermost touch electrode, among the plurality of touch electrodes arranged in the active area (AA), may be in the non-active area (NA). One or more touch electrodes of the same material as the plurality of touch electrodes in the active area (AA) may be further provided in the non-active area (NA). For example, the plurality of touch electrodes in the display panel (DISP) may be provided in the active area (AA), some (e.g., the outermost touch electrode) of the plurality of touch electrodes in the display panel (DISP) may be provided in the non-active area (NA), or some (e.g., the outermost touch electrode) of the plurality of touch electrodes in the display panel (DISP) may be provided over the active area (AA) and the non-active area (NA).

With further reference to the example of FIG. 2, a display panel (DISP) of a touch display device according to an embodiment of the present disclosure may include a dam area (DA) where dams for avoiding or preventing collapse of a particular layer (e.g., an encapsulation layer in an organic light-emitting display panel) in the active area (AA) may be provided. The dam area (DA) may be positioned at the boundary between the active area (AA) and the non-active area (NA), or may be anywhere in the non-active area (NA) outside the active area (AA).

The dam may be disposed in the dam area (DA) to surround the active area (AA) in all directions, or may be only in the outside of one or more portions (e.g., a portion having a vulnerable layer) of the active area (AA). The dam in the dam area (DA) may include a single pattern for example continuous as a whole, or may have two or more discontinuous patterns. Further, in one case, only a primary dam may be in the dam area (DA). Alternatively, two dams (a primary dam and a secondary dam), or three or more dams, may be arranged in the dam area (DA). Only a primary dam may be arranged in one direction, and both a primary dam and a secondary dam may be arranged in another direction in the dam area (DA).

Figure 3:
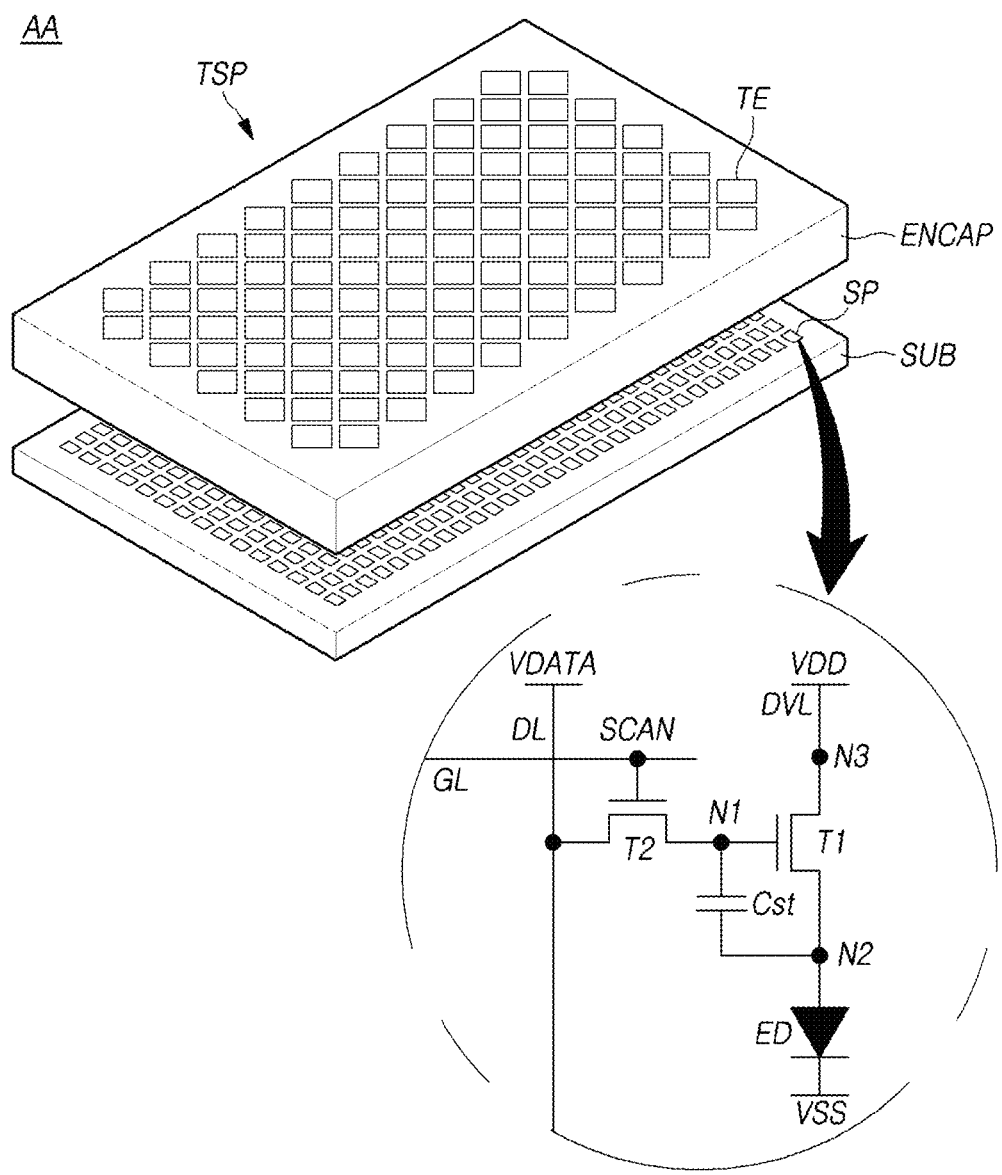
FIG. 3 illustrates an example of a structure in which a touch panel is embedded in a display panel according to an embodiment of the present disclosure.

FIG. 3 illustrates an example of a structure in which a touch panel is embedded in a display panel according to an embodiment of the present disclosure.

With reference to the example of FIG. 3, a plurality of subpixels (SP) may be on a substrate (SUB) in the active area (AA) of the display panel (DISP). Each subpixel (SP) may include a light-emitting device (ED), a first transistor (T1) for driving the light-emitting device (ED), a second transistor (T2) for transmitting a data voltage (VDATA) to a first node (N1) of the first transistor (T1), and a storage capacitor (Cst) for maintaining a constant voltage for one frame.

The first transistor (T1) may include a first node (N1) to which a data voltage may be applied, a second node (N2) electrically connected to the light-emitting device (ED), and a third node (N3) to which a driving voltage (VDD) is applied from the driving voltage line (DVL). The first node (N1) may be a gate node, the second node (N2) may be a source node or a drain node, and the third node (N3) may be a drain node or a source node. The first transistor (T1) may also be referred to as a "driving transistor" for driving the light-emitting device (ED).

The light-emitting device (ED) may include a first electrode (e.g., an anode electrode), a light-emitting layer, and a second electrode (e.g., a cathode electrode). The first electrode may be electrically connected to the second node (N2) of the first transistor (T1). The second electrode may be applied with a base voltage (VSS).

The light-emitting layer of the light-emitting device (ED) may be an organic light-emitting layer containing an organic material. In this case, the light-emitting device (ED) may be an organic light-emitting diode (OLED).

The second transistor (T2) may be controlled to be turned on and off by a scan signal (SCAN) applied through a gate line (GL), and may be electrically connected between the first node (N1) of the first transistor (T1) and the data line (DL). The second transistor (T2) may also be referred to as a "switching transistor." If the second transistor (T2) is turned on by the scan signal (SCAN), the second transistor (T2) may transfer a data voltage (VDATA) supplied from the data line (DL) to the first node (N1) of the first transistor (T1).

The storage capacitor (Cst) may be electrically connected between the first node (N1) and the second node (N2) of the first transistor (T1). Each subpixel (SP), as shown in the example of FIG. 3, may have a 2T1C structure including two transistors (T1 and T2) and one capacitor (Cst), and may further include one or more transistors, or may further include one or more capacitors in some cases. The storage capacitor (Cst) may be an external capacitor for example intentionally designed to be provided outside the first transistor (T1), instead of a parasitic capacitor (e.g., Cgs or Cgd) for example an internal capacitor to be provided between the first node (N1) and the second node (N2) of the first transistor (T1). Each of the first transistor (T1) and the second transistor (T2) may be an n-type transistor or a p-type transistor.

As described above, circuit devices, such as a light-emitting device (ED), two or more transistors (T1 and T2), and one or more capacitors (Cst), may be in the display panel (DISP). Because the circuit devices (in particular, the light-emitting device ED) are vulnerable to external moisture or oxygen, an encapsulation layer (ENCAP) for reducing or preventing external moisture or oxygen from penetrating into the circuit devices (e.g., the light-emitting device ED) may be provided in the display panel (DISP).

The encapsulation layer (ENCAP) may be formed as a single layer or as multiple layers. For example, when the encapsulation layer (ENCAP) includes multiple layers, the encapsulation layer (ENCAP) may include one or more inorganic encapsulation layers and one or more organic encapsulation layers. For example, the encapsulation layer (ENCAP) may be configured to include a first inorganic encapsulation layer, an organic encapsulation layer, and a second inorganic encapsulation layer. Here, the organic encapsulation layer may be positioned between the first inorganic encapsulation layer and the second inorganic encapsulation layer. However, the configuration of the encapsulation layer is not limited thereto.

The first inorganic encapsulation layer may be formed on the second electrode (e.g., a cathode electrode) to be closest to the light-emitting device (ED). The first inorganic encapsulation layer may include an inorganic insulating material that enables low-temperature deposition, such as silicon nitride ($SiN_x$), silicon oxide ($SiO_x$), silicon oxynitride (SiON), aluminum oxide ($Al_2O_3$), or the like. Accordingly, when the first inorganic encapsulation layer is deposited in a low-temperature atmosphere, the first inorganic encapsulation layer may be able to reduce or prevent the light-emitting layer (organic light-emitting layer), which is vulnerable to a high-temperature atmosphere, from being damaged during the deposition process.

The organic encapsulation layer may have a smaller area than the first inorganic encapsulation layer, and may be formed such that both ends of the first inorganic encapsulation layer are exposed. The organic encapsulation layer may serve as a buffer for relieving the stress between the respective layers due to warping of the touch display device, and may enhance the planarization performance. The organic encapsulation layer may include an organic insulating material, such as an acrylic resin, an epoxy resin, polyimide, polyethylene, silicon oxycarbide (SiOC), or the like.

The second inorganic encapsulation layer may be provided on the organic encapsulation layer to cover the upper surface and the side surface of each of the organic encapsulation layer and the first inorganic encapsulation layer. As a result, the second inorganic encapsulation layer may be able to reduce, minimize, or prevent external moisture or oxygen from penetrating into the first inorganic encapsulation layer and the organic encapsulation layer. The second inorganic encapsulation layer may include an inorganic insulating material such as silicon nitride ($SiN_x$), silicon oxide ($SiO_x$), silicon oxynitride (SiON), aluminum oxide ($Al_2O_3$), or the like.

The touch panel (TSP) may be on the encapsulation layer (ENCAP) in the touch display device according to an embodiment of the present disclosure. For example, a touch sensor structure, such as a plurality of touch electrodes (TE) constituting the touch panel (TSP), may be on the encapsulation layer (ENCAP) in the touch display device.

When sensing a touch, a touch driving signal or a touch sensing signal may be applied to the touch electrodes (TE). Therefore, when sensing a touch, a potential difference occurs between the touch electrode (TE) and the cathode electrode arranged with the encapsulation layer (ENCAP) interposed therebetween, which may generate unnecessary parasitic capacitance. To reduce the parasitic capacitance, which may degrade touch sensitivity, the distance between the touch electrode (TE) and the cathode electrode may be designed to be equal to or greater than a predetermined value (e.g., 5 µm) in consideration of the panel thickness, panel-manufacturing processes, the display performance, and the like. To this end, the thickness of the encapsulation layer (ENCAP), for example, may be designed to be at least 5 µm or more.

Figure 4:
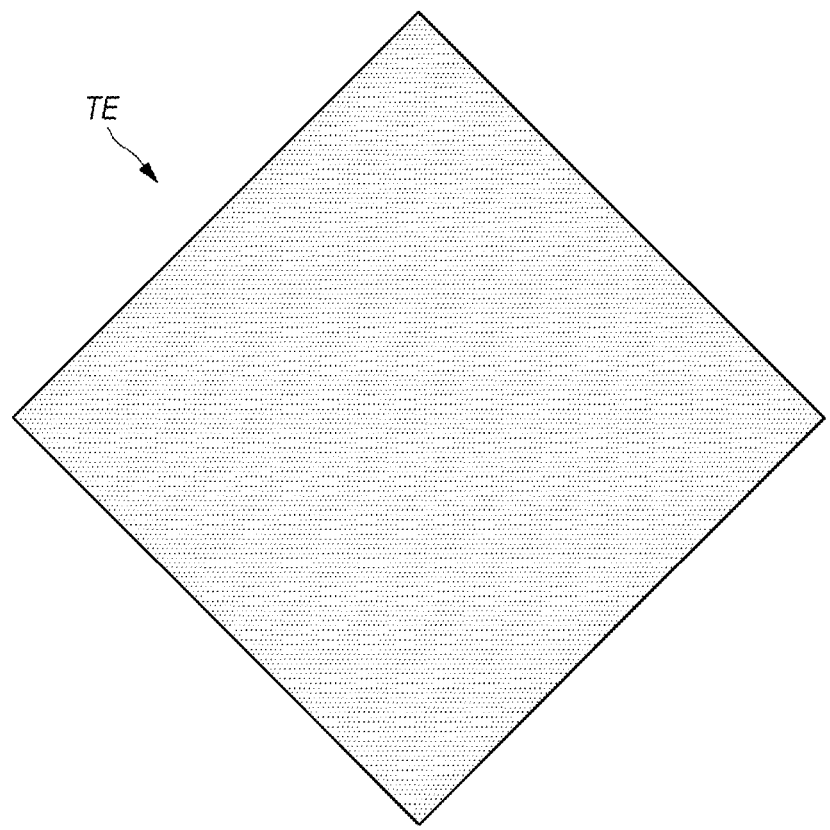
FIGS. 4 and 5 illustrate examples of types of touch electrodes arranged in a display panel according to an embodiment of the present disclosure.
Figure 5:
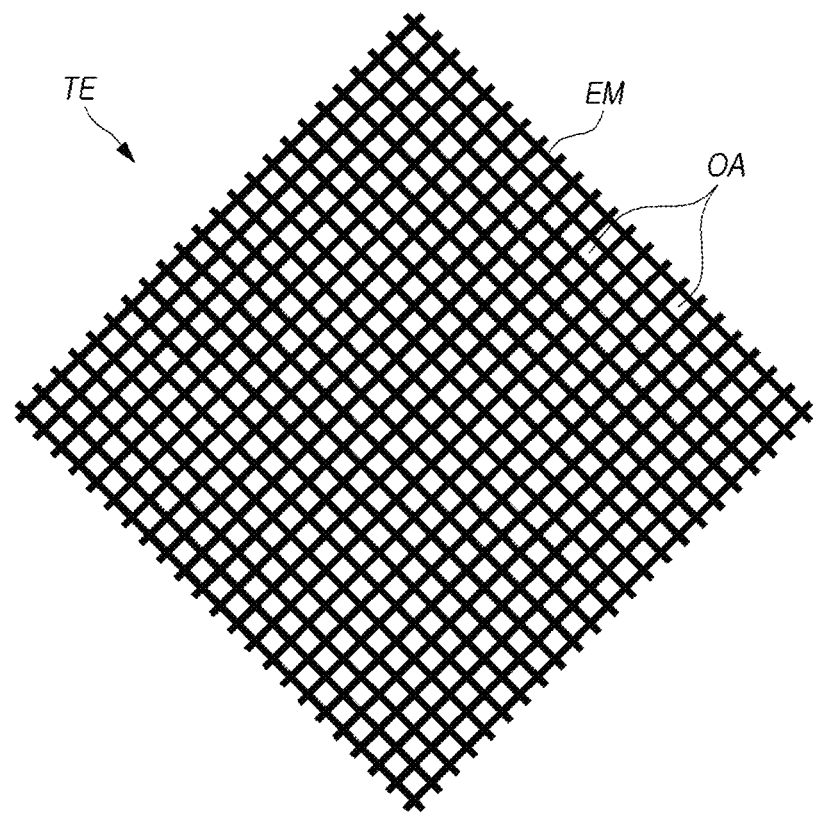

FIGS. 4 and 5 illustrate examples of types of touch electrodes arranged in a display panel according to an embodiment of the present disclosure.

As shown in the example of FIG. 4, each touch electrode (TE) in the display panel (DISP) may be a plate-type electrode metal having no openings. In this case, each touch electrode (TE) may be a transparent electrode. For example, each touch electrode (TE) may include a transparent electrode material so that light emitted from a plurality of subpixels (SP) below each touch electrode (TE) may pass upwards through the touch electrode (TE).

Alternatively, as shown in the example of FIG. 5, each touch electrode (TE) in the display panel (DISP) may be an electrode metal (EM) patterned in the form of a mesh to have two or more openings. The electrode metal (EM) may correspond to a substantial touch electrode (TE) where a touch driving signal may be applied or a touch sensing signal may be detected.

As shown in the example of FIG. 5, when each touch electrode (TE) is an electrode metal (EM) patterned in the form of a mesh, two or more openings (OA) may be provided in the area of the touch electrode (TE). Each of the two or more openings (OA) provided in each touch electrode (TE) may correspond to the light-emitting area of one or more subpixels (SP). For example, a plurality of openings (OA) may provide paths through which light emitted from a plurality of subpixels (SP) below the plurality of openings (OA) may pass. Hereinafter, a description will be made of an example in which each touch electrode (TE) is a mesh-type electrode metal (EM) for convenience of explanation.

The electrode metal (EM) corresponding to each touch electrode (TE) may be positioned on a bank in an area other than the light-emitting areas of two or more subpixels (SP). As a method of forming a plurality of touch electrodes (TE), the electrode metal (EM) may be formed to be wide in the form of a mesh, and then the electrode metal (EM) may be cut into a predetermined pattern to electrically isolate the electrode metal (EM), thereby providing a plurality of touch electrodes (TE).

The outline of the touch electrode (TE) may have a quadrilateral shape, such as a square, a diamond, or a rhombus, as shown in the examples of FIGS. 4 and 5, or may have any of various shapes, such as a triangle, a pentagon, or a hexagon.

Figure 6:
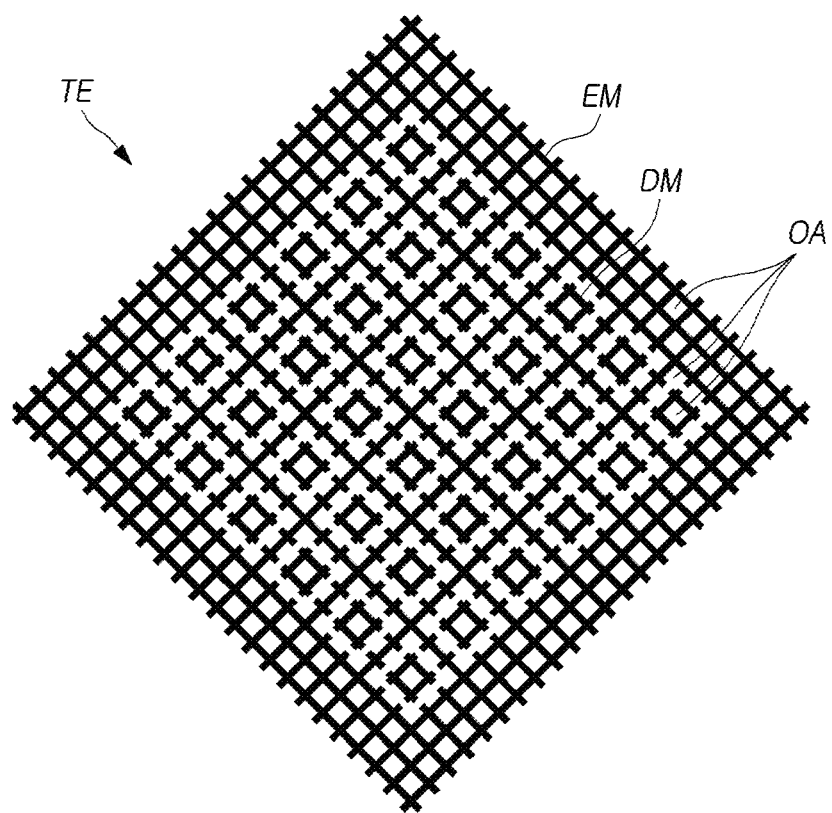
FIG. 6 illustrates an example of a mesh-type touch electrode shown in FIG. 5.

FIG. 6 illustrates an example of a mesh-type touch electrode shown in FIG. 5.

With reference to the example of FIG. 6, the area of each touch electrode (TE) may be provided with one or more dummy metals (DM) that are separated from the mesh-type electrode metal (EM). The electrode metal (EM) may correspond to a substantial touch electrode (TE) where a touch driving signal may be applied or a touch sensing signal may be detected. However, although the dummy metal (DM) may be provided in the area of the touch electrode (TE), a touch driving signal may not be applied thereto, and a touch sensing signal may not be detected therefrom. For example, the dummy metal (DM) may be an electrically floating metal. Therefore, the electrode metal (EM) may be electrically connected to the touch driving circuit (TDC), whereas the dummy metal (DM) may not be electrically connected to the touch driving circuit (TDC).

One or more dummy metals (DM) may be provided in the areas of the respective touch electrodes (TE), while being disconnected from the electrode metal (EM). Alternatively, one or more dummy metals (DM) may be provided in the areas of some of the touch electrodes (TE), while being disconnected from the electrode metal (EM). For example, the dummy metal (DM) may not be provided in the areas of some touch electrodes (TE).

With regard to the role of the dummy metal (DM), when no dummy metal (DM) is provided and only the mesh-type electrode metal (EM) is provided in the area of the touch electrode (TE), as shown in the example of FIG. 5, there may be a visible problem in that the outline of the electrode metal (EM) may be viewed on the screen. On the other hand, when one or more dummy metals (DM) are provided in the area of the touch electrode (TE), as shown in the example of FIG. 6, it may be possible to solve the visible problem of the outline of the electrode metal (EM) being viewable on the screen.

In addition, the magnitude of the capacitance for each touch electrode (TE) may be adjusted by providing or removing the dummy metals (DM) or by adjusting the number of dummy metals (DM) (the ratio of dummy metals) for each touch electrode (TE), thereby enhancing the touch sensitivity. Some points of the electrode metal (EM) formed in the area of one touch electrode (TE) may be cut away so that the cut electrode metal (EM) may become the dummy metal (DM). For example, the electrode metal (EM) and the dummy metal (DM) may include the same material in the same layer.

The touch display device according to an embodiment of the present disclosure may sense a touch based on the capacitance generated in the touch electrode (TE). The touch display device according to an embodiment of the present disclosure may be able to sense a touch by a capacitance-based touch sensing method, such as a mutual-capacitance-based touch sensing method or a self-capacitance-based touch sensing method.

In the case of a mutual-capacitance-based touch sensing method, a plurality of touch electrodes (TE) may be classified into driving touch electrodes (e.g., transmitting touch electrodes) to which a touch driving signal may be applied, and sensing touch electrodes (e.g., receiving touch electrodes), on which a touch sensing signal may be detected, forming capacitance with the driving touch electrodes. In the case of the mutual-capacitance-based touch sensing method, a touch sensing circuit (TSC) may sense whether or not a touch is performed and/or touch coordinates based on a change in the capacitance (mutual-capacitance) between the driving touch electrode and the sensing touch electrode, depending on whether or not there is a pointer detected, such as a finger or a pen.

In the case of the self-capacitance-based touch sensing method, each touch electrode (TE) may serve as both the driving touch electrode and the sensing touch electrode. For example, the touch sensing circuit (TSC) may apply a touch driving signal to one or more touch electrodes (TE), may detect a touch sensing signal through the touch electrodes (TE) applied with the touch driving signal, and may recognize a change in the capacitance between a pointer, such as a finger or a pen, and the touch electrode (TE) based on the detected touch sensing signal, thereby sensing whether or not a touch is performed and/or touch coordinates. The self-capacitance-based touch sensing method may not distinguish between the driving touch electrode and the sensing touch electrode.

As described above, the touch display device according to an embodiment of the present disclosure may sense a touch by a mutual-capacitance-based touch sensing method or by a self-capacitance-based touch sensing method. Hereinafter, for convenience of explanation, a description will be made of an example in which the touch display device performs mutual-capacitance-based touch sensing and has a touch sensor structure for the same.

Figure 7:
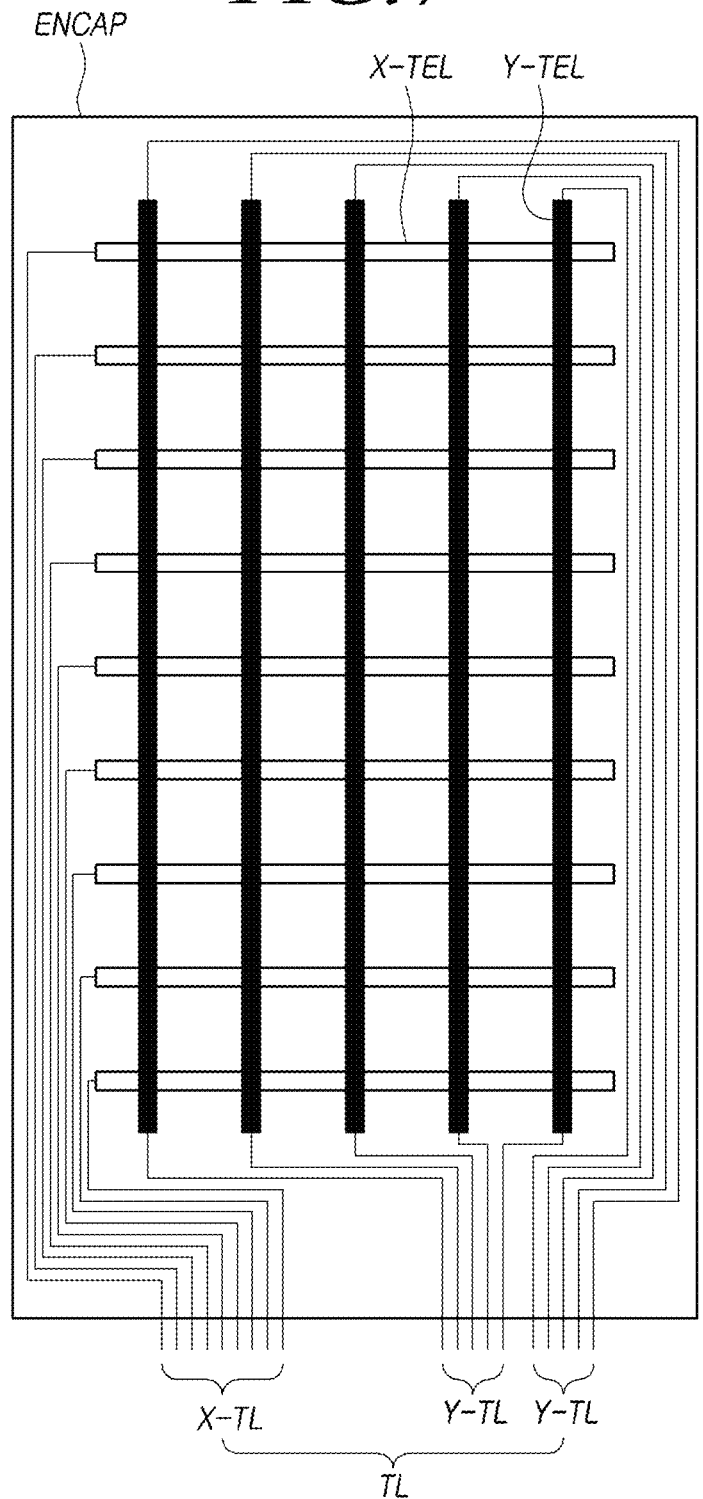
FIG. 7 illustrates a touch sensor structure in a display panel according to an embodiment of the present disclosure.
Figure 8:
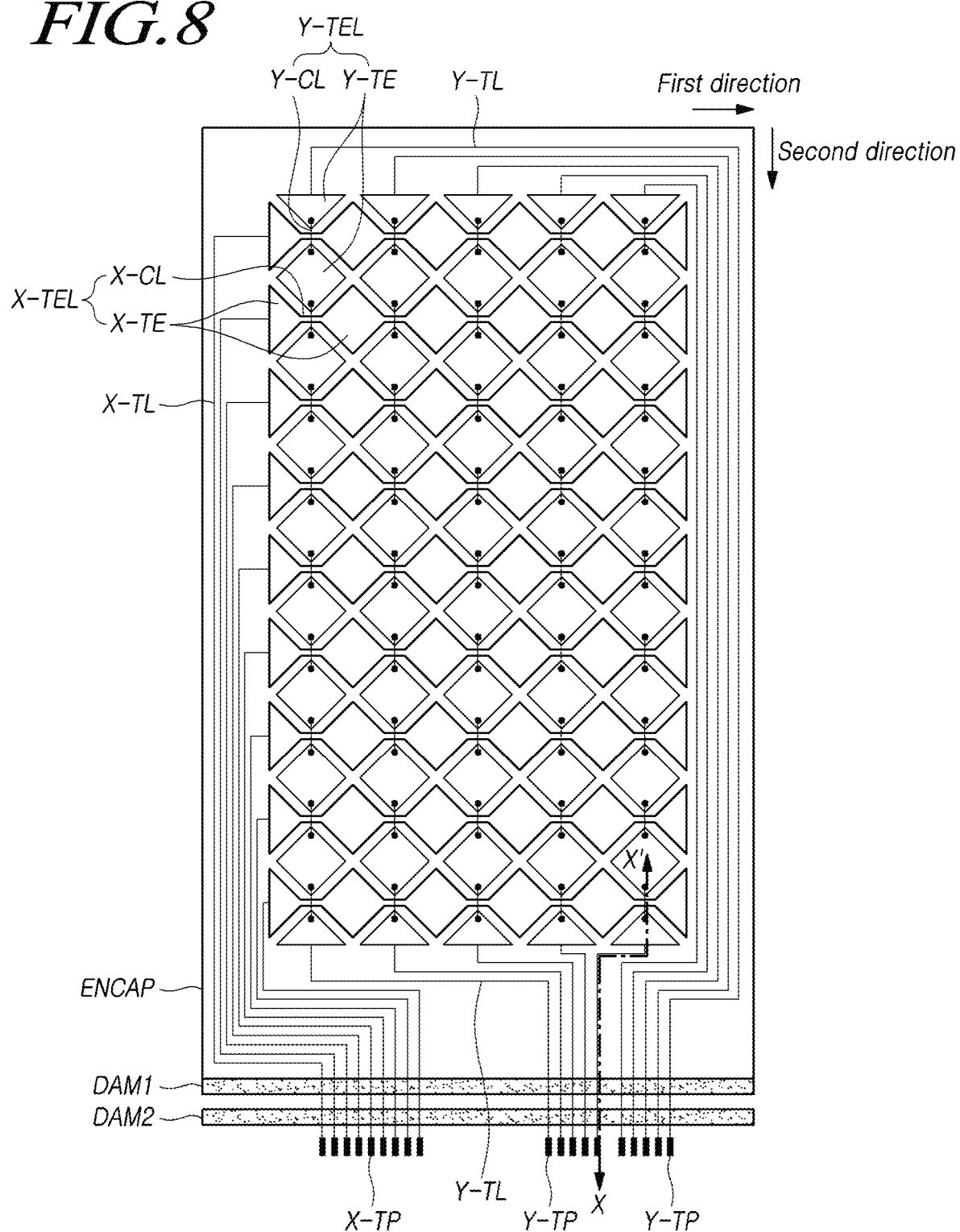
FIG. 8 illustrates an example of the touch sensor structure shown in FIG. 7.

FIG. 7 illustrates a touch sensor structure in a display panel according to an embodiment of the present disclosure. FIG. 8 illustrates an example of the touch sensor structure shown in FIG. 7.

With reference to the example of FIG. 7, a touch sensor structure for mutual-capacitance-based touch sensing may include a plurality of X-touch electrode lines (X-TEL) and a plurality of Y-touch electrode lines (Y-TEL). The plurality of X-touch electrode lines (X-TEL) and the plurality of Y-touch electrode lines (Y-TEL) may be on the encapsulation layer (ENCAP). The respective X-touch electrode lines (X-TEL) may be arranged in a first direction, and the respective Y-touch electrode lines (Y-TEL) may be arranged in a second direction different from the first direction.

As used herein, the first direction and the second direction may be relatively different. For example, the first direction may be an x-axis direction and the second direction may be a y-axis direction. On the other hand, the first direction may be the y-axis direction and the second direction may be the x-axis direction. In addition, the first direction and the second direction may, or may not, be orthogonal to each other. As used herein, rows and columns are relative, and may switch with each other, depending on viewpoints.

Each of the plurality of X-touch electrode lines (X-TEL) may include a plurality of X-touch electrodes (X-TE) electrically connected to each other. Each of the plurality of Y-touch electrode lines (Y-TEL) may include a plurality of Y-touch electrodes (Y-TE) electrically connected to each other.

The plurality of X-touch electrodes (X-TE) and the plurality of Y-touch electrodes (Y-TE) may be included in a plurality of touch electrodes (TE), and may have different roles (functions) from each other. For example, the plurality of X-touch electrodes (X-TE) constituting each of the plurality of X-touch electrode lines (X-TEL) may be driving touch electrodes, and the plurality of Y-touch electrodes (Y-TE) constituting each of the plurality of Y-touch electrode lines (Y-TEL) may be sensing touch electrodes. In this case, the respective X-touch electrode lines (X-TEL) may correspond to driving touch electrode lines, and the respective Y-touch electrode lines (Y-TEL) may correspond to sensing touch electrode lines.

On the other hand, the plurality of X-touch electrodes (X-TE) constituting each of the plurality of X-touch electrode lines (X-TEL) may be sensing touch electrodes, and the plurality of Y-touch electrodes (Y-TE) constituting each of the plurality of Y-touch electrode lines (Y-TEL) may be driving touch electrodes. In this case, the respective X-touch electrode lines (X-TEL) may correspond to sensing touch electrode lines, and the respective Y-touch electrode lines (Y-TEL) may correspond to driving touch electrode lines.

The touch sensor metal for touch sensing may include a plurality of touch routing lines (TL), as well as the plurality of X-touch electrode lines (X-TEL) and the plurality of Y-touch electrode lines (Y-TEL). The plurality of touch routing lines (TL) may include one or more X-touch routing lines (X-TL) connected to the respective X-touch electrode lines (X-TEL), and one or more Y-touch routing lines (Y-TL) connected to the respective Y-touch electrode lines (Y-TEL).

With reference to the example of FIG. 8, each of the plurality of X-touch electrode lines (X-TEL) may include a plurality of X-touch electrodes (X-TE) arranged in the same row (or column), and one or more X-touch electrode connecting lines (X-CL) for electrically connecting the same to each other. The X-touch electrode connecting line (X-CL) for connecting two adjacent X-touch electrodes (X-TE) may be a metal for example integral with two adjacent X-touch electrodes (X-TE) (see the FIG. 8 example), or may be a metal connected with two adjacent X-touch electrodes (X-TE) through contact holes.

Each of the plurality of Y-touch electrode lines (Y-TEL) may include a plurality of Y-touch electrodes (Y-TE) arranged in the same column (or row) and one or more Y-touch electrode connecting lines (Y-CL) for electrically connecting the same to each other. The Y-touch electrode connecting line (Y-CL) for connecting two adjacent Y-touch electrodes (Y-TE) may be a metal for example integral with two adjacent Y-touch electrodes (Y-TE), or may be a metal connected to two adjacent Y-touch electrodes (Y-TE) through contact holes (see the FIG. 8 example).

The X-touch electrode connecting line (X-CL) and the Y-touch electrode connecting lines (Y-CL) may intersect in the area (a touch electrode line intersection area) where the X-touch electrode line (X-TEL) and the Y-touch electrode line (Y-TEL) intersect. When the X-touch electrode connecting line (X-CL) and the Y-touch electrode connecting line (Y-CL) intersect in the touch electrode line intersection area as described above, it may be necessary for the X-touch electrode connecting line (X-CL) and the Y-touch electrode connecting line (Y-CL) to be positioned in different layers from each other. Accordingly, so that the plurality of X-touch electrode lines (X-TEL) and the plurality of Y-touch electrode lines (Y-TEL) may intersect each other, the plurality of X-touch electrodes (X-TE), the plurality of X-touch electrode connecting lines (X-CL), the plurality of Y-touch electrodes (Y-TE), and the plurality of Y-touch electrode connecting lines (Y-CL) may be provided in two or more layers.

With further reference to the example of FIG. 8, the respective X-touch electrode lines (X-TEL) may be electrically connected to corresponding X-touch pads (X-TP) via one or more X-touch routing lines (X-TL). For example, the outermost X-touch electrode (X-TE), among the plurality of X-touch electrodes (X-TE) included in one X-touch electrode line (X-TEL), may be electrically connected to the corresponding X-touch pad (X-TP) via the X-touch routing line (X-TL).

The respective Y-touch electrode lines (Y-TEL) may be electrically connected to corresponding Y-touch pads (Y-TP) via one or more Y-touch routing lines (Y-TL). For example, the outermost Y-touch electrode (Y-TE), among the plurality of Y-touch electrodes (Y-TE) included in one Y-touch electrode line (Y-TEL), may be electrically connected to the corresponding Y-touch pad (Y-TP) via the Y-touch routing line (Y-TL).

As shown in the example of FIG. 8, the plurality of X-touch electrode lines (X-TEL) and the plurality of Y-touch electrode lines (Y-TEL) may be arranged on the encapsulation layer (ENCAP). For example, the plurality of X-touch electrodes (X-TE) and the plurality of X-touch electrode connecting lines (X-CL) constituting the plurality of X-touch electrode lines (X-TEL) may be arranged on the encapsulation layer (ENCAP). The plurality of Y-touch electrodes (Y-TE) and the plurality of Y-touch electrode connecting lines (Y-CL) constituting the plurality of Y-touch electrode lines (Y-TEL) may be arranged on the encapsulation layer (ENCAP).

As further shown in the example of FIG. 8, the respective X-touch routing lines (X-TL) electrically connected to the plurality of X-touch electrode lines (X-TEL) may be arranged on the encapsulation layer (ENCAP) to extend to the area where the encapsulation layer (ENCAP) is not provided, and may be electrically connected to a plurality of X-touch pads (X-TP). The respective Y-touch routing lines (Y-TL) electrically connected to the plurality of Y-touch electrode lines (Y-TEL) may be arranged on the encapsulation layer (ENCAP) to extend to the area where the encapsulation layer (ENCAP) is not provided, and may be electrically connected to a plurality of Y-touch pads (Y-TP). The encapsulation layer (ENCAP) may be provided in the active area (AA). In some cases, the encapsulation layer (ENCAP) may extend to the non-active area (NA).

As described above, a dam area (DA) may be provided in the boundary area between the active area (AA) and the non-active area (NA), or in the non-active area (NA) outside the active area (AA), to avoid or prevent any layer (e.g., an encapsulation layer in the organic light-emitting display panel) in the active area (AA) from collapsing.

As shown in the example of FIG. 8, for example, a primary dam (DAM1) and a secondary dam (DAM2) may be in the dam area (DA). The secondary dam (DAM2) may be provided outside the primary dam (DAM1).

As alternatives to the example in FIG. 8, only the primary dam (DAM1) may be provided in the dam area (DA). In some cases, one or more additional dams may be further arranged in the dam area (DA), in addition to the primary dam (DAM1) and the secondary dam (DAM2).

With further reference to the example of FIG. 8, the encapsulation layer (ENCAP) may be provided on the side of the primary dam (DAM1). Alternatively, the encapsulation layer (ENCAP) may be provided on the top of the primary dam (DAM1), as well as on the side thereof.

Figure 9:
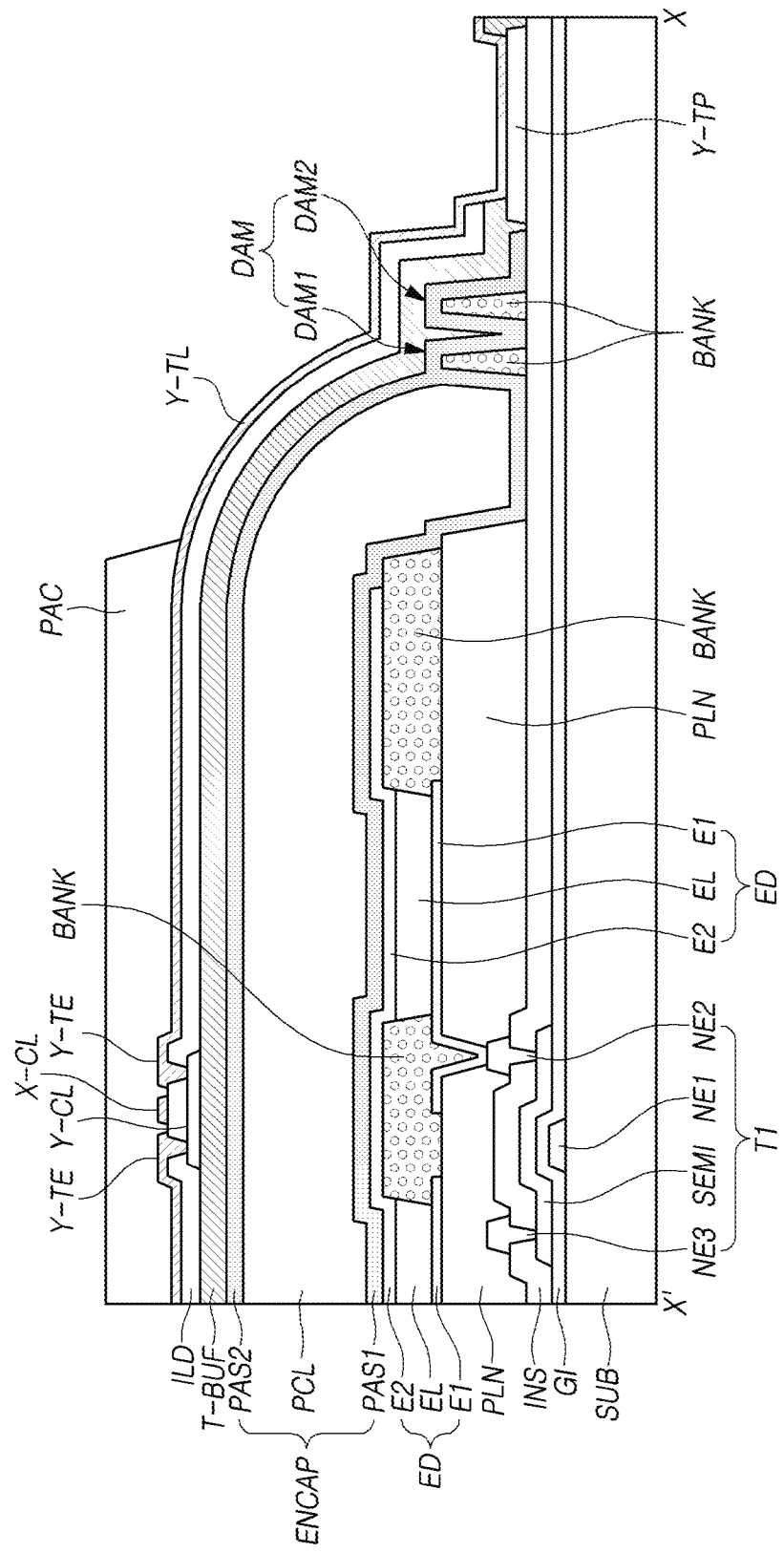
FIG. 9 illustrates a cross-sectional view, taken along line X-X' in FIG. 8, of a part of a display panel according to an embodiment of the present disclosure.

FIG. 9 illustrates a cross-sectional view, taken along line X-X' in FIG. 8, of a part of a display panel according to an embodiment of the present disclosure.

Although a plate-type touch electrode (Y-TE) is illustrated in FIG. 9, this is merely an example, and a mesh-type touch electrode may be provided. A first transistor (T1), which may be a driving transistor in each subpixel (SP) in the active area (AA), may be on a substrate (SUB). The first transistor (T1) may include a first node electrode (NE1) corresponding to a gate electrode, a second node electrode (NE2) corresponding to a source electrode or a drain electrode, a third node electrode (NE3) corresponding to a drain electrode or a source electrode, a semiconductor layer (SEMI), and the like.

The first node electrode (NE1) and the semiconductor layer (SEMI) may overlap each other with a gate insulating film (GI) interposed therebetween. The second node electrode (NE2) may be on an insulating layer (INS) in contact with one end of the semiconductor layer (SEMI), and the third node electrode (NE3) may be on the insulating layer (INS) in contact with the opposite end of the semiconductor layer (SEMI).

A light-emitting device (ED) may include a first electrode (E1) corresponding to an anode electrode (or a cathode electrode), a light-emitting layer (EL) on the first electrode (E1), and a second electrode (E2) corresponding to a cathode electrode (or an anode electrode) on the light-emitting layer (EL). The first electrode (E1) may be electrically connected to the second node electrode (NE2) of the first transistor (T1), which may be exposed through a pixel contact hole passing through the planarization layer (PLN).

The light-emitting layer (EL) may be on the first electrode (E1) in the light-emitting area provided by banks (BANK). The light-emitting layer (EL) may be formed by stacking layers in the order of a hole-related layer, a light-emitting layer, and an electron-related layer, or in the reverse order thereof, on the first electrode (E1). The second electrode (E2) may to face the first electrode (E1) with the light-emitting layer (EL) interposed therebetween.

The encapsulation layer (ENCAP) may reduce or prevent external moisture or oxygen from penetrating into the light-emitting device (ED), which is vulnerable to external moisture or oxygen. The encapsulation layer (ENCAP) may be configured as a single layer, or may be configured as multiple layers (e.g., PAS1, PCL, and PAS2), as shown in the example of FIG. 9.

For example, when the encapsulation layer (ENCAP) is configured as multiple layers (e.g., PAS1, PCL, and PAS2), the encapsulation layer (ENCAP) may include one or more inorganic encapsulation layers (e.g., PAS1 and PAS2) and one or more organic encapsulation layers (e.g., PCL). As another example, the encapsulation layer (ENCAP) may have a structure in which a first inorganic encapsulation layer (PAS1), an organic encapsulation layer (PCL), and a second inorganic encapsulation layer (PAS2) are sequentially stacked. The organic encapsulation layer (PCL) may further include at least one organic encapsulation layer or at least one inorganic encapsulation layer.

The first inorganic encapsulation layer (PAS1) may be on the substrate (SUB), on which the second electrode (E2) corresponding to a cathode electrode is formed, closest to the light-emitting device (ED). The first inorganic encapsulation layer (PAS1) may include an inorganic insulating material that enables low-temperature deposition, such as silicon nitride ($SiN_x$), silicon oxide ($SiO_x$), silicon oxynitride (SiON), aluminum oxide ($Al_2O_3$), or the like. When the first inorganic encapsulation layer (PAS1) is deposited in a low-temperature atmosphere, the first inorganic encapsulation layer (PAS1) may reduce or prevent the light-emitting layer (EL), which is vulnerable to a high-temperature atmosphere, from being damaged during the deposition process.

The organic encapsulation layer (PCL) may have an area smaller than that of the first inorganic encapsulation layer (PAS1). In this case, the organic encapsulation layer (PCL) may expose both ends of the first inorganic encapsulation layer (PAS1). The organic encapsulation layer (PCL) may serve as a buffer for relieving the stress between the respective layers due to warping of the touch display device, which may be an organic light-emitting display device, and may enhance the planarization performance. The organic encapsulation layer (PCL) may include an organic insulating material, such as an acrylic resin, an epoxy resin, polyimide, polyethylene, silicon oxycarbide (SiOC), or the like.

When the organic encapsulation layer (PCL) is formed by an inkjet method, one or more dams (DAM) may be provided in the dam area (DA) corresponding to the boundary area between the non-active area (NA) and the active area (AA), or corresponding to some areas of the non-active area (NA). For example, as shown in the example of FIG. 9, the dam area (DA) may be located between a pad area where a plurality of X-touch pads (X-TP) and a plurality of Y-touch pads (Y-TP) are formed in the non-active area (NA) and the active area (AA), and the dam area (DA) may be provided with a primary dam (DAM1) adjacent to the active area (AA) and a secondary dam (DAM2) adjacent to the pad area.

One or more dams (DAM) in the dam area (DA) may avoid or prevent a liquid organic encapsulation layer (PCL) from collapsing toward the non-active area (NA) and infiltrating into the pad area when the liquid organic encapsulation layer (PCL) is dropped into the active area (AA). This effect may be further increased when the primary dam (DAM1) and the secondary dam (DAM2) are provided, as shown in the example of FIG. 9.

The primary dam (DAM1) and/or the secondary dam (DAM2) may be provided as a single-layered or a multi-layered structure. For example, the primary dam (DAM1) and/or the secondary dam (DAM2) may include the same material as at least one of the banks (BANK) and spacers (not shown) at the same time. In this case, the dam structure may be formed without an additional mask process, which may cause an increase in the manufacturing cost.

In addition, the primary dam (DAM1) and the secondary dam (DAM2) may have a structure in which the first inorganic encapsulation layer (PAS1) and/or the second inorganic encapsulation layer (PAS2) are stacked on the banks (BANK), as shown in the example of FIG. 9. In addition, the organic encapsulation layer (PCL) containing the organic material may be only inside the primary dam (DAM1), as shown in the example of FIG. 9. Alternatively, the organic encapsulation layer (PCL) containing the organic material may also be on top of at least the primary dam (DAM1), among the primary dam (DAM1) and the secondary dam (DAM2).

The second inorganic encapsulation layer (PAS2) may cover the top surface and side surface of each of the organic encapsulation layer (PCL) and the first inorganic encapsulation layer (PAS1) on the substrate (SUB) on which the organic encapsulation layer (PCL) may be formed. The second inorganic encapsulation layer (PAS2) may reduce, minimize, or prevent external moisture or oxygen from penetrating into the first inorganic encapsulation layer (PAS1) and the organic encapsulation layer (PCL). The second inorganic encapsulation layer (PAS2) may include an inorganic insulating material, such as silicon nitride ($SiN_x$), silicon oxide ($SiO_x$), silicon oxynitride (SiON), aluminum oxide ($Al_2O_3$), or the like.

A touch buffer film (T-BUF) may be on the encapsulation layer (ENCAP). The touch buffer film (T-BUF) may be provided between the second electrode (E2) and the touch sensor metal of the light-emitting device (ED), the touch sensor metal including X-touch electrodes and Y-touch electrodes (X-TE and Y-TE) and X-touch electrode connecting lines and Y-touch electrode connecting lines (X-CL and Y-CL).

The touch buffer film (T-BUF) may be designed to maintain the distance between the touch sensor metal and the second electrode (E2) of the light-emitting device (ED) at a predetermined minimum separation distance (e.g., 5 μm). Accordingly, it may be possible to reduce or prevent the parasitic capacitance generated between the touch sensor metal and the second electrode (E2) of the light-emitting device (ED), thereby reducing or preventing deterioration of touch sensitivity due to the parasitic capacitance.

A touch sensor metal, including the X and Y-touch electrodes (X-TE and Y-TE) and the X and Y-touch electrode connecting lines (X-CL and Y-CL), may be on the encapsulation layer (ENCAP) without the touch buffer film (T-BUF). In addition, the touch buffer film (T-BUF) may reduce or prevent chemical solutions (e.g., developer, etchant, or the like) used in the manufacturing process of the touch sensor metal on the touch buffer film (T-BUF) or external moisture from penetrating into the light-emitting layer (EL) including organic materials. Accordingly, the touch buffer film (T-BUF) may be able to reduce or prevent damage to the light-emitting layer (EL), which is vulnerable to chemical solutions or moisture.

The touch buffer film (T-BUF) may include an organic insulating material, which may be able to be formed at a low temperature of less than a predetermined temperature (e.g., 100° C.) and may have a low permittivity of 1 to 3, to reduce or prevent damage to the light-emitting layer (EL), including an organic material for example vulnerable to high temperature. For example, the touch buffer film (T-BUF) may include an acrylic-based, epoxy-based, or siloxane-based material. The touch buffer film (T-BUF), including an organic insulating material to have a planarization property, may reduce or prevent damage to the respective encapsulation layers (e.g., PAS1, PCL, and PAS2) in the encapsulation layer (ENCAP), and may reduce or prevent breakage of the touch sensor metal on the touch buffer film (T-BUF), e.g., due to warping of the organic light-emitting display device.

According to a mutual-capacitance-based touch sensor structure, X-touch electrode lines (X-TEL) and Y-touch electrode lines (Y-TEL) may intersect each other on the touch buffer film (T-BUF). The Y-touch electrode line (Y-TEL) may include a plurality of Y-touch electrodes (Y-TE) and a plurality of Y-touch electrode connecting lines (Y-CL) for electrically connecting the plurality of Y-touch electrodes (Y-TE) to each other.

As shown in the example of FIG. 9, the plurality of Y-touch electrodes (Y-TE) and the plurality of Y-touch electrode connecting lines (Y-CL) may be provided in different layers with a touch insulating film (ILD) interposed therebetween. The plurality of Y-touch electrodes (Y-TE) may be spaced a predetermined distance apart from each other in the y-axis direction. Each of the plurality of Y-touch electrodes (Y-TE) may be electrically connected to another Y-touch electrode (Y-TE) adjacent thereto in the y-axis direction, e.g., by means of the Y-touch electrode connecting line (Y-CL).

The Y-touch electrode connecting line (Y-CL) may be formed on the touch buffer film (T-BUF) to be exposed through a touch contact hole passing through the touch insulating film (ILD), and may be electrically connected to two adjacent Y-touch electrodes (Y-TE) in the y-axis direction. The Y-touch electrode connecting line (Y-CL) may overlap the bank (BANK). Accordingly, it may be possible to reduce or prevent the aperture ratio from being lowered due to the Y-touch electrode connecting line (Y-CL).

The X-touch electrode line (X-TEL) may include a plurality of X-touch electrodes (X-TE) and a plurality of X-touch electrode connecting lines (X-CL) for electrically connecting the plurality of X-touch electrodes (X-TE) to each other. The plurality of X-touch electrodes (X-TE) and the plurality of X-touch electrode connecting lines (X-CL) may be provided in different layers with a touch insulating film (ILD) interposed therebetween.

The plurality of X-touch electrodes (X-TE) may be spaced a predetermined distance apart from each other in the x-axis direction. Each of the plurality of X-touch electrodes (X-TE) may be electrically connected to another X-touch electrode (X-TE) adjacent thereto in the x-axis direction through the X-touch electrode connecting line (X-CL).

The X-touch electrode connecting line (X-CL) may be arranged on the same plane as the X-touch electrodes (X-TE), and may be electrically connected to two X-touch electrodes (X-TE), which may be adjacent to each other in the x-axis direction, without separate contact holes, or may be formed integrally with two X-touch electrodes (X-TE), which may be adjacent to each other in the x-axis direction. The X-touch electrode connecting line (Y-CL) may overlap the bank (BANK). Accordingly, it may be possible to reduce or prevent the aperture ratio from being lowered due to the X-touch electrode connecting line (Y-CL).

The Y-touch electrode line (Y-TEL) may be electrically connected to a touch driving circuit (TDC) via the Y-touch routing line (Y-TL) and the Y-touch pad (Y-TP). Similarly, the X-touch electrode line (X-TEL) may be electrically connected to a touch driving circuit (TDC) via the X-touch routing line (X-TL) and the X-touch pad (X-TP).

A pad cover electrode covering the X-touch pad (X-TP) and the Y-touch pad (Y-TP) may be further provided. The X-touch pad (X-TP) may be formed separately from the X-touch routing line (X-TL), or may be formed by extending the X-touch routing line (X-TL). The Y-touch pad (Y-TP) may be formed separately from the Y-touch routing line (Y-TL), or may be formed by extending the Y-touch routing line (Y-TL).

When the X-touch pad (X-TP) is formed by extending the X-touch routing line (X-TL) and the Y-touch pad (Y-TP) is formed by extending the Y-touch routing line (Y-TL), the X-touch pad (X-TP), the X-touch routing line (X-TL), the Y-touch pad (Y-TP), and Y-touch routing line (Y-TL) may include the same first conductive material. The first conductive material may be formed in a single-layered or multi-layered structure using a metal, such as aluminum (Al), titanium (Ti), copper (Cu), or molybdenum (Mo), which exhibits high corrosion resistance, high acid resistance, and high conductivity. For example, the X-touch pad (X-TP), the X-touch routing line (X-TL), the Y-touch pad (Y-TP), and Y-touch routing line (Y-TL) made of the first conductive material may be formed in a three-layered structure such as Ti/Al/Ti or Mo/Al/Mo.

The pad cover electrode capable of covering the X-touch pad (X-TP) and the Y-touch pad (Y-TP) may include a second conductive material for example the same as the X-touch electrode and Y-touch electrode (X-TE and Y-TE). The second conductive material may be a transparent conductive material, such as indium tin oxide (ITO) or indium zinc oxide (IZO), which exhibits high corrosion resistance and high acid resistance. The pad cover electrode may be exposed by the touch buffer film (T-BUF), so that the pad cover electrode may be bonded to the touch driving circuit (TDC), or may be bonded to a circuit film on which the touch driving circuit (TDC) may be mounted.

The touch buffer film (T-BUF) may cover the touch sensor metal, thereby reducing or preventing the touch sensor metal from being corroded by external moisture or the like. For example, the touch buffer film (T-BUF) may include an organic insulating material, or may be a circular polarizer or a film of an epoxy or acrylic material. The touch buffer film (T-BUF) may not be provided on the encapsulation layer (ENCAP). For example, the touch buffer film (T-BUF) may not be an essential element and may be omitted.

The Y-touch routing line (Y-TL) may be electrically connected to the Y-touch electrodes (Y-TE) through touch routing line contact holes, or may be integral with the Y-touch electrode (Y-TE). The Y-touch routing line (Y-TL) may be extended to the non-active area (NA), and may pass over the top and side of the encapsulation layer (ENCAP) and the top and side of the dam (DAM) to be electrically connected to the Y-touch pad (Y-TP). Accordingly, the Y-touch routing line (Y-TL) may be electrically connected to the touch driving circuit (TDC) via the Y-touch pad (Y-TP).

The Y-touch routing line (Y-TL) may transmit a touch sensing signal from the Y-touch electrode (Y-TE) to the touch driving circuit (TDC). Alternatively, the Y-touch routing line (Y-TL) may receive a touch driving signal from the touch driving circuit (TDC), and may transfer the same to the Y-touch electrode (Y-TE).

The X-touch routing line (X-TL) may be electrically connected to the X-touch electrodes (X-TE) through touch routing line contact holes, or may be integral with the X-touch electrode (X-TE). The X-touch routing line (X-TL) may be extended to the non-active area (NA), and may pass over the top and side of the encapsulation layer (ENCAP) and the top and side of the dam (DAM) to be electrically connected to the X-touch pad (X-TP). Accordingly, the X-touch routing line (X-TL) may be electrically connected to the touch driving circuit (TDC) via the X-touch pad (X-TP).

The X-touch routing line (X-TL) may receive a touch driving signal from the touch driving circuit (TDC), and may transfer the same to the X-touch electrode (X-TE). Alternatively, the X-touch routing line (X-TL) may transmit a touch sensing signal from the X-touch electrode (X-TE) to the touch driving circuit (TDC).

The layout of the X-touch routing lines (X-TL) and Y-touch routing lines (Y-TL) may be variously modified depending on the panel design. A touch protection film (PAC) may be arranged on the X-touch electrode (X-TE) and the Y-touch electrode (Y-TE). The touch protection film (PAC) may be extended to the front or back of the dam (DAM) to be arranged on the X-touch routing line (X-TL) and the Y-touch routing line (Y-TL).

The cross-sectional view of FIG. 9 shows a conceptual structure. Thus, the positions, thicknesses, or widths of the respective patterns (respective layers or respective electrodes) may vary depending on the viewing directions or positions, connection structures of the respective patterns may vary, other layers may be further provided in addition to the illustrated layers, or some of the illustrated layers may be omitted or integrated. For example, the relative width of the bank (BANK) may be smaller than that illustrated in the drawing, and the relative height of the dam (DAM) may be less than or greater than that illustrated in the drawing.

Figure 10:
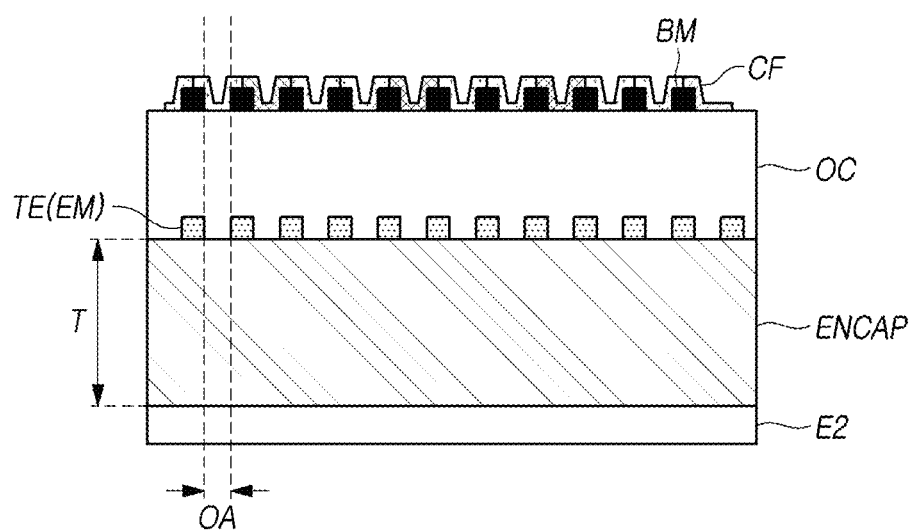
FIGS. 10 and 11 illustrate examples of a cross-sectional structure of a display panel including a color filter according to an embodiment of the present disclosure.
Figure 11:
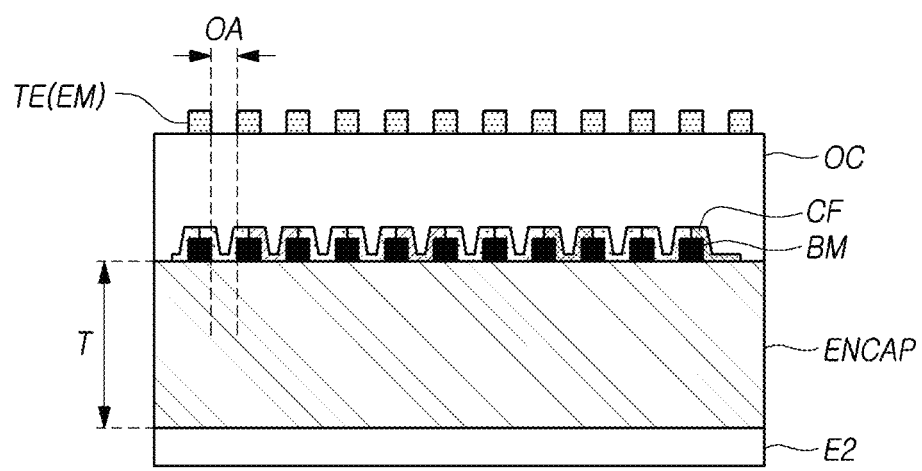

FIGS. 10 and 11 illustrate examples of a cross-sectional structure of a display panel including a color filter according to an embodiment of the present disclosure.

With reference to the examples of FIGS. 10 and 11, when the touch panel (TSP) is embedded in the display panel (DISP) and the display panel (DISP) is implemented as an organic light-emitting display panel, the touch panel (TSP) may be on the encapsulation layer (ENCAP) in the display panel (DISP). For example, the touch sensor metal, such as a plurality of touch electrodes (TE), a plurality of touch routing lines (TL), and the like, may be on the encapsulation layer (ENCAP) in the display panel (DISP). As described above, when the touch electrodes (TE) are on the encapsulation layer (ENCAP), it may be possible to form the touch electrodes (TE) without significantly affecting the display performance and display-related layer formation.

With further reference to the examples of FIGS. 10 and 11, a second electrode (E2), which may be a cathode electrode of an organic light-emitting diode (OLED), may be under the encapsulation layer (ENCAP). The thickness (T) of the encapsulation layer (ENCAP) may be, for example, 5 μm or more.

As described above, it may be possible to reduce the parasitic capacitance generated between the second electrode (E2) and the touch electrode (TE) of the organic light-emitting diode (OLED) by designing the encapsulation layer (ENCAP) to have a thickness of 5 μm or more. Thus, it may be possible to reduce or prevent deterioration in the touch sensitivity due to the parasitic capacitance.

As described above, each of the plurality of touch electrodes (TE) may be patterned as a mesh in which the electrode metal (EM) may have two or more openings (OA). Each of the two or more openings (OA) may correspond to one or more subpixels or the light-emitting area thereof in the vertical direction. As described above, the electrode metal (EM) of the touch electrode (TE) may be patterned such that the light-emitting area of one or more subpixels may correspond to the position of each of two or more openings (OA) provided in the area of the touch electrode (TE) on the plan view, thereby increasing the luminous efficiency of the display panel (DISP).

As shown in the examples of FIGS. 10 and 11, a black matrix (BM) may be on the display panel (DISP), and a color filter (CF) may be on the black matrix (BM). The position of the black matrix (BM) may correspond to the position of the electrode metal (EM) of the touch electrode (TE). The positions of a plurality of color filters (CF) may correspond to the positions of a plurality of touch electrodes (TE) or the electrode metals (EM) constituting the plurality of touch electrodes (TE). As described above, when the plurality of color filters (CF) are at the positions corresponding to the positions of a plurality of openings (OA), it may be possible to improve the luminous performance of the display panel (DISP).

A vertical positional relationship between the plurality of color filters (CF) and the plurality of touch electrodes (TE) will be described as follows. As shown in the example of FIG. 10, the plurality of color filters (CF) and black matrixes (BM) may be on the plurality of touch electrodes (TE). In this case, the plurality of color filters (CF) and black matrixes (BM) may be on an overcoat layer (OC) on the plurality of touch electrodes (TE). The overcoat layer (OC) may, or may not, be the same layer as the touch protection film (PAC) shown in FIG. 9.

As shown in the example of FIG. 11, the plurality of color filters (CF) and black matrixes (BM) may be under the plurality of touch electrodes (TE). In this case, the plurality of touch electrodes (TE) may be on the overcoat layer (OC) on the plurality of color filters (CF) and black matrixes (BM). The overcoat layer (OC) may, or may not, be the same layer as the touch buffer film (T-BUF) or the touch insulating film (ILD) in FIG. 9.

FIG. 12 illustrates a process of implementing a multi-layered touch sensor structure on a display panel according to an embodiment of the present disclosure.

With reference to the example of FIG. 12, a touch sensor structure embedded in a display panel (DISP) according to an embodiment of the present disclosure may include a plurality of X-touch electrode lines (X-TEL) and a plurality of Y-touch electrode lines (Y-TEL), and may further include a plurality of X-touch routing lines (X-TL) electrically connected to the plurality of X-touch electrode lines (X-TEL) and a plurality of Y-touch routing lines (Y-TL) electrically connected to the plurality of Y-touch electrode lines (Y-TEL).

Each of the plurality of X-touch electrode lines (X-TEL) may be a driving touch electrode line or a sensing touch electrode line, and may include a plurality of X-touch electrodes (X-TE) and a plurality of X-touch electrode connecting lines (X-CL) corresponding to bridges connecting the plurality of X-touch electrodes (X-TE) to each other. Each of the plurality of Y-touch electrode lines (Y-TEL) may be a sensing touch electrode line or a driving touch electrode line, and may include a plurality of Y-touch electrodes (Y-TE) and a plurality of Y-touch electrode connecting lines (Y-CL) corresponding to bridges connecting the plurality of Y-touch electrodes (Y-TE) to each other.

The plurality of X-touch electrodes (X-TE), the plurality of X-touch electrode connecting lines (X-CL), the plurality of Y-touch electrodes (Y-TE), the plurality of Y-touch electrode connecting lines (Y-CL), the plurality of X-touch routing lines (X-TL), and the plurality of Y-touch routing lines (Y-TL) constituting a touch sensor structure are configured as a touch sensor metal. The touch sensor metal constituting the touch sensor structure may include a first touch sensor metal (TSM1) and a second touch sensor metal (TSM2), which may be in different layers in terms of the formation position.

The first touch sensor metal (TSM1) may include a plurality of X-touch electrode connecting lines (X-CL) and/or a plurality of Y-touch electrode connecting lines (Y-CL). The second touch sensor metal (TSM2) may include a plurality of X-touch electrodes (X-TE) and a plurality of Y-touch electrodes (Y-TE).

With further reference to the example of FIG. 12, a touch buffer film (T-BUF) may cover the encapsulation layer (ENCAP) covering the second electrode (E2) on the substrate (SUB). Then, a first touch sensor metal (TSM1) may be formed by a first mask process using a first mask (Mask #1). The first touch sensor metal (TSM1) may correspond to a plurality of X-touch electrode connecting lines (X-CL) and/or a plurality of Y-touch electrode connecting lines (Y-CL).

Next, a touch insulating film (ILD) may be formed by a second mask process using a second mask (Mask #2). At this time, the touch buffer film (T-BUF) may be opened in the touch pad area.

Thereafter, a second touch sensor metal (TSM2) may be formed by a third mask process using a third mask (Mask #3). The second touch sensor metal (TSM2) may correspond to a plurality of X-touch electrodes (X-TE) and a plurality of Y-touch electrodes (Y-TE), and may also correspond to a plurality of X-touch routing lines (X-TL) and a plurality of Y-touch routing lines (Y-TL). In the third mask process, the second touch sensor metal (TSM2) may be formed up to the touch pad area, thereby constituting a plurality of X-touch pads (X-TP) and a plurality of Y-touch pads (Y-TP).

In the touch pad area, a plurality of X-touch pads (X-TP) and a plurality of Y-touch pads (Y-TP) having a dual structure may be formed. In the dual structure, a metal other than the second touch sensor metal (TSM2) may be formed and the second touch sensor metal (TSM2) may be formed thereon. For example, a metal of the same material as the source-drain electrode formed in the active area (AA) may be the metal other than the second touch sensor metal (TSM2).

After the third mask process, a touch protection film (PAC) for passivation may be formed by a fourth mask process using a fourth mask (Mask #4). One or more of the touch buffer film (T-BUF) and the touch protective film (PAC) may be omitted according to the process method.

When the touch sensor structure is formed as described above, the first touch sensor metal (TSM1), the touch insulating film (ILD), and the second touch sensor metal (TSM2) may be required to be formed in a multi-layer on the encapsulation layer (ENCAP) or the touch buffer film (T-BUF). Therefore, the multi-layered touch sensor structure may become thick, and may require a large number of mask processes.

Accordingly, embodiments of the present disclosure may provide a single-layered touch sensor structure that may reduce the number of mask processes, and may enable a thin touch sensor structure. Hereinafter, a single-layered touch sensor structure according to an embodiment of the present disclosure will be described.

FIG. 13 illustrates a process of implementing a single-layered touch sensor structure on a display panel according to an embodiment of the present disclosure.

Here, the same mask numbers as those in FIG. 12 are used for comparison with the processes in FIG. 12. With reference to the example of FIG. 13, a touch buffer film (T-BUF) may cover the encapsulation layer (ENCAP) covering the second electrode (E2) on the substrate (SUB). Then, a touch sensor metal (TSM) may be formed by a first mask process using a first mask (Mask #1). The touch sensor metal (TSM) may correspond to a plurality of X-touch electrodes (X-TE), a plurality of Y-touch electrode (Y-TE), a plurality of X-touch electrode connecting lines (X-CL), and a plurality of Y-touch electrode connecting lines (Y-CL), and may also correspond to a plurality of X-touch routing lines (X-TL) and a plurality of Y-touch routing lines (Y-TL).

In the first mask process, the touch buffer film (T-BUF) may be opened in the touch pad area. Thereafter, a touch protection film (PAC) for passivation may be formed by a fourth mask process using a fourth mask (Mask #4) without a second mask process (Mask #2 of FIG. 12) and a third mask process (Mask #3 of FIG. 12). At least one of the touch buffer film (T-BUF) and the touch protective film (PAC) may be omitted according to the process method.

When forming the touch sensor structure as described above, all touch sensor metals (TSM), including a plurality of X-touch electrodes (X-TE), a plurality of Y-touch electrodes (Y-TE), a plurality of X-touch electrode connecting lines (X-CL), a plurality of Y-touch electrode connecting lines (Y-CL), a plurality of X-touch routing lines (X-TL), and a plurality of Y-touch routing lines (Y-TL), may be formed as a single layer on the encapsulation layer (EN-CAP) or the touch buffer film (T-BUF). Therefore, the single-layered touch sensor structure may become thin, and may be able to significantly reduce the number of mask processes.

In general, a single-layered touch sensor structure had been available for only a self-capacitance-based touch sensing technology, and was not applicable to a mutual-capacitance-based touch sensing technology. However, the single-layered touch sensor structure according to an embodiment of the present disclosure may enable the mutual-capacitance-based touch sensing. Therefore, it may be possible to simplify the process, to greatly improve the yield, to reduce the manufacturing cost, and to greatly reduce the number of pads by significantly reducing the number of mask processes. In the following, various examples of a single-layered touch sensor structure will be described.

Figure 14:
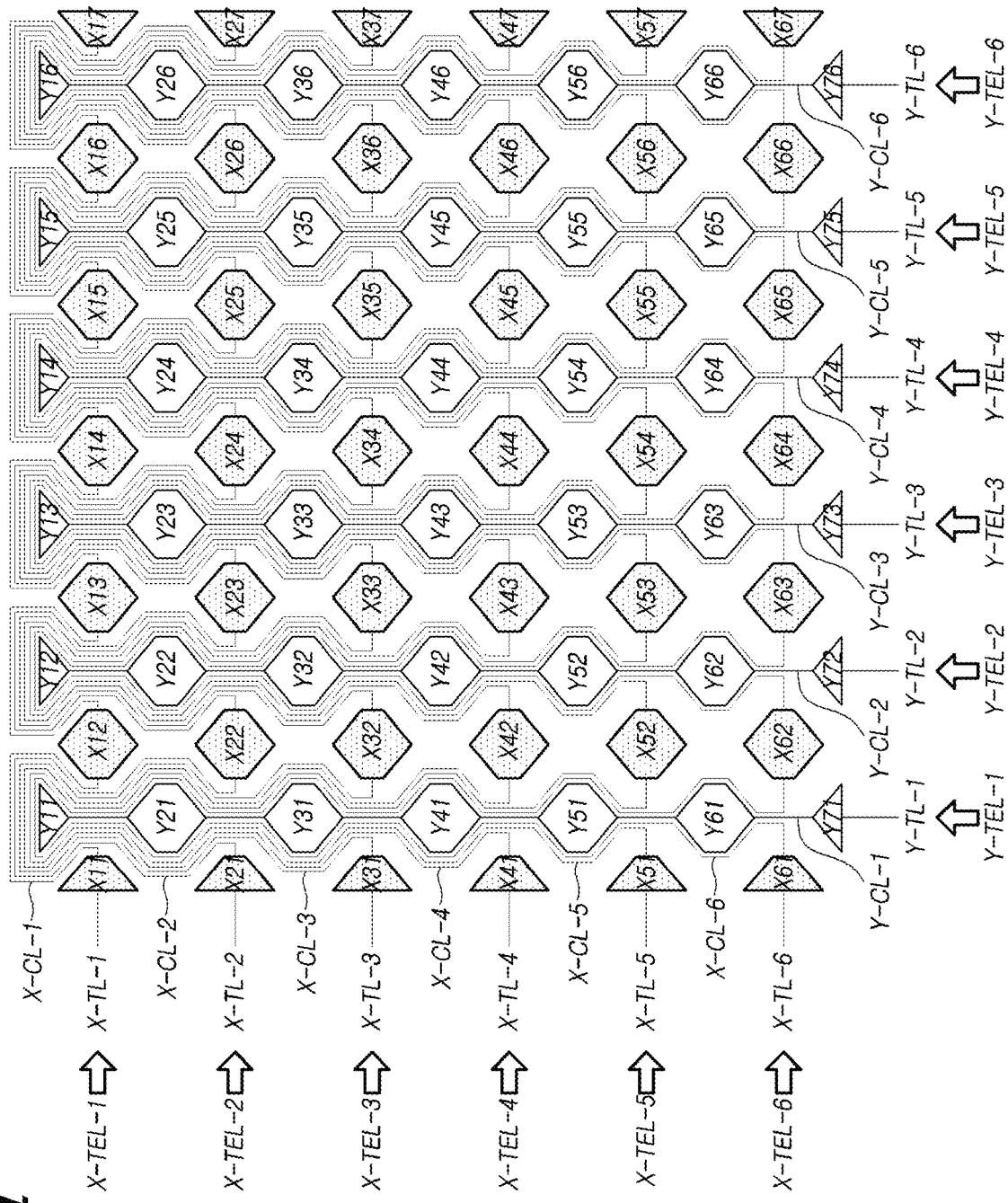
FIGS. 14 and 15 illustrate a first example of a single-layered touch sensor structure in a display panel according to an embodiment of the present disclosure.
Figure 15:
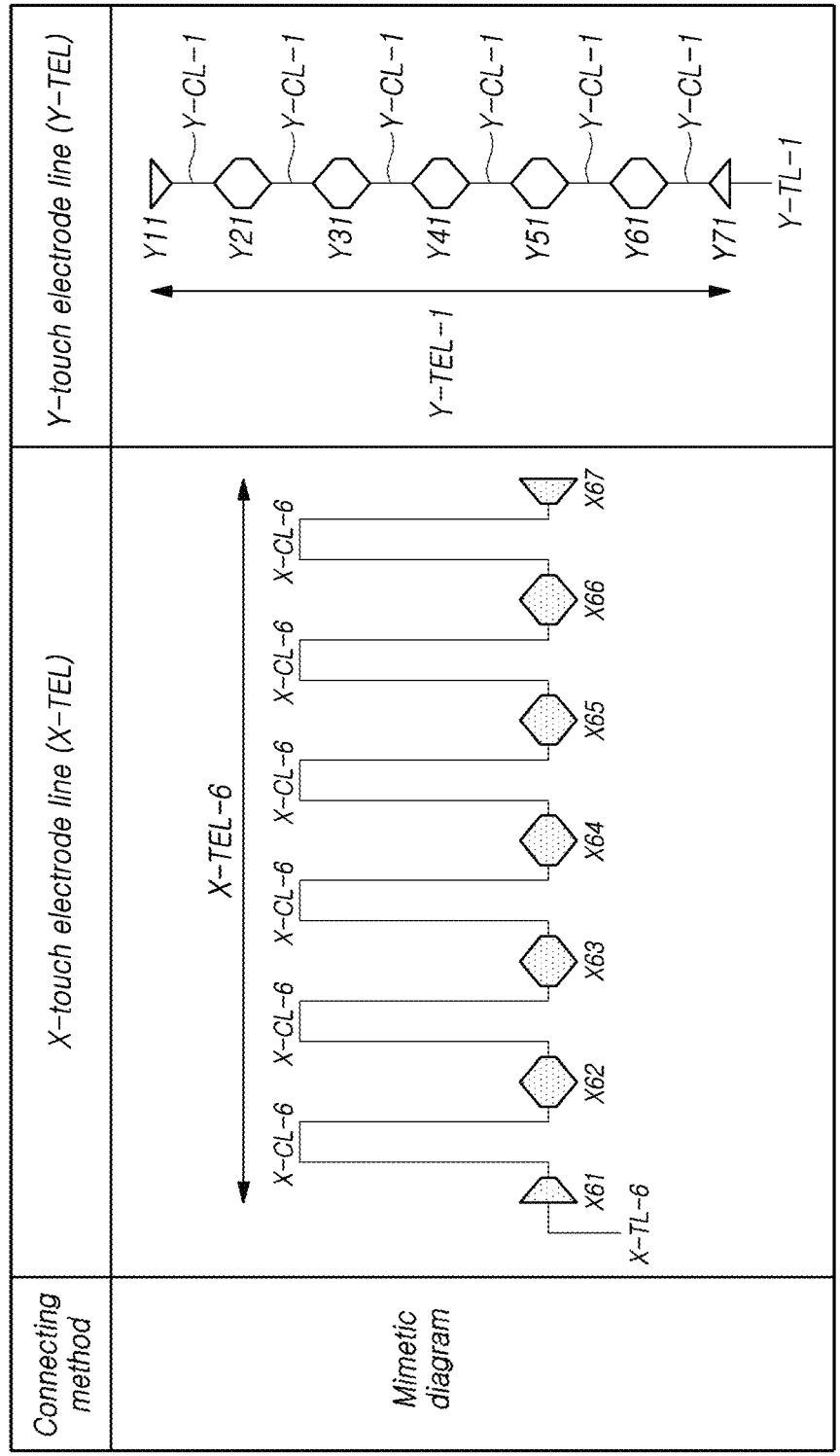

FIGS. 14 and 15 illustrate a first example of a single-layered touch sensor structure in a display panel according to an embodiment of the present disclosure.

A plurality of touch electrodes (TE) in the display panel (DISP) may constitute m X-touch electrode lines (X-TEL-1 to X-TEL-6, where m=6) and n Y-touch electrode lines (Y-TEL-1 to Y-TEL-6, where n=6), which intersect each other. Here, 'm' is an even natural number greater than or equal to 2, and 'n' is an even or odd natural number greater than or equal to 2.

The m X-touch electrode lines (X-TEL-1 to X-TEL-6) and the n Y-touch electrode lines (Y-TEL-1 to Y-TEL-6) may be electrically separated from each other. In addition, the m X-touch electrode lines (X-TEL-1 to X-TEL-6) may be electrically separated from each other, and the n Y-touch electrode lines (Y-TEL-1 to Y-TEL-6) may be electrically separated from each other.

Each of the m X-touch electrode lines (X-TEL-1 to X-TEL-6) may include a plurality of X-touch electrodes (X-TE) in a first direction (e.g., x-axis direction or y-axis direction), among a plurality of touch electrodes, and a plurality of X-touch electrode connecting lines (X-CL) for electrically connecting the plurality of X-touch electrodes (X-TE) to each other. For example, the X-touch electrode line (X-TEL-1) may include seven X-touch electrodes (X11 to X17) and six X-touch electrode connecting lines (X-CL-1) connecting the same to each other. The X-touch electrode line (X-TEL-2) may include seven X-touch electrodes (X21 to X27) and six X-touch electrode connecting lines (X-CL-2) connecting the same to each other. The X-touch electrode line (X-TEL-3) may include seven X-touch electrodes (X31 to X37) and six X-touch electrode connecting lines (X-CL-3) connecting the same to each other. The X-touch electrode line (X-TEL-4) may include seven X-touch electrodes (X41 to X47) and six X-touch electrode connecting lines (X-CL-4) connecting the same to each other. The X-touch electrode line (X-TEL-5) may include seven X-touch electrodes (X51 to X57) and six X-touch electrode connecting lines (X-CL-5) connecting the same to each other. The X-touch electrode line (X-TEL-6) may include seven X-touch electrodes (X61 to X67) and six X-touch electrode connecting lines (X-CL-6) connecting the same to each other.

In addition, the m X-touch electrode lines (X-TEL-1 to X-TEL-6) may include m outermost X-touch electrodes (X11, X21, X31, X41, X51, and X61). The m outermost X-touch electrodes (X11, X21, X31, X41, X51, and X61) may be electrically connected to the X-touch routing lines (X-TL-1 to X-TL-6), respectively.

Each of the n Y-touch electrode lines (Y-TEL-1 to Y-TEL-6) may include a plurality of Y-touch electrodes (Y-TE) in a second direction (e.g., y-axis direction or x-axis direction) different from the first direction (e.g., x-axis direction or y-axis direction), among a plurality of touch electrodes, and a plurality of Y-touch electrode connecting lines (Y-CL) for electrically connecting the plurality of Y-touch electrodes (Y-TE) to each other.

For example, the Y-touch electrode line (Y-TEL-1) may include seven Y-touch electrodes (Y11 to Y71) and six Y-touch electrode connecting lines (Y-CL-1) connecting the same to each other. The Y-touch electrode line (Y-TEL-2) may include seven Y-touch electrodes (Y12 to Y72) and six Y-touch electrode connecting lines (Y-CL-2) connecting the same to each other. The Y-touch electrode line (Y-TEL-3) may include seven Y-touch electrodes (Y13 to Y73) and six Y-touch electrode connecting lines (Y-CL-3) connecting the same to each other. The Y-touch electrode line (Y-TEL-4) may include seven Y-touch electrodes (Y14 to Y74) and six Y-touch electrode connecting lines (Y-CL-4) connecting the same to each other. The Y-touch electrode line (Y-TEL-5) may include seven Y-touch electrodes (Y15 to Y75) and six Y-touch electrode connecting lines (Y-CL-5) connecting the same to each other. The Y-touch electrode line (Y-TEL-6) may include seven Y-touch electrodes (Y16 to Y76) and six Y-touch electrode connecting lines (Y-CL-6) connecting the same to each other.

In addition, the n Y-touch electrode lines (Y-TEL-1 to Y-TEL-6) may have n outermost Y-touch electrodes (Y71, Y72, Y73, Y74, Y75, and Y76). The n outermost Y-touch electrodes (Y71, Y72, Y73, Y74, Y75, and Y76) may be electrically connected to the Y-touch routing lines (Y-TL-1 to Y-TL-6), respectively.

With reference to the example of FIGS. 14 and 15, the X-touch electrode connecting line (X-CL-6) configured to electrically connect any two adjacent X-touch electrodes (X61 and X62), among a plurality of X-touch electrodes (X61 to X67) included in the X-touch electrode line (X-TEL-6) at the outermost position on one side, among the m X-touch electrode lines (X-TEL-1 to X-TEL-6), may surround the whole or a part of one Y-touch electrode line (Y-TEL-1). The X-touch electrode connecting line (X-CL-5) configured to electrically connect any two adjacent X-touch electrodes (X51 and X52), among a plurality of X-touch electrodes (X51 to X57) included in the X-touch electrode line (X-TEL-5) adjacent to the X-touch electrode line (X-TEL-6) at the outermost position on one side, among the m X-touch electrode lines (X-TEL-1 to X-TEL-6), may surround a part of one Y-touch electrode line (Y-TEL-1). The X-touch electrode connecting line (X-CL-5) may surround a part of the X-touch electrode connecting line (X-CL-6).

In addition, the X-touch electrode connecting line (X-CL-5) and the X-touch electrode connecting line (X-CL-6) may surround the same Y-touch electrode line (Y-TEL-1). The portion of the Y-touch electrode line (Y-TEL-1) surrounded by the X-touch electrode connecting line (X-CL-5) may be smaller than the portion of the Y-touch electrode line (Y-TEL-1) surrounded by the X-touch electrode connecting line (X-CL-6).

The plurality of X-touch electrode connecting lines (X-CL-1 to X-CL-6) may be in the m X-touch electrode lines (X-TEL-1 to X-TEL-6) in the manner described above so that n outermost Y-touch electrodes (Y11 to Y16), which may not be connected to the Y-touch routing lines (Y-TL-1 to Y-TL-6), and may be at the outermost positions, may be surrounded by all the X-touch electrode connecting lines (X-CL-1 to X-CL-6) in the n Y-touch electrode lines (Y-TEL-1 to Y-TEL-6). There may be no X-touch electrode connecting line that surrounds n Y-touch electrodes (Y71 to Y76) connected to the Y-touch routing lines (Y-TL-1 to Y-TL-6) in the n Y-touch electrode lines (Y-TEL-1 to Y-TEL-6). In addition, n Y-touch electrodes (Y61 to Y66)

immediately adjacent to the n Y-touch electrodes (Y71 to Y76) connected to the Y-touch routing lines (Y-TL-1 to Y-TL-6) may be surrounded by the smallest number of X-touch electrode connecting lines (X-CL-6) in the n Y-touch electrode lines (Y-TEL-1 to Y-TEL-6).

Seven Y-touch electrodes (Y11 to Y71) constituting one Y-touch electrode line (Y-TEL-1) may be connected to each other by six Y-touch electrode connecting lines (Y-CL-1) provided along short paths. For example, the six Y-touch electrode connecting lines (Y-CL-1) may have short paths, instead of bypassing and surrounding other patterns.

As described above, the respective X-touch electrode connecting lines (X-CL-1 to X-CL-6) may be arranged in a bypass-connection structure in which the X-touch electrode connecting lines (X-CL-1 to X-CL-6) surround the corresponding Y-touch electrode lines (Y-TEL-1 to Y-TEL-6) provided therebetween, and may take a long way around two X-touch electrodes, instead of passing directly therebetween. In contrast, the plurality of Y-touch electrode connecting lines (Y-CL-1 to Y-CL-6) may be arranged in a non-bypass-connection structure to directly connect two Y-touch electrodes.

Figure 16:
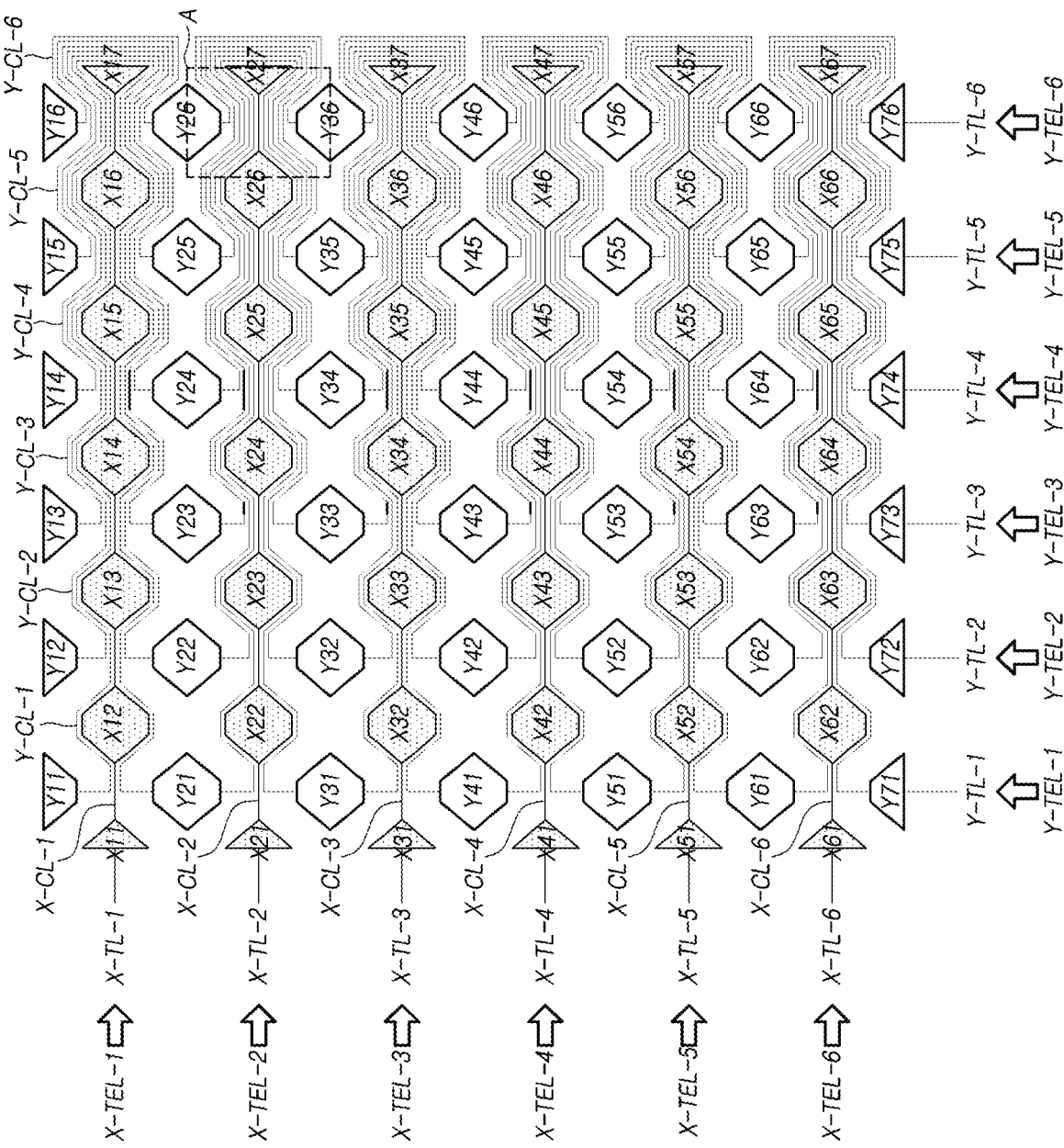
FIGS. 16 and 17 illustrate a second example of a single-layered touch sensor structure in a display panel according to an embodiment of the present disclosure.
Figure 17:
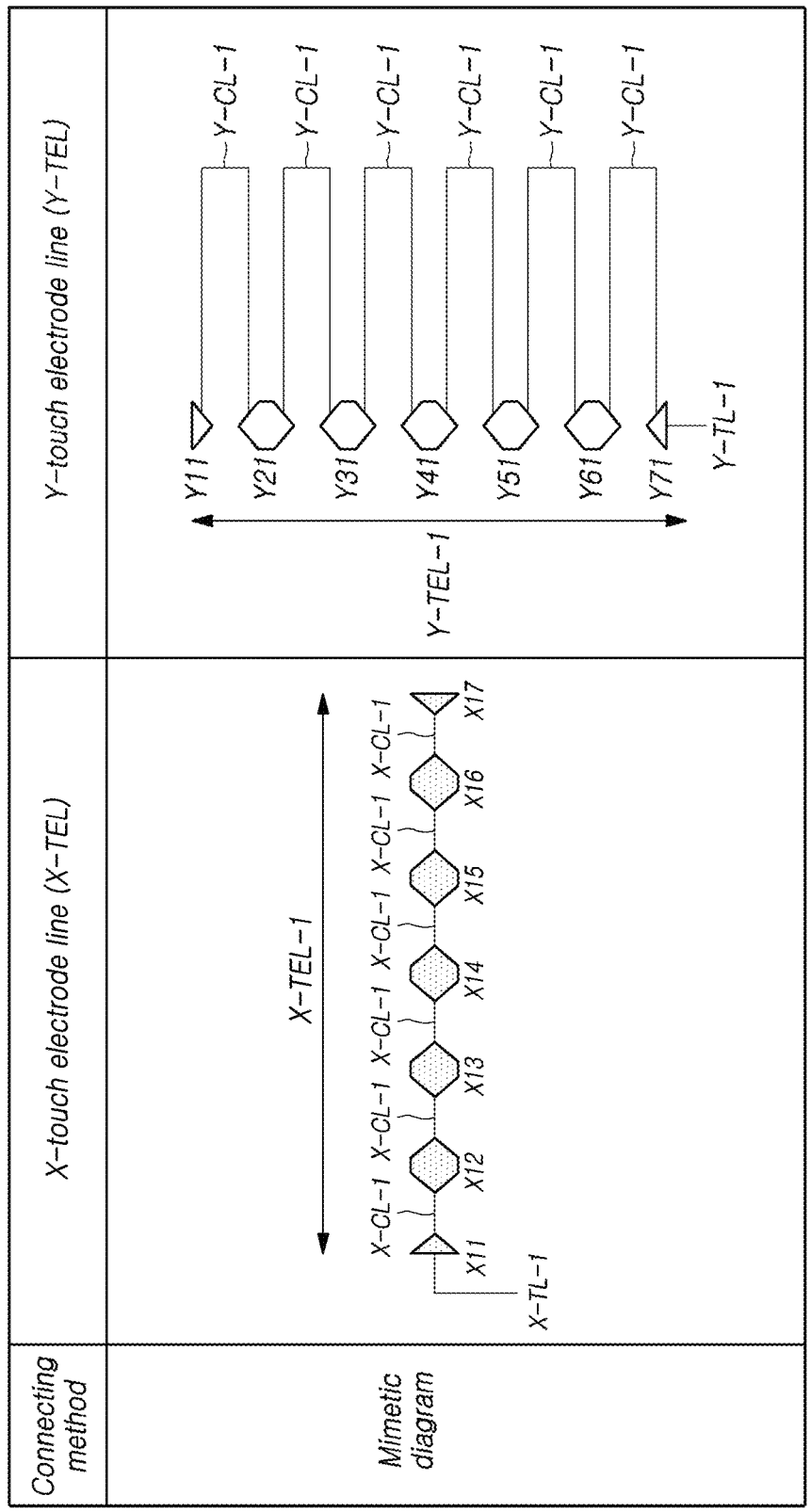

FIGS. 16 and 17 illustrate a second example of a single-layered touch sensor structure in a display panel according to an embodiment of the present disclosure.

Contrary to the example of FIGS. 14 and 15, a single-layered touch sensor structure in FIGS. 16 and 17 may have a plurality of Y-touch electrode connecting lines (Y-CL-1 to Y-CL-6) arranged in a bypass-connection structure in which the respective Y-touch electrode connecting lines (Y-CL-1 to Y-CL-6) may surround the corresponding X-touch electrode lines (X-TEL-1 to X-TEL-6) provided therebetween to take a long way around two Y-touch electrodes, instead of passing directly therebetween, and a plurality of X-touch electrode connecting lines (X-CL-1 to X-CL-6) arranged in a non-bypass-connection structure to directly connect two X-touch electrodes. For example, the Y-touch electrode connecting line (Y-CL-1) configured to electrically connect any two adjacent Y-touch electrodes (Y11 and Y21), among a plurality of Y-touch electrodes (Y11 to Y71) included in the Y-touch electrode line (Y-TEL-1) arranged at the outermost position on one side in the n Y-touch electrode lines (Y-TEL-1 to Y-TEL-6), may surround the whole or a part of one X-touch electrode line (X-TEL-1).

The Y-touch electrode connecting line (Y-CL-2) configured to electrically connect any two adjacent Y-touch electrodes (Y12 and Y22), among a plurality of Y-touch electrodes (Y12 to Y72) included in the Y-touch electrode line (Y-TEL-2) adjacent to the Y-touch electrode line (Y-TEL-1) at the outermost position on one side in the n Y-touch electrode lines (Y-TEL-1 to Y-TEL-6), may surround a part of one X-touch electrode line (X-TEL-1). The Y-touch electrode connecting line (Y-CL-2) may surround a part of the Y-touch electrode connecting line (Y-CL-1).

In addition, the Y-touch electrode connecting line (Y-CL-2) and the Y-touch electrode connecting line (Y-CL-1) may surround the same X-touch electrode line (X-TEL-1). The portion of the X-touch electrode line (X-TEL-1) surrounded by the Y-touch electrode connecting line (Y-CL-2) may be smaller than the portion of the X-touch electrode line (X-TEL-1) surrounded by the Y-touch electrode connecting line (Y-CL-1).

With reference to the example of FIG. 16, the Y-touch electrode connecting lines (Y-CL-1 to Y-CL-3) may be arranged along the paths corresponding to the outlines of all or some of a plurality of first X-touch electrodes (X11, X12, X13, and X14) included in the first X-touch electrode line (X-TEL-1) surrounded by the Y-touch electrode connecting lines (Y-CL-1 to Y-CL-3). Accordingly, it may be possible to reduce or minimize the area where the touch electrode connecting lines are arranged between the touch electrodes.

For example, seven X-touch electrodes (X11 to X17) constituting one X-touch electrode line (X-TEL-1) may be connected to each other by six X-touch electrode connecting lines (X-CL-1) along short paths. For example, the six X-touch electrode connecting lines (X-CL-1) may be along short paths, instead of bypassing and surrounding other patterns.

With reference to the example of FIG. 16, the m X-touch electrode lines (X-TEL-1 to X-TEL-6) may be electrically connected to a plurality of X-touch routing lines (X-TL-1 to X-TL-6). The n Y-touch electrode lines (Y-TEL-1 to Y-TEL-6) may be electrically connected to a plurality of Y-touch routing lines (Y-TL-1 to Y-TL-6).

As described above, the plurality of X-touch electrode connecting lines (X-CL-1 to X-CL-6) may be designed in a bypass-connection structure as shown in the example of FIGS. 14 and 15. Alternatively, the plurality of Y-touch electrode connecting lines (Y-CL-1 to Y-CL-6) may be designed in a bypass-connection structure, as shown in the example of FIGS. 16 and 17. For convenience of explanation, the following description will be made of an example in which a single-layered touch sensor structure is designed such that a plurality of Y-touch electrode connecting lines (Y-CL-1 to Y-CL-6) has a bypass-connection structure.

Figure 18:
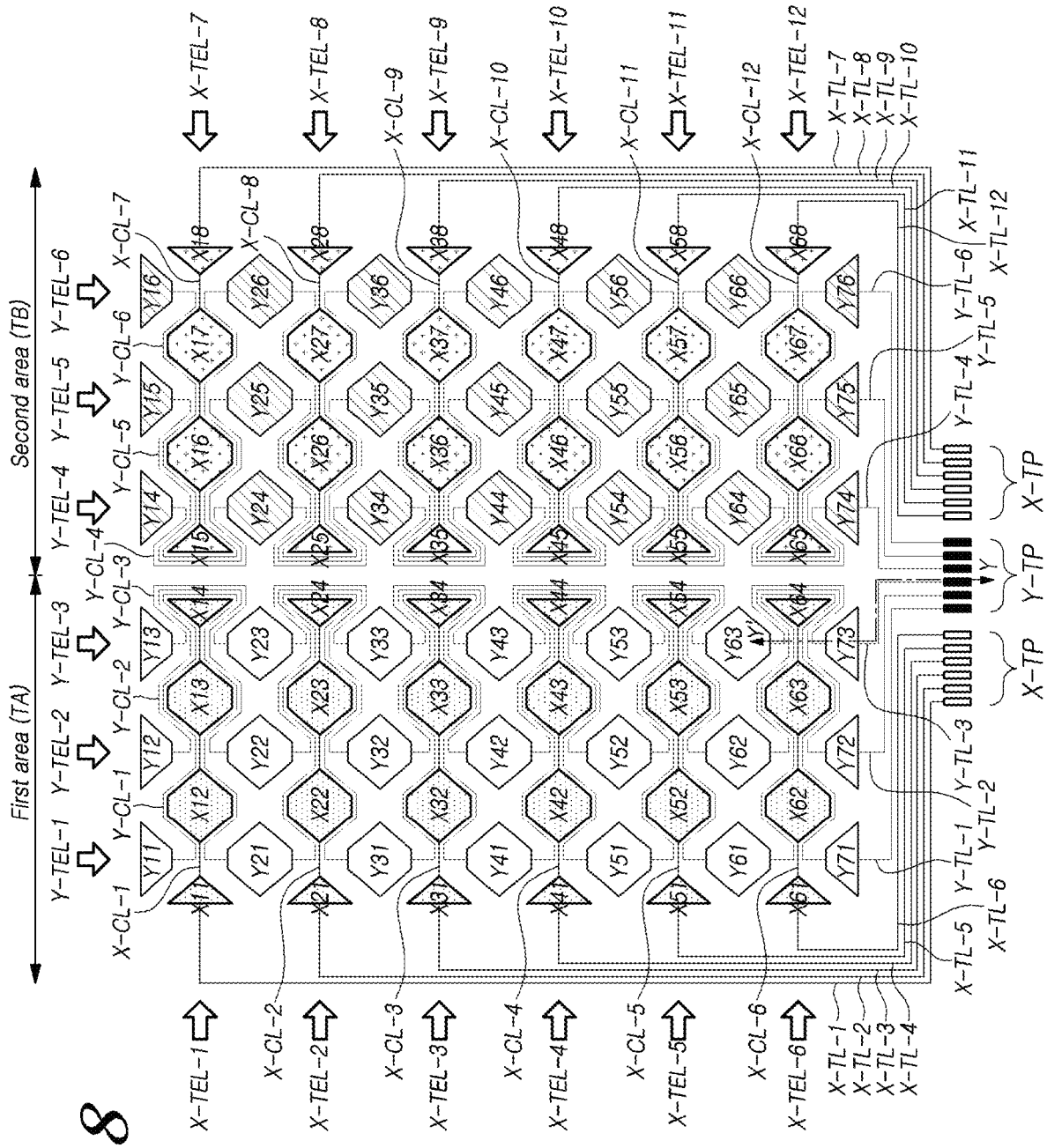
Figure 19:
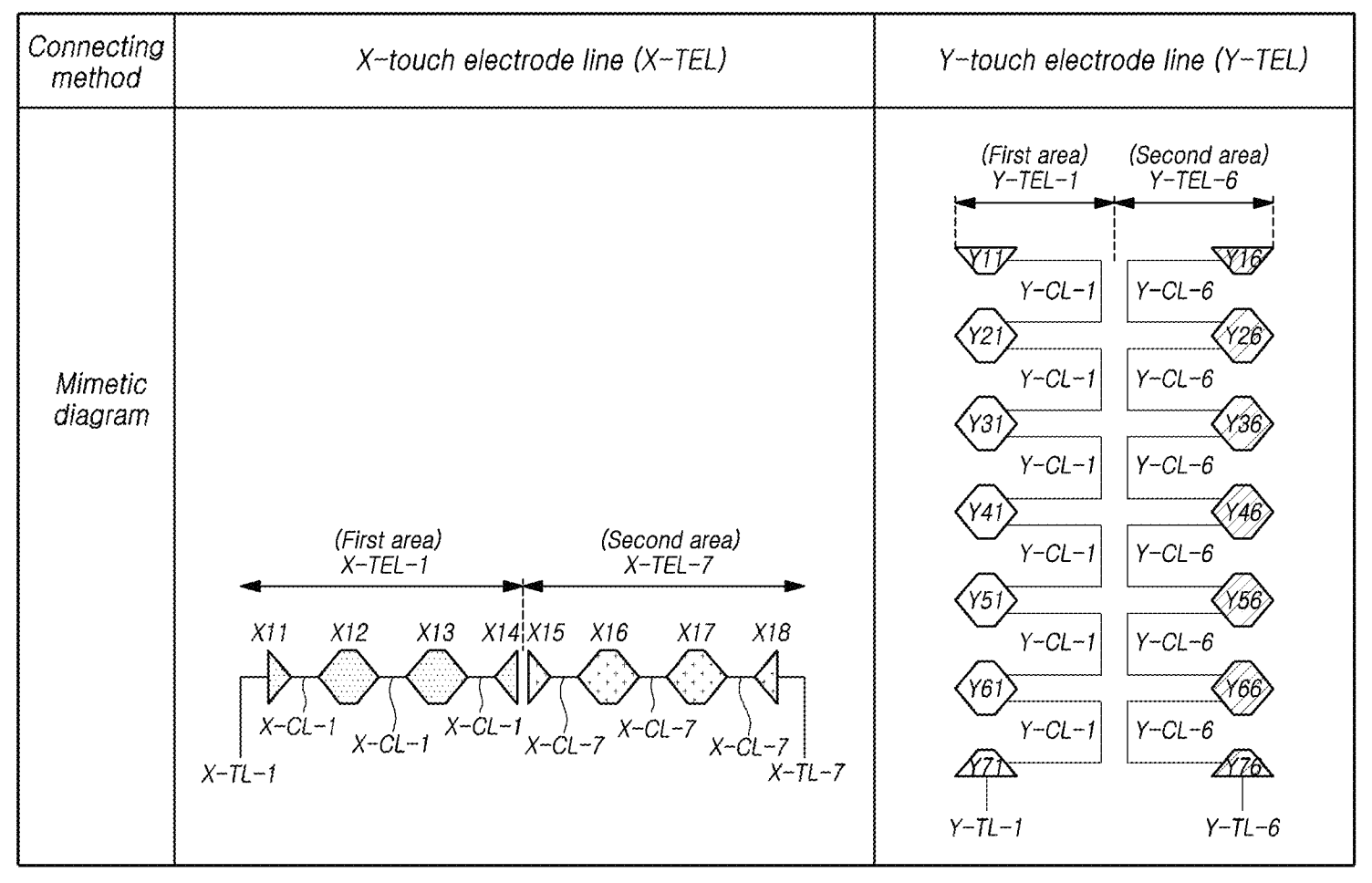

FIGS. 18 and 19 illustrate a third example of a single-layered touch sensor structure in a display panel according to an embodiment of the present disclosure.

Like the single-layered touch sensor structure in FIGS. 16 and 17, a single-layered touch sensor structure in the example of FIGS. 18 and 19 has a plurality of Y-touch electrode connecting lines (Y-CL-1 to Y-CL-6) in a bypass-connection structure in which the respective Y-touch electrode connecting lines (Y-CL-1 to Y-CL-6) surround the corresponding X-touch electrode lines (X-TEL-1 to X-TEL-12) provided therebetween to take a long way around two Y-touch electrodes, instead of passing directly therebetween, and a plurality of X-touch electrode connecting lines (X-CL-1 to X-CL-6) in a non-bypass-connection structure to directly connect two X-touch electrodes. However, the single-layered touch sensor structure shown in FIGS. 18 and 19 is different from the single-layered touch sensor structure shown in FIGS. 16 and 17 in that the touch sensing area is divided into a first touch area (TA) and a second touch area (TB) in a first direction in the display panel (DISP) so that m X-touch electrode lines (X-TEL-1 to X-TEL-12) are divided and arranged in the first touch area (TA) and the second touch area (TB), respectively. In this case, m may be an even number (m=12 in the example of FIG. 18).

As another example, m X-touch electrode lines (X-TEL-1 to X-TEL-12) may include (m/2) first X-touch electrode lines (X-TEL-1 to X-TEL-6) and (m/2) second X-touch electrode lines (X-TEL-7 to X-TEL-12) respectively in the first touch area (TA) and the second touch area (TB), which may be obtained by dividing the display panel (DISP) in the first direction.

The (m/2) first X-touch electrode lines (X-TEL-1 to X-TEL-6) in the first touch area (TA) may include a plurality of first X-touch electrodes (X11, X12, X13, X14, X21, X22, X23, X24, X31, X32, X33, X34, X41, X42, X43, X44, X51, X52, X53, X54, X61, X62, X63, and X64) in the first direction, among all touch electrodes (TE) arranged in the display panel (DISP), and a plurality of first X-touch electrode connecting lines (X-CL-1 to X-CL-6) for electrically connecting the plurality of first X-touch electrodes (X11, X12, X13, X14, X21, X22, X23, X24, X31, X32, X33, X34, X41, X42, X43, X44, X51, X52, X53, X54, X61, X62, X63, and X64) to each other.

The (m/2) second X-touch electrode lines (X-TEL-7 to X-TEL-12) in the second touch area (TB) may include a plurality of second X-touch electrodes (X15, X16, X17, X18, X25, X26, X27, X28, X35, X36, X37, X38, X45, X46, X47, X48, X55, X56, X57, X58, X65, X66, X67, and X68) in the first direction, among all touch electrodes (TE) arranged in the display panel (DISP), and a plurality of second X-touch electrode connecting lines (X-CL-7 to X-CL-12) for electrically connecting the plurality of second X-touch electrodes (X15, X16, X17, X18, X25, X26, X27, X28, X35, X36, X37, X38, X45, X46, X47, X48, X55, X56, X57, X58, X65, X66, X67, and X68) to each other.

The n Y-touch electrode lines (Y-TEL-1 to Y-TEL-6) may include a plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, Y73, Y14, Y24, Y34, Y44, Y54, Y64, Y74, Y15, Y25, Y35, Y45, Y55, Y65, Y75, Y16, Y26, Y36, Y46, Y56, Y66, and Y76) in a second direction, different from the first direction, and a plurality of Y-touch electrode connecting lines (Y-CL-1 to Y-CL-6) for electrically connecting the plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, Y73, Y14, Y24, Y34, Y44, Y54, Y64, Y74, Y15, Y25, Y35, Y45, Y55, Y65, Y75, Y16, Y26, Y36, Y46, Y56, Y66, and Y76) to each other.

The n Y-touch electrode lines (Y-TEL-1 to Y-TEL-6) may be divided into two parts, and may be in the first touch area (TA) and the second touch area (TB). For example, (n/2) Y-touch electrode lines (Y-TEL-1 to Y-TEL 3) of the n Y-touch electrode lines (Y-TEL-1 to Y-TEL-6) may be in the first touch area (TA), and the remaining (n/2) Y-touch electrode lines (Y-TEL-4 to Y-TEL-6) may be in the second area.

A plurality of first X-touch electrode connecting lines (X-CL-1 to X-CL-6) and a plurality of second X-touch electrode connecting lines (X-CL-7 to X-CL-12), respectively included in the (m/2) first X-touch electrode lines (X-TEL-1 to X-TEL-6) in the first touch area (TA) and the (m/2) second X-touch electrode lines (X-TEL-7 to X-TEL-12) in the second area, may have a non-bypass structure. For example, each of a plurality of first X-touch electrode connecting lines (X-CL-1) included in the first X-touch electrode lines (X-TEL-1) in the first touch area (TA) may directly connect two adjacent first X-touch electrodes, among a plurality of first X-touch electrodes (X11 to X14), instead of bypassing the same. In addition, for example, each of a plurality of second X-touch electrode connecting lines (X-CL-7) included in the second X-touch electrode lines (X-TEL-7) in the second touch area (TB) may directly connect two adjacent second X-touch electrodes, among a plurality of second X-touch electrodes (X15 to X18), instead of bypassing the same.

On the other hand, a plurality of Y-touch electrode connecting lines (Y-CL-1 to Y-CL-6) included in the n Y-touch electrode lines (Y-TEL-1 to Y-TEL-6) may have a bypass-connection structure. For example, the Y-touch electrode connecting lines (Y-CL-1) for-electrically connecting a first Y-touch electrode (Y11) and a second Y-touch electrode (Y21), which may be adjacent to each other, among a plurality of Y-touch electrodes (Y11 to Y71) included in the Y-touch electrode line (Y-TEL-1) at the outermost position on one side in the n Y-touch electrode lines (Y-TEL-1 to Y-TEL-6), may surround the whole or a part of one first X-touch electrode line (X-TEL-1). As another example, the Y-touch electrode connecting lines (Y-CL-6) for electrically connecting a third Y-touch electrode (Y16) and a fourth Y-touch electrode (Y26), which may be adjacent to each other, among a plurality of Y-touch electrodes (Y16 to Y76) included in the Y-touch electrode line (Y-TEL-6) at the outermost position on the opposite side in the n Y-touch electrode lines (Y-TEL-1 to Y-TEL-6), may surround the whole or a part of one second X-touch electrode line (X-TEL-7).

As shown in the example of FIGS. 18 and 19, under the two-separation area structure in which the m X-touch electrode lines (X-TEL-1 to X-TEL-12) are divided into two parts and provided in the first touch area (TA) and the second touch area (TB), a plurality of Y-touch electrode connecting lines (Y-CL-1 to Y-CL-6) may be designed in a bypass-connection structure, thereby relieving concentration of a large number of Y-touch electrode connecting lines (Y-CL-1 to Y-CL-6) between the X-touch electrodes (X-TE) and the Y-touch electrodes (Y-TE). For example, in the example of the non-two-separation area structure shown in the example of FIGS. 16 and 17, the maximum number of Y-touch electrode connecting lines (Y-CL) between the X-touch electrodes (X-TE) and the Y-touch electrodes (Y-TE) is 6, but in the example of the two-separation area structure shown in FIGS. 18 and 19, the maximum number of Y-touch electrode connecting lines (Y-CL) between the X-touch electrodes (X-TE) and the Y-touch electrodes (Y-TE) is 3(=6/2).

As described above, if the number of Y-touch electrode connecting lines (Y-CL) between the X-touch electrodes (X-TE) and the Y-touch electrodes (Y-TE) is reduced according to the two-separation area structure, the touch sensitivity based on the capacitance (mutual-capacitance) generated between the X-touch electrode (X-TE) and the Y-touch electrode (Y-TE) may be improved. In addition, if the number of Y-touch electrode connecting lines (Y-CL) between the X-touch electrodes (X-TE) and the Y-touch electrodes (Y-TE) is reduced according to the two-separation area structure, the gap between the X-touch electrode (X-TE) and the Y-touch electrode (Y-TE) may not be required to be increased, thereby increasing the respective areas of the X-touch electrodes (X-TE) and the Y-touch electrodes (Y-TE). Therefore, the magnitude of the capacitance (mutual-capacitance) generated between the X-touch electrode (X-TE) and the Y-touch electrode (Y-TE) may be increased, thereby improving the touch sensitivity.

With reference to the example of FIG. 18, the m X-touch electrode lines (X-TEL-1 to X-TEL-12) may be electrically connected to a plurality of X-touch routing lines (X-TL-1 to X-TL-12). The n Y-touch electrode lines (Y-TEL-1 to Y-TEL-6) may be electrically connected to a plurality of Y-touch routing lines (Y-TL-1 to Y-TL-6).

The plurality of X-touch routing lines (X-TL-1 to X-TL-12) may be electrically connected to a plurality of X-touch pads (X-TP) in the non-active area (NA). The plurality of Y-touch routing lines (Y-TL-1 to Y-TL-6) may be electrically connected to a plurality of Y-touch pads (Y-TP) in the non-active area (NA). For example, the m outermost X-touch electrodes (X11, X21, X31, X41, X51, X61, X18, X28, X38, X48, X58, and X68) in the m X-touch electrode lines (X-TEL-1 to X-TEL-12) may be electrically connected to the m X-touch pads (X-TP) through the m X-touch routing lines (X-TL-1 to X-TL-6 and X-TL-7 to X-TL-12). The n outermost Y-touch electrodes (Y71, Y72, Y73, Y74, Y75, and Y76) in the n Y-touch electrode lines (Y-TEL-1 to Y-TEL-6) may be electrically connected to the n Y-touch pads (Y-TP) through the n Y-touch routing lines (Y-TL-1 to Y-TL-6).

The m X-touch routing lines (X-TL-1 to X-TL-12) may be connected to or extended from them outermost X-touch electrodes (X11, X21, X31, X41, X51, X61, X18, X28, X38, X48, X58, and X68), and may pass over the side of the encapsulation layer (ENCAP) and the top of at least one dam (DAM) to thus be electrically connected to the m X-touch pads (X-TP) in the non-active area (NA). In addition, the n Y-touch electrode connecting lines (Y-CL-1 to Y-CL-6) may be connected to or extended from the n outermost Y-touch electrodes (Y71, Y72, Y73, Y74, Y75, and Y76), and may pass over the side of the encapsulation layer (ENCAP) and the top of at least one dam (DAM) to thus be electrically connected to the n Y-touch pads (Y-TP) in the non-active area (NA).

With reference to the example of FIGS. 18 and 19, the first X-touch electrodes (X11, X21, X31, X41, X51, and X61) at the outermost positions on one side, among a plurality of first X-touch electrodes included in the (m/2) first X-touch electrode lines (X-TEL-1 to X-TEL-6), may have an area smaller than that of the first X-touch electrodes (X12, X13, X22, X23, X32, X33, X42, X43, X52, X53, X62, and X63), which may not be at the outermost positions.

In addition, the second X-touch electrodes (X18, X28, X38, X48, X58, and X68) at the outermost positions on the other side, among a plurality of second X-touch electrodes included in the (m/2) second X-touch electrode lines (X-TEL-7 to X-TEL-12), may have an area smaller than that of the second X-touch electrodes (X16, X17, X26, X27, X36, X37, X46, X47, X56, X57, X66, and X67), which may not be at the outermost positions. For example, the area of the first X-touch electrodes (X11, X21, X31, X41, X51, and X61) at the outermost positions on one side, among the plurality of first X-touch electrodes, may be half, or almost half (e.g., slightly greater or smaller than the half of), the area of the first X-touch electrodes (X12, X13, X22, X23, X32, X33, X42, X43, X52, X53, X62, and X63), which may not be at the outermost positions.

In addition, the area of the second X-touch electrodes (X18, X28, X38, X48, X58, and X68) at the outermost positions on the other side, among the plurality of second X-touch electrodes, may be half, or almost half (e.g., slightly greater or smaller than the half of), the area of the second X-touch electrodes (X16, X17, X26, X27, X36, X37, X46, X47, X56, X57, X66, and X67), which may not be at the outermost positions. For example, the shape of the first X-touch electrode (X12, X13, X22, X23, X32, X33, X42, X43, X52, X53, X62, or X63), which may not be at the outermost position, may be a quadrilateral, such as a square or rhombus, or a hexagon, and the shape of the first X-touch electrode (X11, X21, X31, X41, X51, or X61) at the outermost position may be a square, a triangle obtained by symmetrically dividing a square, or a triangle obtained by symmetrically dividing a hexagon, a pentagon, or the like. The first X-touch electrode may be designed in various shapes, as well as the shapes described above.

In addition, for example, the shape of the second X-touch electrode (X16, X17, X26, X27, X36, X37, X46, X47, X56, X57, X66, or X67), which may not be at the outermost positions, may be a quadrilateral, such as a square or a rhombus, or a hexagon, and the shape of the second X-touch electrode (X18, X28, X38, X48, X58, or X68) at the outermost position may be a square, a triangle obtained by symmetrically dividing a square, or a triangle obtained by symmetrically dividing a hexagon, a pentagon, or the like. The second X-touch electrodes may be designed in various shapes, as well as the shapes described above.

At least one Y-touch electrode (Y11, Y12, Y13, Y14, Y15, Y16, Y71, Y72, Y73, Y74, Y75, or Y76) at the outermost position, among a plurality of Y-touch electrodes included in the n Y-touch electrode lines (Y-TEL-1 to Y-TEL-6), may have an area smaller than that of the Y-touch electrode (Y21, Y22, or the like), which may is not be at the outermost position. For example, the area of the least one Y-touch electrode (Y11, Y12, Y13, Y14, Y15, Y16, Y71, Y72, Y73, Y74, Y75, or Y76) at the outermost position may be half, or almost half, the area of the Y-touch electrode (Y21, Y22, or the like), which may not be at the outermost position.

For example, the shape of the Y-touch electrode (Y21, Y22, or the like), which may not be at the outermost position, may be a quadrilateral, such as a square or a rhombus, or a hexagon, and the shape of the Y-touch electrode (Y11, Y12, Y13, Y14, Y15, Y16, Y71, Y72, Y73, Y74, Y75, or Y76) at the outermost position may be a triangle obtained by symmetrically dividing a square, a square, a square obtained by symmetrically dividing a hexagon, a pentagon, or the like. The Y-touch electrodes may be designed in various shapes, as well as the shapes described above.

According to the two-separation area structure in FIGS. 18 and 19, the first X-touch electrodes (X14, X24, X34, X44, X54, and X64) at the boundary with the second touch area (TB), among a plurality of first X-touch electrodes arranged in the first touch area (TA), may have an area smaller than that of other first X-touch electrodes (X12, X13, and the like), which may not be at the outermost positions. The second X-touch electrodes (X15, X25, X35, X45, X55, and X65) at the boundary with the first touch area (TA), among a plurality of second X-touch electrodes in the second touch area (TB), may have an area smaller than that of other second X-touch electrodes (X16, X17, or the like), which may not be at the outermost positions. For example, the area of the first X-touch electrode (X14, X24, X34, X44, X54, or X64) at the boundary with the second touch area (TB), among a plurality of first X-touch electrodes in the first touch area (TA), may be half, or almost half (slightly greater or smaller than the half of), the area of other first X-touch electrodes (X12, X13, and the like), which may not be at the outermost positions. Similarly, the area of the second X-touch electrode (X15, X25, X35, X45, X55, or X65) at the boundary with the first touch area (TA), among a plurality of second X-touch electrodes in the second touch area (TB), may be half, or almost half (e.g., slightly greater or smaller than the half of), the area of other second X-touch electrodes (X16, X17, and the like), which may not be at the outermost positions.

The imbalance in the area between the touch electrodes may reduce the capacitance and a variation thereof, thereby degrading the touch sensitivity. For example, the first X-touch electrodes (X14, X24, X34, X44, X54, and X64) having a small area, which may be located at the boundary with the second touch area (TB), among a plurality of first X-touch electrodes located in the first touch area (TA), may exhibit a small capacitance with the Y-touch electrodes and a small variation thereof, compared to the first X-touch electrodes having a large area, which may not be located at the boundary. This may degrade the touch sensitivity.

In addition, the second X-touch electrodes (X15, X25, X35, X45, X55, and X65) having a small area, which may be located at the boundary with the first touch area (TA), among a plurality of second X-touch electrodes located in the second touch area (TB), may exhibit a small capacitance with the Y-touch electrodes and a small variation thereof, compared to the second X-touch electrodes having a large area, which may not be located at the boundary. This may degrade the touch sensitivity.

As described above, to reduce or prevent the capacitance between the X-touch electrode and the Y-touch electrode and a variation thereof from being lowered due to the imbalance in the area between the first and second X-touch electrodes (X14, X24, X34, X44, X54, X64, X15, X25, X35, X45, X55, and X65), which may be located around the boundary between the two separated areas, and the first and second X-touch electrodes (X12, X13, X16, X17, and the like), which may not be located around the boundary, and to reduce or prevent the touch sensitivity from deteriorating according thereto, a touch sensor structure capable of resolving the imbalance in the area between the touch electrodes and increasing the capacitance between the X-touch electrode and the Y-touch electrode and a variation thereof, thereby improving the touch sensitivity, will be described below.

Figure 20:
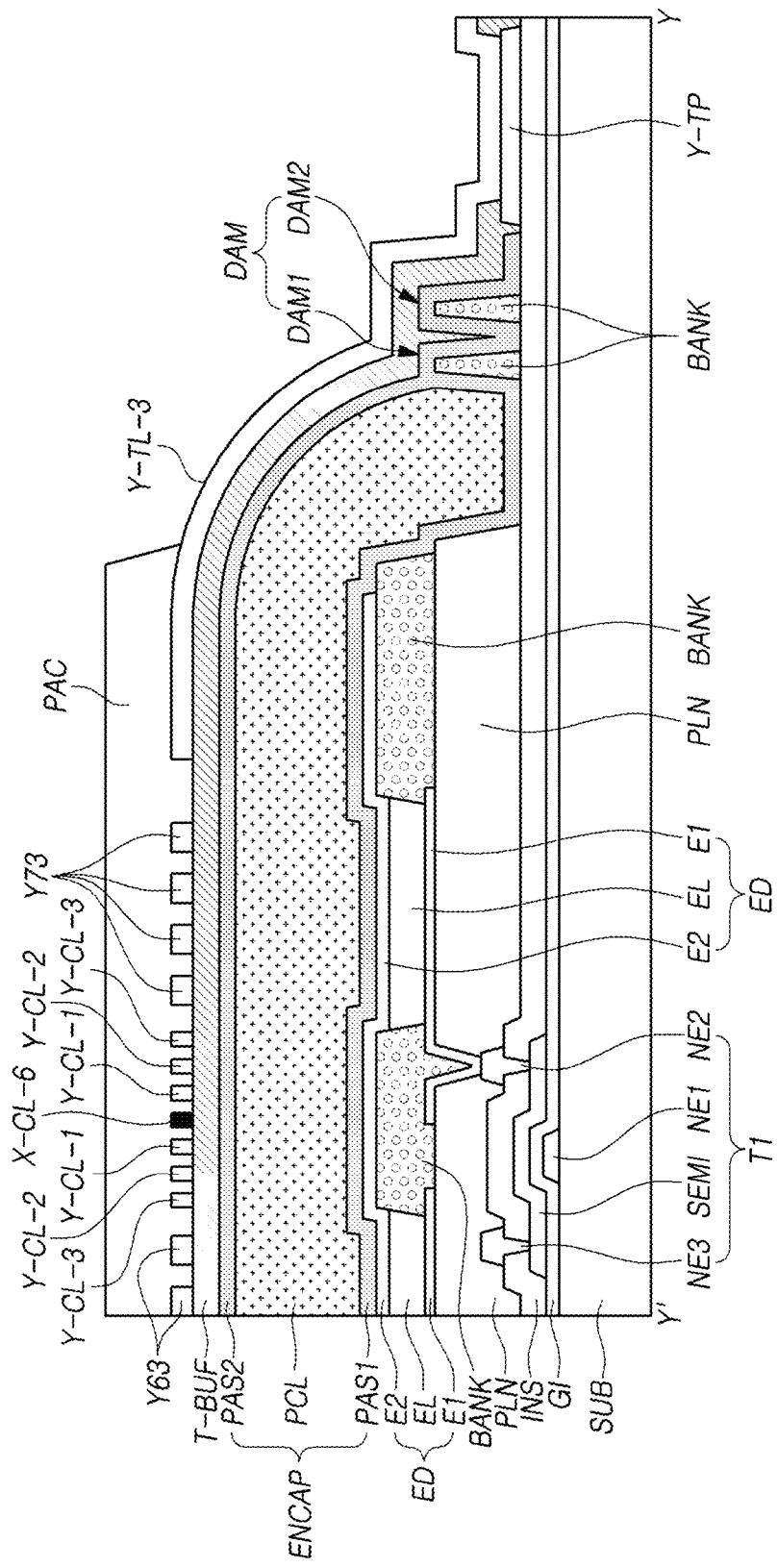
FIG. 20 illustrates a cross-sectional view, taken along line Y-Y' in FIG. 18, of a display panel having a single-layered touch sensor structure according to an embodiment of the present disclosure.

FIG. 20 illustrates a cross-sectional view, taken along line Y-Y' in FIG. 18, of a display panel having a single-layered touch sensor structure according to an embodiment of the present disclosure.

The display panel (DISP) according to an embodiment of the present disclosure may include an encapsulation layer (ENCAP) on the light-emitting device (ED) included in each of the plurality of subpixels (SP). Like the multi-layered touch sensor structure, the single-layered touch sensor structure may be located on the encapsulation layer (ENCAP). For example, m X-touch electrode lines (X-TEL-1 to X-TEL-12) and n Y-touch electrode lines (Y-TEL-1 to X-TEL-6) may be in a single layer located on the encapsulation layer (ENCAP).

According to the example shown in FIG. 20, the X-touch electrode connecting lines (X-CL-6) included in the X-touch electrode line (X-TEL-6) of the m X-touch electrode lines (X-TEL-1 to X-TEL-12), the Y-touch electrodes (Y73 and Y63) included in the Y-touch electrode line (Y-TEL-3) of the n Y-touch electrode lines (Y-TEL-1 to Y-TEL-6), and the Y-touch electrode connecting lines (Y-CL-1, Y-CL-2, and Y-CL-3) located therebetween may be provided in the same layer on the encapsulation layer (ENCAP). As described above, by providing a touch sensor structure in a single layer on the encapsulation layer (ENCAP), it may be possible to reduce the number of mask processes, thereby simplifying the manufacturing process, and to design a thinner structure. The cross-section of the single-layered touch sensor structure will be described in more detail below.

With reference to the example of FIG. 20, in the case of a display panel (DISP) having a single-layered touch sensor structure according to an embodiment of the present disclosure, the substrate (SUB) through the touch buffer film (T-BUF) may be formed in a substantially similar manner as the structure shown in the cross-sectional view of FIG. 9.

A touch insulating film (ILD) may be on the touch buffer film (T-BUF), as shown in the example of FIG. 9. Alternatively, the touch insulating film (ILD) may not be on the touch buffer film (T-BUF), as shown in the example of FIG. 20.

With reference to the example of FIG. 20, on the touch buffer film (T-BUF), two mesh-type Y-touch electrodes (Y63 and Y73) having openings, the Y-touch electrode connecting line (Y-CL-3) for electrically connecting two Y-touch electrodes (Y63 and Y73), and the Y-touch electrode connecting lines (Y-CL-1 and Y-CL-2) around the same may be provided in the same layer. The X-touch electrode connecting line (X-CL-6) for electrically connecting two X-touch electrodes (X63 and X64), which may be positioned between two Y-touch electrodes (Y63 and Y73) on the plan view, may also be provided in the same layer. Further, the Y-touch routing line (Y-TL-3) connected to the Y-touch electrode (Y73) arranged at the outermost position, among the two Y-touch electrodes (Y63 and Y73), may be provided in the same layer. As described above, all the touch sensor metals (TSM) may be located in the same layer, thereby implementing a single-layered touch sensor structure.

With further reference to the example of FIG. 20, the Y-touch line (Y-TL-3) may be directly or indirectly connected to the Y-touch pad (Y-TP) by passing over the dam (DAM) along the touch buffer film (T-BUF). With additional reference to the example of FIG. 20, a touch protection layer (PAC) may be on the layer in which the touch sensor metal (TSM) is provided. In some cases, the touch protection film (PAC) may be omitted.

With reference to the examples of both FIG. 18 and FIG. 20, the m X-touch routing lines (X-TL-1 to X-TL-12) may be connected to the m outermost X-touch electrodes (X11, X21, X31, X41, X51, X61, X18, X28, X38, X48, X58, and X68), and may be electrically connected to the m X-touch pads (X-TP) in the non-active area (NA) by passing over the side of the encapsulation layer (ENCAP) and the tops of one or more dams (DAM1) and (DAM2). In addition, the n Y-touch routing lines (Y-TL-1 to Y-TL-6) may be connected to the n outermost Y-touch electrodes (Y71, Y72, Y73, Y74, Y75, and Y76), and may be electrically connected to the n Y-touch pads (Y-TP) in the non-active area (NA) by passing over the side of the encapsulation layer (ENCAP) and the tops of one or more dams (DAM1 and DAM2).

With further reference to the example of FIG. 20, the encapsulation layer (ENCAP) may have a multi-layered structure, including two or more inorganic encapsulation layers (PAS1 and PAS2), and one or more organic encapsulation layers (PCL) between the two or more inorganic encapsulation layers (PAS1 and PAS2). The one or more organic encapsulation layers (PCL) included in the encapsulation layer (ENCAP) may be at one side of at least one dam (DMA), or may be at one side and top of at least one dam (DAM). According to the above structure, one or more dams (DMA) may avoid or prevent the encapsulation layer (ENCAP) and the organic encapsulation layer (PCL) thereof from collapsing.

The cross-sectional view of FIG. 20 shows a conceptual structure. Thus, the positions, thicknesses, or widths of the respective patterns (respective layers or respective electrodes) may vary depending on the viewing directions or positions; connection structures of the respective patterns may vary; other layers may be further provided in addition to the illustrated layers; and some of the illustrated layers may be omitted or integrated. For example, the relative width of the bank (BANK) may be smaller than that illustrated in the drawing, and the relative height of the dam (DAM) may be less or more than that illustrated in the drawing.

Figure 21:
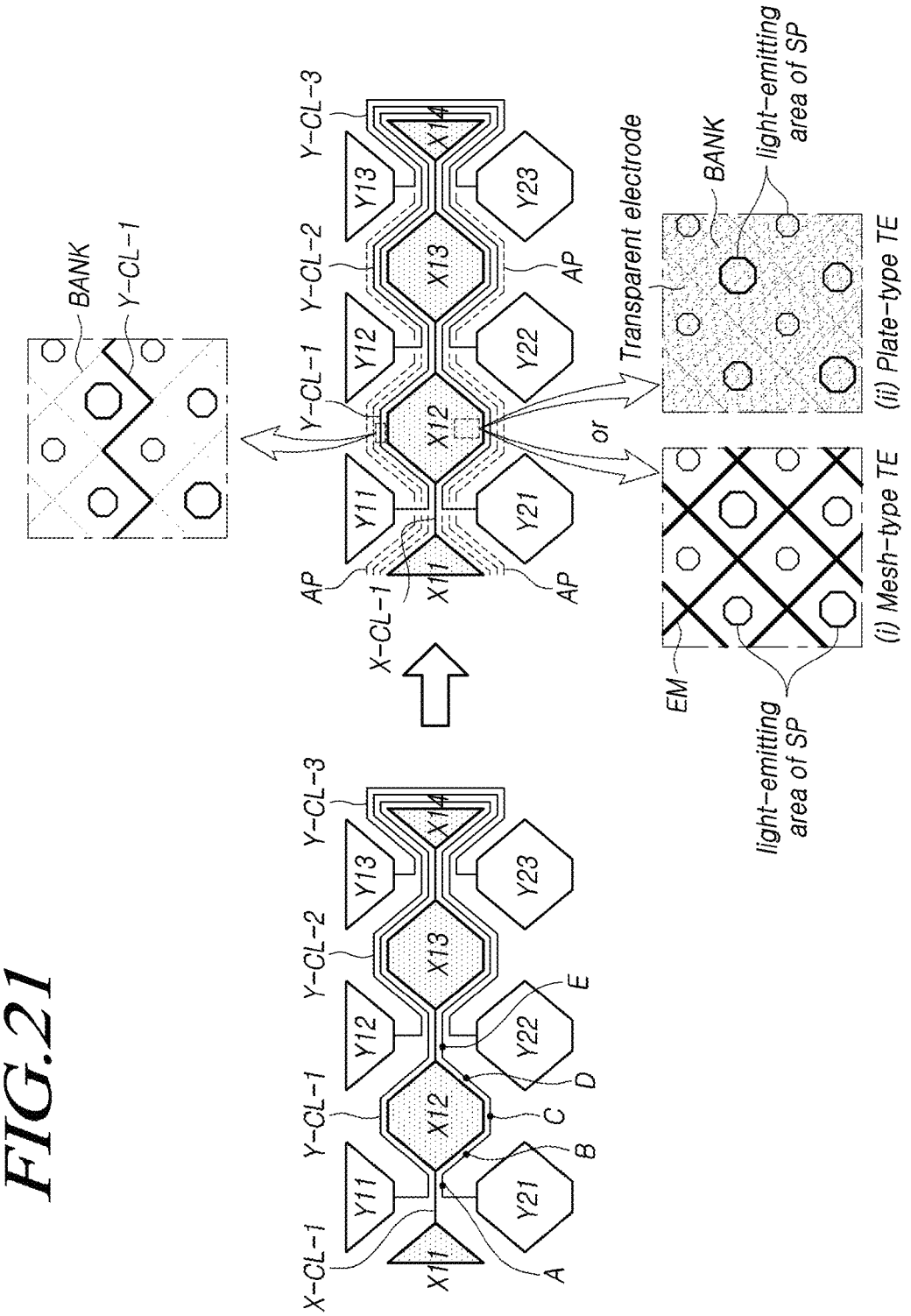
FIG. 21 illustrates additional patterns arranged in a blank area in a display panel having a single-layered touch sensor structure according to an embodiment of the present disclosure.

FIG. 21 illustrates additional patterns arranged in a blank area in a display panel having a single-layered touch sensor structure according to an embodiment of the present disclosure.

The FIG. 21 example shows an area where four X-touch electrodes (X11, X12, X13, and X14) and six Y-touch electrodes (Y11, Y12, Y13, Y21, Y22, and Y23) are in the single-layered touch sensor structures shown in the example of FIG. 16, or the like. With reference to the example of FIG. 21, the four X-touch electrodes (X11, X12, X13, and X14)

included in the first X-touch electrode line (X-TEL-1) may have an electrical connection through the X-touch electrode connecting lines (X-CL-1).

With further reference to the example of FIG. 21, the Y-touch electrodes (Y11 and Y21) included in the first Y-touch electrode line (Y-TEL-1) may be electrically connected through the first Y-touch electrode connecting line (Y-CL-1). The Y-touch electrodes (Y12 and Y22) included in the second Y-touch electrode line (Y-TEL-2) may be electrically connected through the second Y-touch electrode connecting line (Y-CL-2). The Y-touch electrodes (Y13 and Y23) included in the third Y-touch electrode line (Y-TEL-3) may be electrically connected through the third Y-touch electrode connecting line (Y-CL-3).

With additional reference to the example of FIG. 21, the four X-touch electrodes (X11, X12, X13, and X14) included in the first X-touch electrode line (X-TEL-1) may have a blank area therearound, where no Y-touch electrode connecting line may be provided. One or more additional patterns (AP) may be in the blank area. The additional patterns (AP) may be remnants formed when other touch electrode connecting lines (Y-CL-1, Y-CL-2, and Y-CL-3) may be provided.

It may be possible to improve the touch sensing performance by forming the additional patterns (AP) in the blank area, as described above, and by applying various voltages to the additional patterns (AP). For example, it may be possible to reduce the influence of noise on the touch electrodes or to equalize the surrounding electrical environments of all touch electrodes by driving the additional patterns (AP).

With more reference to the example of FIG. 21, the numbers of Y-touch electrode connecting lines arranged around the four X-touch electrodes (X11, X12, X13, and X14) included in the first X-touch electrode line (X-TEL-1) may be different from each other. For example, no Y-touch electrode connecting line may be arranged around the X-touch electrode (X11). One Y-touch electrode connecting line (Y-CL-1) may be arranged around the X-touch electrode (X12). Two Y-touch electrode connecting lines (Y-CL-1 and Y-CL-2) may be arranged around the X-touch electrode (X13). Three Y-touch electrode connecting lines (Y-CL-1, Y-CL-2, and Y-CL-3) may be arranged around the X-touch electrode (X14).

As described above, the numbers of additional patterns (AP) in the blank area around the four X-touch electrodes (X11, X12, X13, and X14) included in the first X-touch electrode line (X-TEL-1) may be different from each other, depending on the different numbers of Y-touch electrode connecting lines arranged around the four X-touch electrodes (X11, X12, X13, and X14) included in the first X-touch electrode line (X-TEL-1).

For example, three additional patterns (AP) may be arranged around the X-touch electrode (X11). Two additional patterns (AP) may be arranged around the X-touch electrode (X12). One additional pattern (AP) may be arranged around the X-touch electrode (X13). No additional pattern (APs) may be arranged around the X-touch electrode (X14). Accordingly, it may be possible to equalize the surrounding environments of the respective X-touch electrodes (X11, X12, X13, and X14).

One or more additional patterns (AP) may be in a voltage state corresponding to a touch driving signal or a touch sensing signal, may be in a voltage state in which a ground voltage or a specific voltage is applied, or may be in a floating voltage state. In addition, one or more additional patterns (AP) may be in various electrical states for improving the touch sensing performance. For example, one or more additional patterns (AP) may be electrically connected to the Y-touch electrode connecting lines or the X-touch electrode connecting lines arranged therearound to be in the voltage state corresponding to a touch driving signal or a touch sensing signal.

The touch sensing performance may be improved by control of the electrical states of the additional patterns (AP). For example, it may be possible to reduce the influence of noise on the touch electrodes or to equalize the surrounding electrical environments of the respective X-touch electrodes by driving the additional patterns (AP).

As described above, each of the touch electrodes (X11, X12, X13, X14, Y11, Y12, Y13, Y21, Y22, and Y23) may be a mesh-type touch electrode (TE), or may be a plate-type touch electrode (TE). In the case of a mesh-type touch electrode (TE), the respective touch electrodes (X11, X12, X13, X14, Y11, Y12, Y13, Y21, Y22, and Y23) may be patterned in the form of a mesh, thereby obtaining an electrode metal (EM) having two or more openings (OA).

Each of the two or more openings (OA) may correspond to a light-emitting area of one or more subpixels (SP). The electrode metal (EM) corresponding to each of the touch electrodes (X11, X12, X13, X14, Y11, Y12, Y13, Y21, Y22, and Y23) may be on the bank (BANK) in an area other than the light-emitting area of two or more subpixels (SP).

In the case of a plate-type touch electrode, the respective touch electrodes (X11, X12, X13, X14, Y11, Y12, Y13, Y21, Y22, and Y23) may be transparent electrodes. In this case, each of the touch electrodes (X11, X12, X13, X14, Y11, Y12, Y13, Y21, Y22, and Y23) may be on the light-emitting area of the subpixels (SP), or may be on the bank (BANK). A plurality of Y-touch electrode connecting lines (Y-CL-1 to Y-CL-3) may be on the bank (BANK) in the area other than the light-emitting area of a plurality of subpixels (SP).

A plurality of first X-touch electrode connecting lines and a plurality of second X-touch electrode connecting lines for electrically connecting the touch electrodes (X-TE) to each other, as well as the plurality of Y-touch electrode connecting lines (Y-CL-1 to Y-CL-3), may be on the bank (BANK). Accordingly, even if the X-touch electrode connecting lines for connecting the X-touch electrodes (X-TE) to each other and the Y-touch electrode connecting lines for connecting the Y-touch electrodes (Y-TE) to each other are in the active area (AA), they may not degrade the light-emitting performance of the display panel (DISP) because they may be positioned on the bank (BANK).

The X-touch electrode connecting lines for connecting the X-touch electrodes (X-TE) and the Y-touch electrode connecting lines for connecting the Y-touch electrodes (Y-TE) may vary depending on the shape of the bank (BANK). For example, if the bank (BANK) has a sawtooth shape, the X-touch electrode connecting lines for connecting the X-touch electrodes (X-TE) and the Y-touch electrode connecting lines for connecting the Y-touch electrodes (Y-TE) may also have a sawtooth shape.

As described above, the Y-touch electrode connecting lines (Y-CL-1) for electrically connecting a plurality of Y-touch electrodes (Y11 and Y21) in the second direction may be in the same layer as a plurality of X-touch electrode connecting lines (X-CL-1) for electrically connecting a plurality of X-touch electrodes (X11, X12, X13, and X14) in the first direction.

The Y-touch electrode connecting lines (Y-CL-1) for electrically connecting a plurality of Y-touch electrodes (Y11 and Y21) in the second direction may include portions (A and E) in parallel with a plurality of X-touch electrode connecting lines (X-CL-1), and portions (B, C, and D) in parallel with the outlines of a plurality of X-touch electrodes (X11, X12, X13, and X14) in the first direction. According to the above structure, it may be possible to design the touch sensor structure as a single layer and to design the touch sensor structure having space utilization optimized on a plane.

Figure 22:
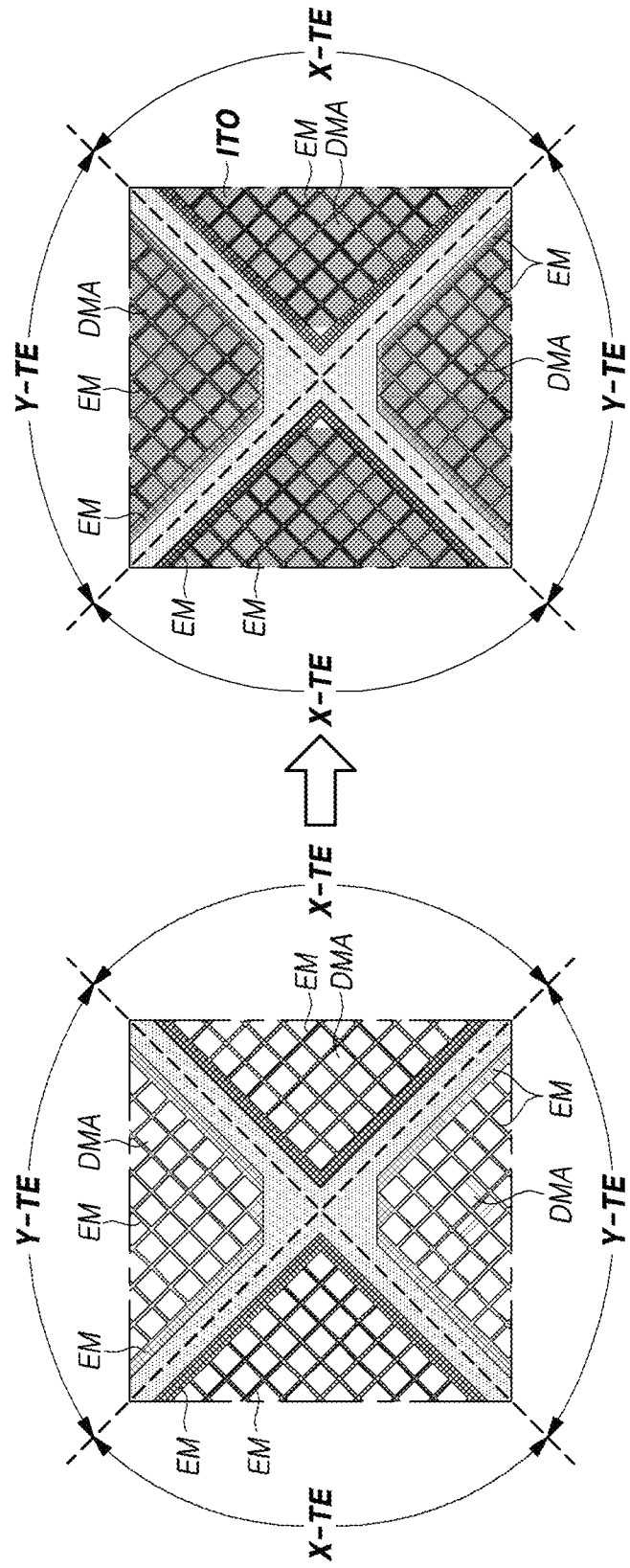
FIGS. 22 to 24 illustrate examples of a transparent electrode arranged in a touch electrode area in the display panel according to an embodiment of the present disclosure.
Figure 23:
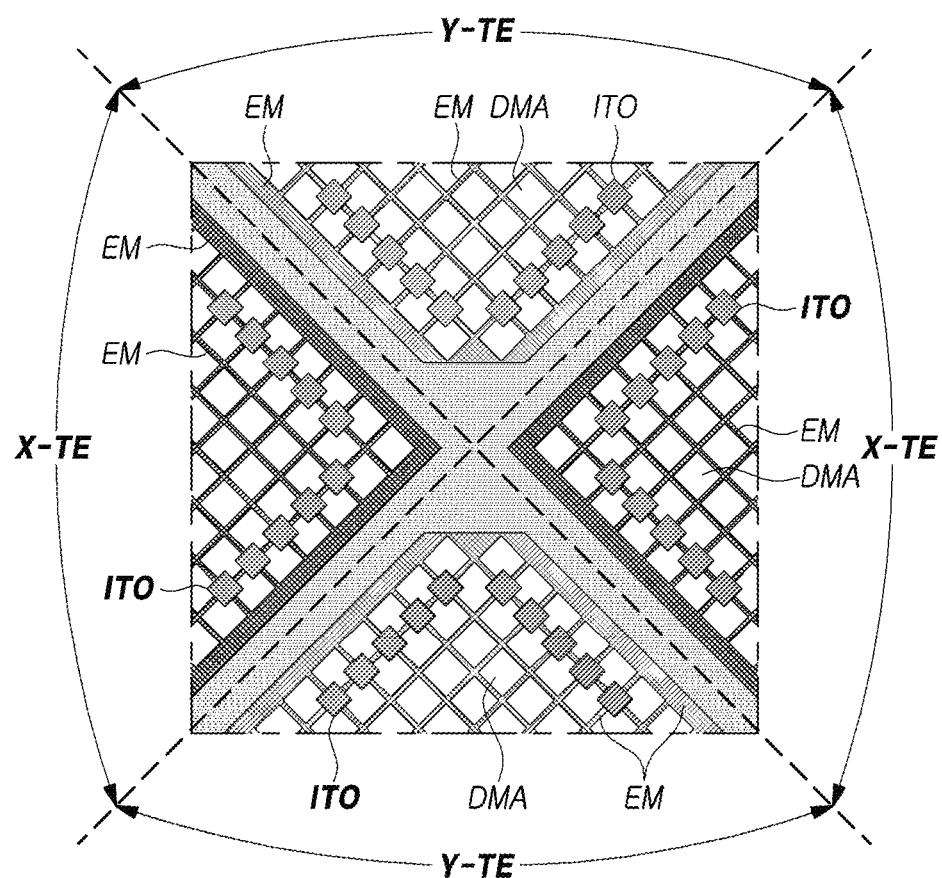
Figure 24:
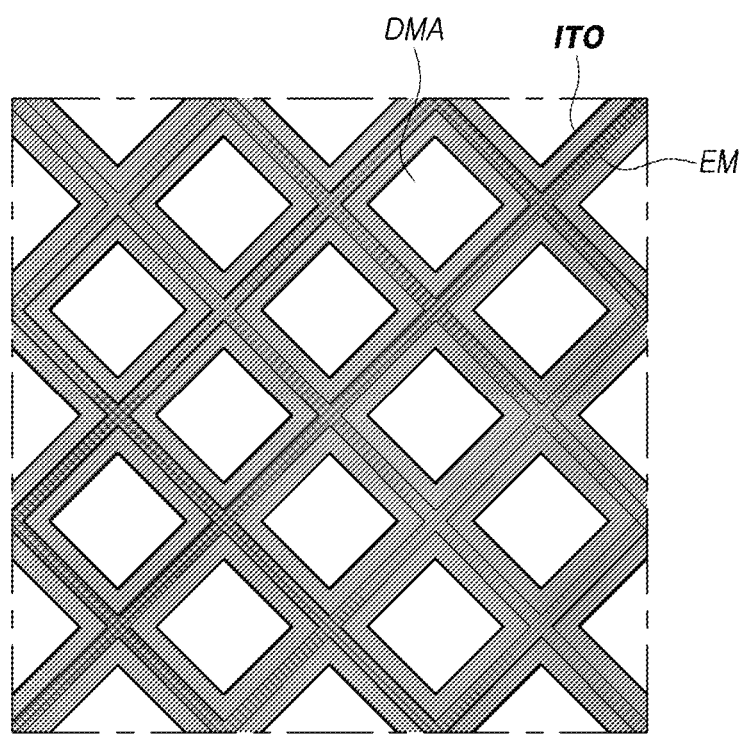

FIGS. 22 to 24 illustrate examples of a transparent electrode arranged in a touch electrode area in the display panel according to an embodiment of the present disclosure.

FIG. 22 shows an area where two X-touch electrodes (X-TE) and two Y-touch electrodes (Y-TE) cross each other. Each of the two X-touch electrodes (X-TE) and two Y-touch electrodes (Y-TE) illustrated in FIG. 22 may be an electrode metal (EM) patterned as a mesh, and may have dummy metals (DM) therein. However, the dummy metals (DM) may be omitted; the area where the dummy metals (DM) are omitted is denoted as a dummy metal area (DMA) in FIG. 22.

With reference to the example of FIG. 22, transparent electrodes (ITO) may be formed in the entire touch electrode area where the X-touch electrodes (X-TE) and the Y-touch electrodes (Y-TE) may be provided. With reference to the example of FIG. 23, the transparent electrodes (ITO) may be provided only in the partial area in the form of an island, instead of the entire touch electrode area where the X-touch electrodes (X-TE) and the Y-touch electrodes (Y-TE) are provided. With reference to the example of FIG. 24, the transparent electrodes (ITO) may be provided as a mesh along the electrode metal (EM) in the touch electrode area where the X-touch electrodes (X-TE) and the Y-touch electrodes (Y-TE) are provided.

For example, with reference to the examples of FIGS. 22 to 24, the respective touch electrodes (X-TE and Y-TE) may have a multi-layered structure, and the transparent electrodes (ITO) may be patterned in various forms and provided on or under the electrode metal (EM). Accordingly, when the effective area of the X-touch electrode (X-TE) and the Y-touch electrode (Y-TE) generating the mutual capacitance may be increased, it may be possible to change the mutual capacitance and a variation thereof, thereby improving the touch sensitivity.

Figure 25:
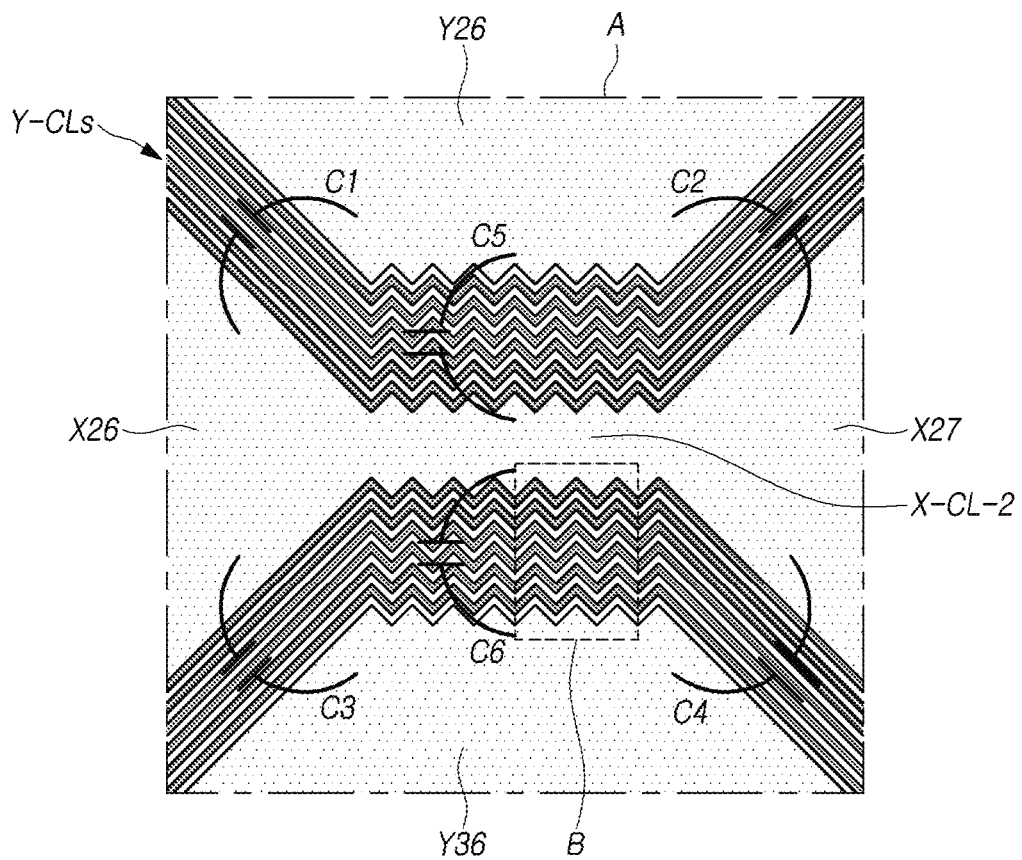
FIG. 25 illustrates an embodiment of a first area in a touch display device shown in FIG. 16 according to an embodiment of the present disclosure.
Figure 26:
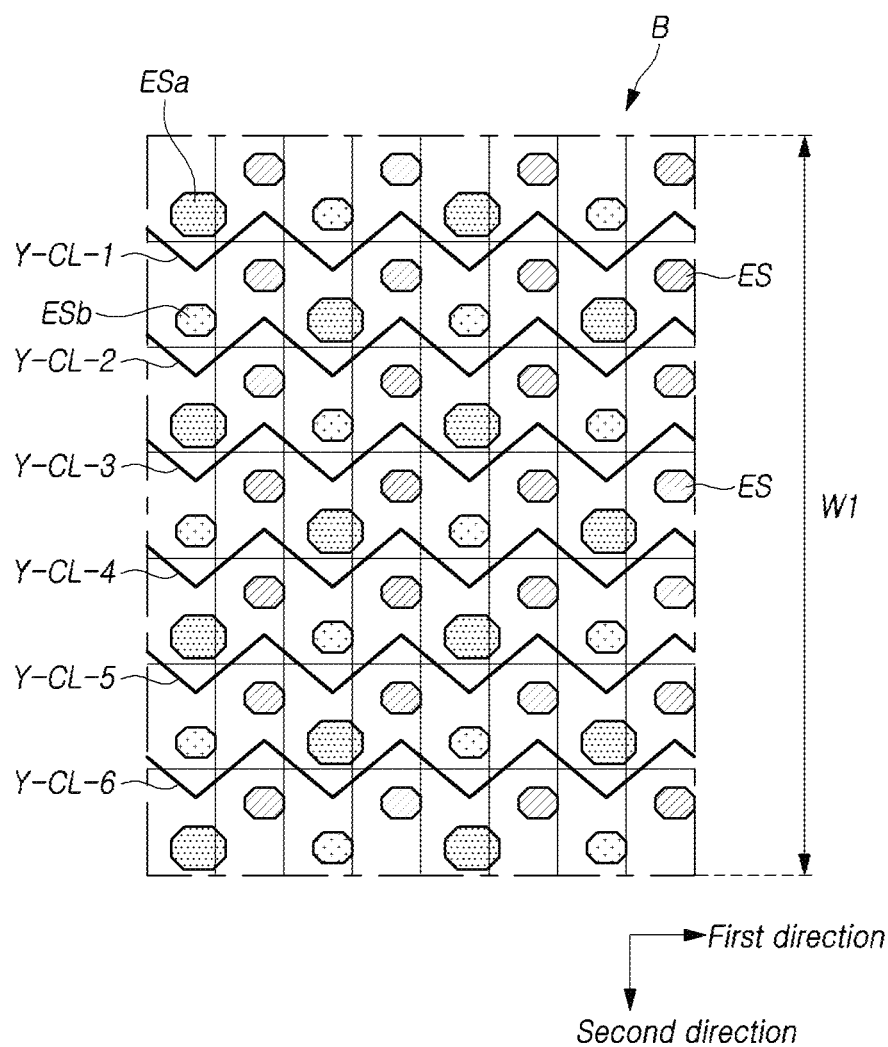
FIG. 26 illustrates an embodiment of a second area in which Y-touch electrode pattern lines are arranged in a first area.
Figure 27:
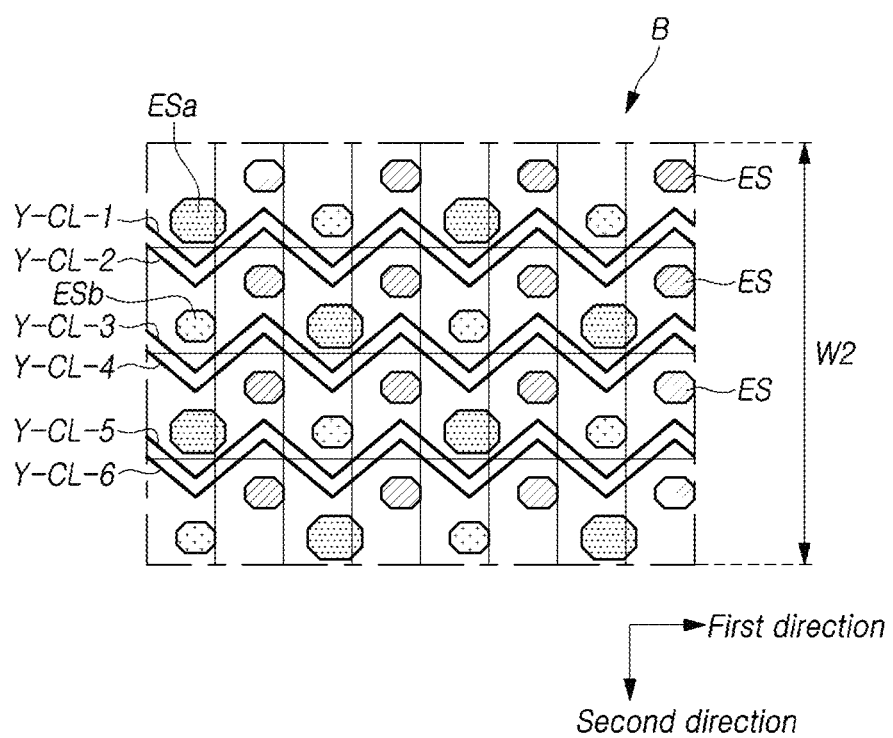
FIG. 27 illustrates another embodiment of a second area in which Y-touch electrode pattern lines are arranged in a first area.

FIG. 25 illustrates an embodiment of a first area in a touch display device shown in FIG. 16 according to an embodiment of the present disclosure. FIG. 26 illustrates an embodiment of a second area in which Y-touch electrode pattern lines are arranged in a first area. FIG. 27 illustrates another embodiment of a second area in which Y-touch electrode pattern lines are arranged in a first area.

With reference to the example of FIG. 25, the X-touch electrode line (X-TEL-2) and the Y-touch electrode line (Y-TEL-6) may intersect each other in the first area (A). In the first area (A), the X-touch electrode line (X-TEL-2) may include X-touch electrodes (X26 and X27), and the Y-touch electrode line (Y-TEL-6) may include Y-touch electrodes (Y26 and Y36). In addition, the X-touch electrode connecting line (X-CL-2) and the Y-touch electrode connecting lines (Y-CLs) may be in the first area (A). The X-touch electrode connecting line (X-CL-2) may connect the X-touch electrodes (X26 and X27). The Y-touch electrode connecting lines (Y-CLs) may connect the Y-touch electrodes (Y26 and Y36), and may connect another Y-touch electrode line. In addition, the Y-touch electrode connecting lines (Y-CLs) may bypass the X-touch electrodes (X26 and X27) in the first area (A). The X-touch electrode connecting line (X-CL-2) and a plurality of Y-touch electrode connecting lines (Y-CLs) may not intersect each other.

The area where the X-touch electrodes (X26 and X27) and the Y-touch electrodes (Y26 and Y36) are not provided in the first area (A) may be referred to as a "dead zone." In this case, the second area (B) may include a part of the dead zone. A plurality of Y-touch electrode connecting lines (Y-CLs) connecting the Y-touch electrodes (Y26-and Y36) may be arranged in the dead zone. Although six Y-touch electrode connecting lines (Y-CLs) are illustrated in the drawing, the number of Y-touch electrode connecting lines (Y-CLs) is not limited thereto. In addition, what can be provided in the dead zone is not limited to the plurality of Y-touch electrode connecting lines (Y-CLs). For example, the additional patterns (AP) shown in the FIG. 21 example may be provided in the dead zone. Although the Y-touch electrodes (Y26 and Y36) are not connected to the Y-touch electrode connecting lines (Y-CLs) in the drawing for convenience of illustration, a Y-touch electrode connecting line (Y-CL-6) nearest to the Y-touch electrodes (Y26 and Y36), among the plurality of Y-touch electrode connection lines (Y-CLs), may be connected to the Y-touch electrodes (Y26 and Y36). In addition, the remaining Y-touch electrode connecting lines may bypass the X-touch electrodes (X26 and X27), and may connect the Y-touch electrodes included in the Y-touch electrode lines, other than the Y-touch electrode line (Y-TEL-6).

First to fourth capacitors (C1 to C4) may be between the X-touch electrodes (X26 and X27) and the Y-touch electrodes (Y26 and Y36) in the first area (A). In addition, fifth and sixth capacitors (C5 and C6) may be between the X-touch electrode connecting line (X-CL-2) and the Y-touch electrodes (Y26 and Y36) in the first area (A).

The X-touch electrodes (X26 and X27) and the Y-touch electrodes (Y26 and Y36) may be provided as a mesh using a plurality of X-touch electrode pattern lines and a plurality of Y-touch electrode pattern lines, respectively. In addition, the Y-touch electrode connecting lines (Y-CLs) may extend along the shape in which the Y-touch electrode pattern lines included in the Y-touch electrodes (Y26 and Y36) are provided. Accordingly, the Y-touch electrode connecting lines (Y-CLs) may include a section in which the lines are provided as a wave in the first area (A). However, the arrangement of the Y-touch electrode connecting lines (Y-CLs) is not limited thereto.

With reference to the example of FIG. 26, a plurality of Y-touch electrode connecting lines (Y-CLs) may be in the second area (B), which may be a part of the dead zone. Although six Y touch electrode connecting lines (Y-CLs) are illustrated in the drawing, embodiments are not limited thereto. A plurality of Y-touch electrode connecting lines (Y-CLs) may extend in the first direction, and may be spaced a certain distance apart from each other in the second direction. The Y-touch electrode connecting lines (Y-CLs) may be between the light-emitting surfaces (ES) corresponding to a plurality of subpixels. For example, the plurality of subpixels may include a plurality of light-emitting surfaces surrounded by banks. The light-emitting surface (ES) may emit a light of red, green, or blue. However, the light is not limited thereto. Further, the area of the light-emitting surface (ES) may correspond to the color of the emitted light. The Y-touch electrode connecting lines (Y-CLs) may be arranged to avoid overlapping the light-emitting surface (ES), thereby avoiding or preventing a reduction in the aperture ratio of the light-emitting surface (ES). The Y-touch electrode connection lines (Y-CLs) may correspond to the shapes of the X-touch electrodes (X26 and X27) and the Y-touch electrodes (Y26 and Y36). To arrange the Y-touch electrode connection lines (Y-CLs) to avoid overlapping the light-emitting surfaces (ES), the Y-touch electrode connection lines (Y-CLs) may be on the bank (BANK).

One Y-touch electrode connecting line (Y-CL-1) may be between one light-emitting surface (ESa) and another light-emitting surface (ESb), which may be adjacent to each other in the second direction. In addition, another Y-touch electrode connecting line (Y-CL-2) may be provided with one Y-touch electrode connecting line (Y-CL-1) in the second direction with the light-emitting surface (ES) interposed therebetween. The interval between the plurality of Y-touch electrode connecting lines (Y-CLs) may be the same as the interval between the X-touch electrode pattern lines of the X-touch electrodes (X26 and X27) or the Y-touch electrode pattern lines of the Y-touch electrodes (Y26 and Y36). Here, when the interval between the connecting lines is the same as the interval between the electrode pattern lines may include the case when the interval between the connecting lines is similar to the interval between the electrode pattern lines within a predetermined difference, as well when the interval between the connecting lines is completely identical to the interval between the electrode pattern lines.

If the X-touch electrodes (X26 and X27), the Y-touch electrodes (Y26 and Y36), the X-touch electrode connecting line (X-CL-2) for connecting the X-touch electrodes (X26 and X27), and the Y-touch electrode connecting lines (Y-CLs) for connecting the Y-touch electrodes (Y26 and Y36) are in a single layer, the number of Y-touch electrode connecting lines (Y-CLs) bypassing the X-touch electrode line (X-TEL-2) may be increased to correspond to the Y-touch electrode lines in the display panel. Therefore, for example, in the case of a large screen, the number of Y-touch electrode connecting lines (Y-CL) bypassing the X-touch electrode line may be increased due to the increase in the number of Y-touch electrode lines, thereby causing a problem in which the size of the dead zone may be increased.

To solve the above problem, the interval between the Y-touch electrode connecting lines (Y-CLs) may be narrowed to realize a small area of the dead zone. However, the method of realizing a small area of the dead zone is not limited thereto.

With reference to the example of FIG. 27, two Y-touch electrode connecting lines (Y-CL-1 and Y-CL-2) may be on the bank (BANK). The arrangement of two Y-touch electrode connecting lines (Y-CL-1 and Y-CL-2) on the bank (BANK) may denote that two Y-touch electrode connecting lines (Y-CL-1 and Y-CL-2) are between one light-emitting surface (ESa) and another light-emitting surface (ESb) adjacent thereto in the second direction. When the light-emitting surface (ES) corresponds to one subpixel, two Y-touch electrode connecting lines (Y-CL-1 and Y-CL-2) may be between two neighboring subpixels, among the plurality of subpixels. The width (W2) of the second area (B), in which the plurality of Y-touch electrode connecting lines (Y-CLs) may be provided, may be less than the width (W1) of the second area (B) shown in FIG. 26, thereby reducing the area of the dead zone. When the area of the dead zone is reduced, the sizes of the X-touch electrodes (X26 and X27) and/or the Y-touch electrodes (Y26 and Y36) may be increased. In addition, the distance between the X-touch electrodes (X26 and X27) and the Y-touch electrodes (Y26 and Y36) may be reduced. When the X-touch electrodes (X26 and X27) and the Y-touch electrodes (Y26 and Y36) become larger or closer to each other, the sum of capacitances of the first to sixth capacitors (C1 to C6) becomes larger, thereby increasing touch sensitivity.

Although two Y-touch electrode connecting lines (Y-CL-1 and Y-CL-2) are between one light-emitting surface (ESa) and another light-emitting surface (ESb), which may be adjacent to each other in the second direction, in the drawing, the number of Y-touch electrode connecting lines (Y-CL-1 and Y-CL-2) between one light-emitting surface (ESa) and another light-emitting surface (ESb), which may be adjacent to each other in the second direction, is not limited thereto.

In addition, the interval between the Y-touch electrode connecting lines in all areas on the display panel may be constant. Accordingly, the interval between the Y-touch electrode connecting lines (Y-CLs) and the interval between the X-touch electrode pattern lines may be different from each other. However, the intervals are not limited thereto. Also, the X-touch electrode pattern lines and the Y-touch electrode pattern lines may be on the bank (BANK) in a similar manner as the Y-touch electrode connecting lines (Y-CLs).

Figure 28:
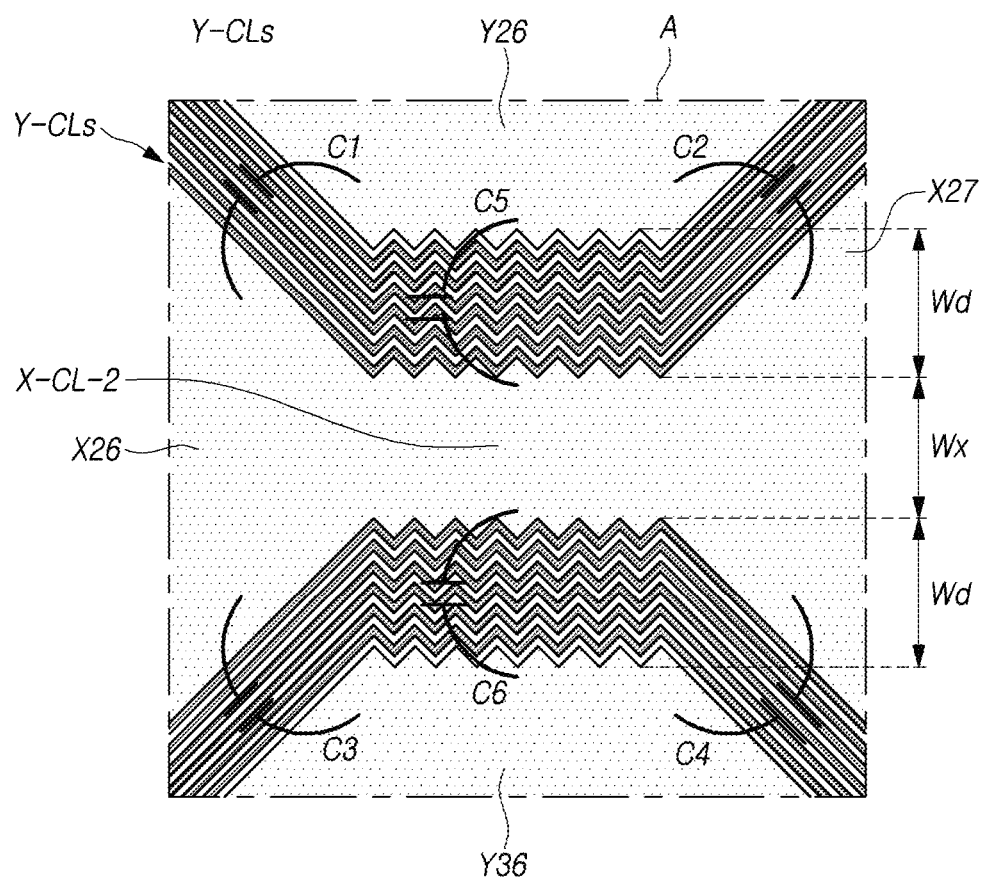
FIG. 28 illustrates another embodiment of a first area in the touch display device shown in FIG. 16 according to an embodiment of the present disclosure.

FIG. 28 illustrates another embodiment of a first area in the touch display device shown in FIG. 16 according to an embodiment of the present disclosure.

With reference to the example of FIG. 28, the X-touch electrode line (X-TEL-2) and the Y-touch electrode line (Y-TEL-6) may intersect each other in the first area (A). In the first area (A), the X-touch electrode line (X-TEL-2) may include X-touch electrodes (X26 and X27), and the Y-touch electrode line (Y-TEL-6) may include Y-touch electrodes (Y26 and Y36). In addition, the X-touch electrode connecting line (X-CL-2) for connecting the X-touch electrodes (X26 and X27) and the Y-touch electrode connecting line (Y-CL-6) for connecting the Y-touch electrodes (Y26 and Y36) may be in the first area (A). Further, the Y-touch electrode connecting lines (Y-CLs) may be in the first area (A), may bypass the X-touch electrodes (X26 and X27), and may connect Y-touch electrodes included in other Y-touch electrode lines other than the Y-touch electrode line (Y-TEL-6). In this case, the X-touch electrode connection line (X-CL-2) and a plurality of Y-touch electrode connection lines (Y-CLs) may not intersect each other. First to fourth capacitors (C1 to C4) may be between the X-touch electrodes (X26 and X27) and the Y-touch electrodes (Y26 and Y36) in the first area (A). In addition, fifth and sixth capacitors (C5 and C6) may be between the X-touch electrode connecting line (X-CL-2) and the Y-touch electrodes (Y26 and Y36) in the first area (A). In this case, unlike the embodiment shown in FIGS. 25 and 26, the width (Wx) of the X-touch electrode connecting line (X-CL-2) for connecting one X-touch electrode (X26) and another neighboring X-touch electrode (X27) may become larger in the first area (A). On the other hand, the respective Y-touch electrode (Y26 and Y36) of the Y-touch electrode line (Y-TEL-6) intersecting the X-touch electrode line (X-TEL-2) may become smaller. The size of the Y-touch electrode may correspond to the width of the X-touch electrode connecting line (X-CL-2). The relative width (Wd) of the dead zone, where the Y-touch electrode connecting lines (Y-CLs) may be provided, may be the same as that shown in FIG. 26. The X-touch electrode connecting line (X-CL-2) may have a shape in which a plurality of electrode pattern lines is a mesh.

As such, the sum of the capacitances of the first to fourth capacitors (C1 to C4) formed between the X-touch electrodes (X26 and X27) and the Y-touch electrodes (Y26 and Y36) may be less than that shown in the FIG. 25 example. On the other hand, when the width of the X-touch electrode connecting line (X-CL-2) is larger, the capacitances of the fifth capacitor (C5) and the sixth capacitor (C6) between the X-touch electrode connecting line (X-CL-2) and the Y-touch electrodes (Y26 and Y36) become larger than that shown in the FIG. 25 example. Therefore, the sum of the capacitances of the first to sixth capacitors (C1 to C6) produced in the first area (A) may be larger than that in the example of FIG. 25. In this embodiment, the plurality of Y-touch electrode lines (Y-CLs) may be arranged in a similar manner as shown in the example of FIG. 26 or FIG. 27. However, the arrangement is not limited thereto.

Figure 29:
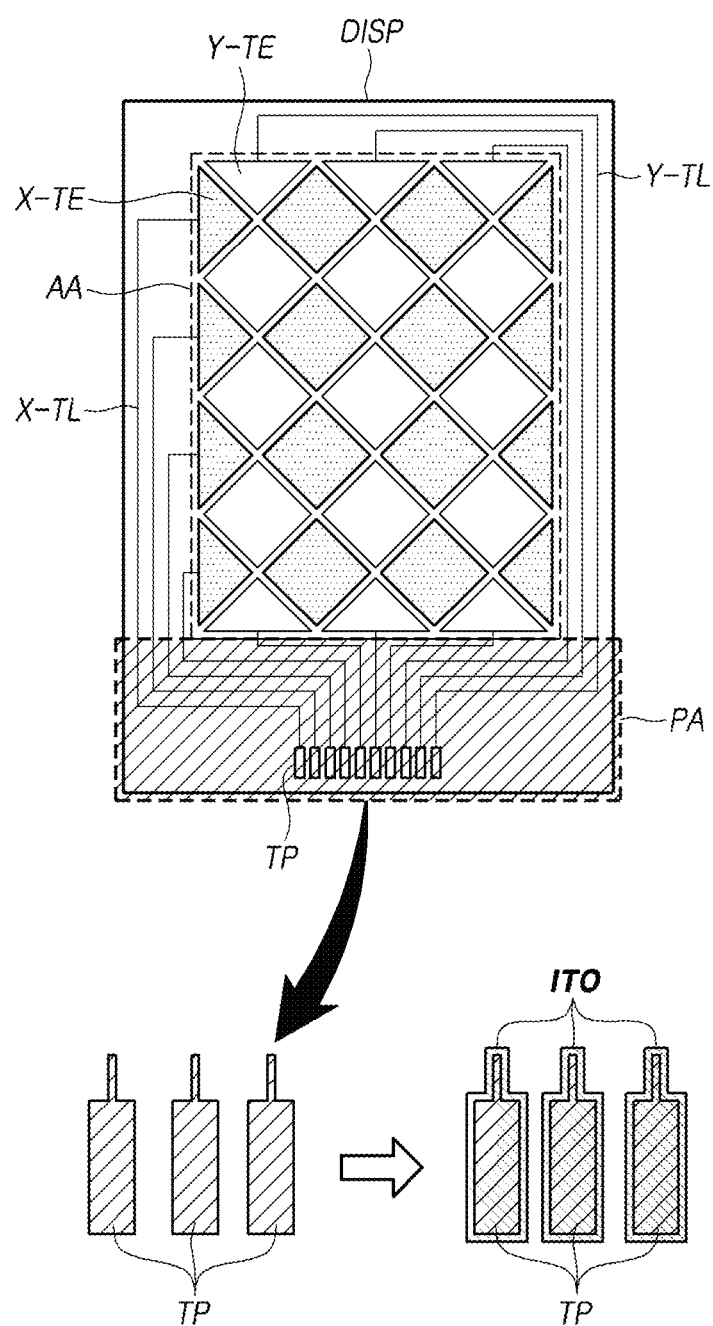
FIG. 29 illustrates examples of a transparent electrode arranged in a non-active area (NA) in a display panel according to an embodiment of the present disclosure.

FIG. 29 illustrates examples of a transparent electrode arranged in a non-active area (NA) in a display panel according to an embodiment of the present disclosure.

With reference to the example of FIG. 29, a transparent electrode (ITO) may be formed in a pad area (PA) on which a touch pad (TP) may be in the non-active area (NA) outside the active area (AA) of the display panel (DISP). The transparent electrodes (ITO) may be provided in the entire pad area (PA), or may be provided on the touch pads (TP) in the pad area (PA).

The m X-touch electrode lines (X-TEL) included in the single-layered touch sensor structure described above may be driving touch electrode lines to which a touch driving signal may be applied, and the n Y-touch electrode lines (Y-TEL) thereof may be sensing touch electrode lines on which a touch sensing signal may be detected. On the other hand, the n Y-touch electrode lines (Y-TEL) may be driving touch electrode lines to which a touch driving signal may be applied, and the m X-touch electrode lines (X-TEL) may be sensing touch electrode lines on which a touch sensing signal may be detected. Thus, it may be possible to sense a touch based on the mutual capacitance by driving one of the m X-touch electrode lines (X-TEL) and the n Y-touch electrode lines (Y-TEL) and by sensing the remainder.

The touch driving signal, applied to the m X-touch electrode line (X-TEL) or the n Y-touch electrode line (Y-TEL), may be a signal with a constant voltage level, or may be a signal with a variable voltage level. If the touch driving signal has a variable voltage level, the touch driving signal may have various waveforms, such as a square wave, a sine wave, a triangular wave (chopping wave), or the like. The touch driving signal may have a predetermined frequency. The frequency of the touch driving signal may be constant or variable. If the frequency of the touch driving signal is variable, the frequency of a touch driving signal supplied to the X-touch electrode lines or the Y-touch electrode lines, which correspond to the driving touch electrode lines, may be changed at random or according to a predetermined rule. If the frequency of the touch driving signal is changed randomly, the frequency may vary within a predetermined frequency range (e.g., 200 KHz or more). If the frequency of the touch driving signal is changed according to a predetermined rule, as described above, the frequency may vary in consideration of the time constant (e.g., resistive-capacitive (RC) delay) of signal transmission paths including the respective driving touch electrode lines.

According to the frequency varying technique of a touch driving signal, it may be possible to reduce or prevent deterioration of touch sensitivity due to the difference in the length between the signal transmission paths, and to perform touch driving while avoiding the noise in the touch display device. Hereinafter, a method of varying the frequency of the touch driving signal according to a predetermined rule in consideration of the time constant will be described. The length of the signal transmission path through which a touch driving signal (or touch sensing signal) is transmitted between the touch sensing circuit (TSC) and the corresponding touch electrode (TE) may correspond to a sum of the length of the X-touch electrode line (X-TEL) and the length of the X-touch routing line (X-TL)

One X-touch electrode line (X-TEL) may include plurality of X-touch electrodes (X-TE) and a plurality of X-touch electrode connecting lines (X-CL) for connecting the same. Thus, the length of one X-touch electrode line (X-TEL) may correspond to a value obtained by adding all the lengths of the plurality of X-touch electrodes (X-TE) and the plurality of X-touch electrode connecting lines (X-CL) for connecting the same.

Alternatively, the length of the signal transmission path through which a touch driving signal (or touch sensing signal) may be transmitted between the touch sensing circuit (TSC) and the corresponding touch electrode (TE) may correspond to a sum of the length of the Y-touch electrode line (Y-TEL) and the length of the Y-touch routing line (Y-TL). One Y-touch electrode line (Y-TEL) may include a plurality of Y-touch electrodes (Y-TE) and a plurality of Y-touch electrode connecting lines (Y-CL) for connecting the same. Thus, the length of one Y-touch electrode line (Y-TEL) may correspond to a value obtained by adding all the lengths of the plurality of Y-touch electrodes (Y-TE) and the plurality of Y-touch electrode connecting lines (Y-CL) for connecting the same.

The lengths of the signal transmission paths corresponding to the m X-touch electrode lines (X-TEL) may be different from each other, depending on their positions. Accordingly, the signal transmission paths corresponding to the m X-touch electrode lines (X-TEL) may have different time constants from each other. The time constant may be, for example, an RC delay. The difference in the time constant between the signal transmission paths may cause a difference in the touch sensitivity between the signal transmission paths, thereby lowering the touch sensing performance. Likewise, the touch sensing performance may be degraded due to the difference in the length between the signal transmission paths corresponding to the n Y-touch electrode lines (Y-TEL).

Therefore, the frequencies of touch driving signals applied to one or more of the m X-touch electrode lines (X-TEL) may be different from each other, depending on the length of the signal transmission path for the touch driving signal. Alternatively, the frequencies of touch driving signals applied to one or more of the n Y-touch electrode lines (Y-TEL) may be different from each other.

Accordingly, it may be possible to improve the touch sensing performance by compensating for the touch sensitivity variation due to the difference in the length between the signal transmission paths through frequency variation. Now, a multi-frequency driving method in which the frequency of a touch driving signal varies will be described.

Figure 30:
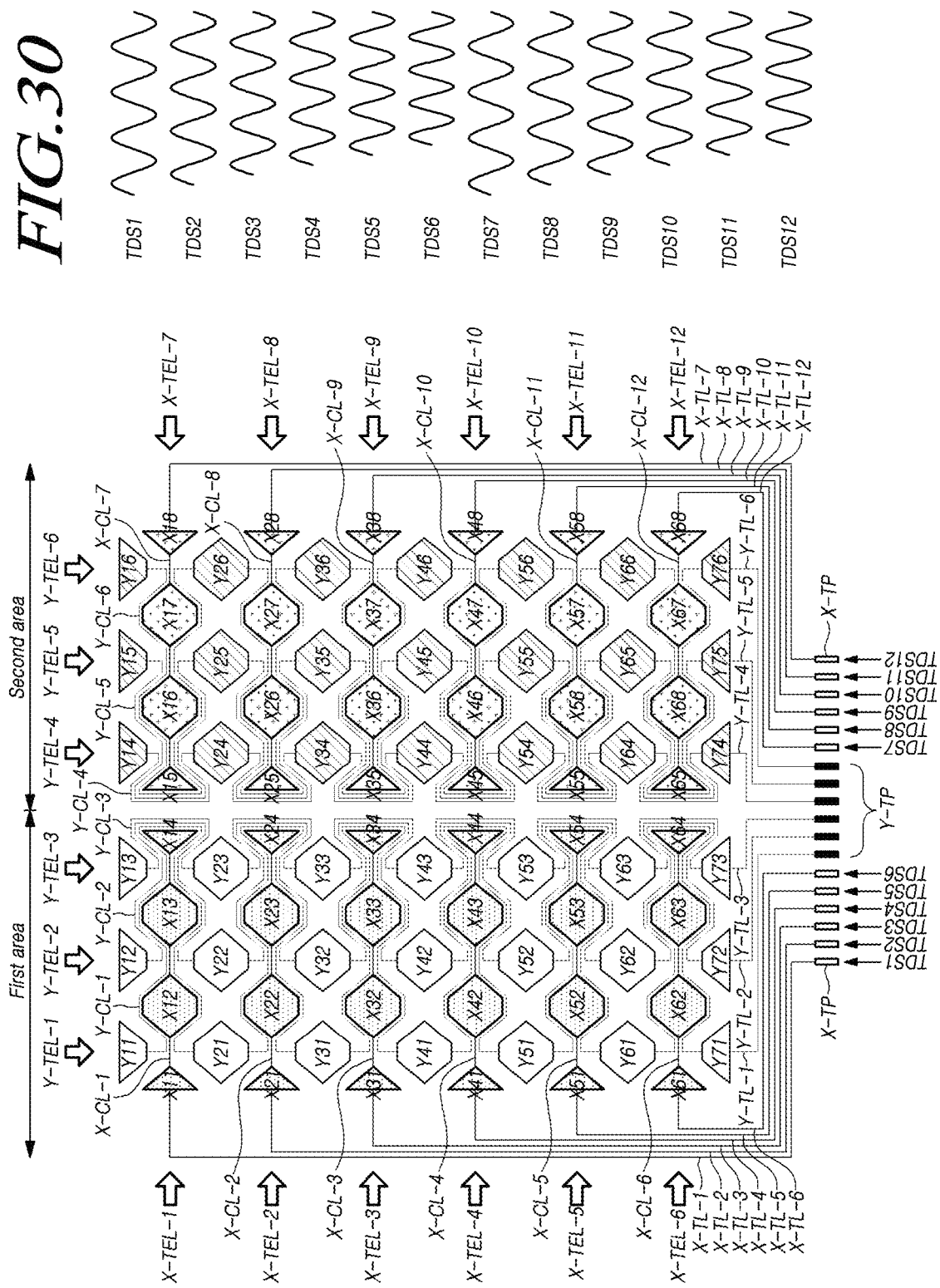
FIGS. 30 and 31 illustrate a multi-frequency driving method of a touch display device according to an embodiment of the present disclosure.
Figure 31:
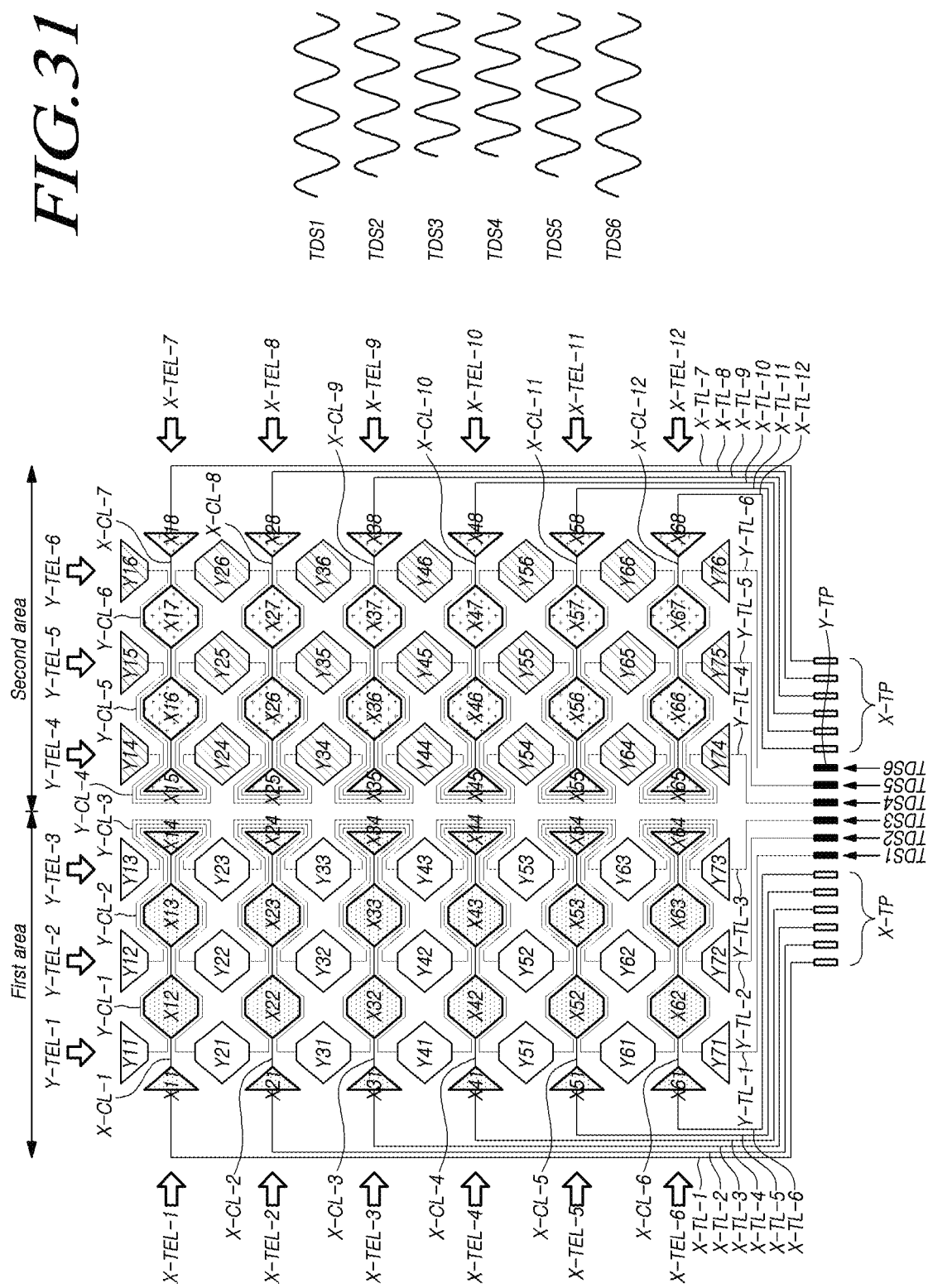

FIGS. 30 and 31 illustrate a multi-frequency driving method of a touch display device according to an embodiment of the present disclosure.

FIG. 30 is a view for explaining a multi-frequency driving method for an example in which twelve X-touch electrode lines (X-TEL-1 to X-TEL-12) are driving touch electrode lines to which touch driving signals (TDS1 to TDS12) may be applied, and six Y-touch electrode lines (Y-TEL-1 to Y-TEL-6) are sensing touch electrode lines where touch sensing signals may be detected. With reference to the example of FIG. 30, twelve X-touch electrode lines (X-TEL-1 to X-TEL-12) may include six first X-touch electrode lines (X-TEL-1 to X-TEL-6) in the first area, and six second X-touch electrode lines (X-TEL-7 to X-TEL-12) in the second area.

The six first X-touch electrode lines (X-TEL-1 to X-TEL-6) in the first touch area and the six second X-touch electrode lines (X-TEL-7 to X-TEL-12) in the second area may have the same or similar signal transmission lengths. The six first X-touch electrode lines (X-TEL-1 to X-TEL-6) in the first area may be connected to six first X-touch routing lines (X-TL-1 to X-TL-6) to correspond thereto. The six second X-touch electrode lines (X-TEL-7 to X-TEL-12) in the second area may be connected to six second X-touch routing lines (X-TL-7 to X-TL-12) to correspond thereto.

The six first X-touch routing lines (X-TL-1 to X-TL-6) may have different lengths from each other. The six second X-touch routing lines (X-TL-7 to X-TL-12) may also have different lengths from each other.

Thus, the six first X-touch routing lines (X-TL-1 to X-TL-6) may have different time constants, such as an RC delay, from each other. The six second X-touch routing lines (X-TL-7 to X-TL-12) may also have different time constants, such as an RC delay, from each other.

With regard to the first touch area, among the six first X-touch routing lines (X-TL-1 to X-TL-6), the first X-touch routing line (X-TL-1) having the maximum length may have the largest time constant, and the first X-touch routing line (X-TL-6) having the minimum length may have the smallest time constant. Accordingly, the touch sensing circuit (TSC) may supply a touch driving signals (TDS1) having the lowest frequency to the first X-touch routing line (X-TL-1) having the largest time constant, and may supply a touch driving signals (TDS6) having the highest frequency to the first X-touch routing line (X-TL-6) having the smallest time constant, among the six first X-touch electrode lines (X-TEL-1 to X-TEL-6).

With regard to the second touch area, among the six second X-touch routing lines (X-TL-7 to X-TL-12), the second X-touch routing line (X-TL-7) having the maximum length may have the largest time constant, and the second X-touch routing line (X-TL-12) having the minimum length may have the smallest time constant. Accordingly, the touch sensing circuit (TSC) may supply a touch driving signals (TDS7) having the lowest frequency to the second X-touch routing line (X-TL-7) having the largest time constant, and may supply a touch driving signals (TDS12) having the highest frequency to the second X-touch routing line (X-TL-12) having the smallest time constant, among the six second X-touch routing lines (X-TL-7 to X-TL-12).

For example, when the X-touch electrode line has a longer X-touch electrode connecting line or has a longer X-touch routing line for a connection with the touch sensing circuit (TSC) in the twelve X-touch electrode lines (X-TEL-1 to X-TEL-12), the frequency of the touch driving signal may be lowered. The length of the signal transmission path may correspond to a value obtained by adding all the lengths of the X-touch electrodes, the lengths of the X-touch electrode connecting lines, and the lengths of the X-touch routing lines.

FIG. 31 is a view for explaining a multi-frequency driving method for an example in which six Y-touch electrode lines (Y-TEL-1 to Y-TEL-6) are driving touch electrode lines to which touch driving signals (TDS1 to TDS6) may be applied, and twelve X-touch electrode lines (X-TEL-1 to X-TEL-12) are sensing touch electrode lines where touch sensing signals may be detected. Each of the six Y-touch electrode lines (Y-TEL-1 to Y-TEL-6) may include seven Y-touch electrodes and Y-touch electrode connecting lines for connecting the same.

The Y-touch electrode connecting line (Y-CL-1) for connecting seven Y-touch electrodes (Y11, Y21, Y31, Y41, Y51, Y61, and Y71) included in the outermost Y-touch electrode line (Y-TEL-1), among the Y-touch electrode connecting lines (Y-CL-1, Y-CL-2, and Y-CL-3) included in three Y-touch electrode lines (Y-TEL-1, Y-TEL-2, and Y-TEL-3) in the first touch area, may be the longest. In addition, the Y-touch electrode connecting line (Y-CL-3), for connecting seven Y-touch electrodes (Y13, Y23, Y33, Y43, Y53, Y63, and Y73) included in the Y-touch electrode line (Y-TEL-3) closest to the second area, may be the shortest. Therefore, the three Y-touch electrode lines (Y-TEL-1, Y-TEL-2, and Y-TEL-3) in the first touch area may have different time constants, such as an RC delay, from each other, depending on the difference in the length between the Y-touch electrode connecting lines (Y-CL-1, Y-CL-2, and Y-CL-3). Similarly, the three Y-touch electrode lines (Y-TEL-4, Y-TEL-5, and Y-TEL-6) arranged in the second area may have different time constants, such as an RC delay.

Among the three Y-touch electrode lines (Y-TEL-1, Y-TEL-2, and Y-TEL-3) in the first touch area, the Y-touch electrode line (Y-TEL-1), including the longest Y-touch electrode connecting line (Y-CL-1), may have the largest time constant, and the Y-touch electrode line (Y-TEL-3), including the shortest Y-touch electrode connecting line (Y-CL-3), may have the smallest time constant. Accordingly, the touch sensing circuit (TSC) may supply a touch driving signals (TDS1) having the lowest frequency to the Y-touch electrode line (Y-TEL-1) having the largest time constant, and may supply a touch driving signals (TDS3) having the highest frequency to the Y-touch electrode line (Y-TEL-3) having the smallest time constant, among the three Y-touch electrode lines (Y-TEL-1, Y-TEL-2, and Y-TEL-3) in the first area.

Among the three Y-touch electrode lines (Y-TEL-4, Y-TEL-5, and Y-TEL-6) in the second touch area, the Y-touch electrode line (Y-TEL-6), including the longest Y-touch electrode connecting line (Y-CL-6), may have the largest time constant, and the Y-touch electrode line (Y-TEL-4), including the shortest Y-touch electrode connecting line (Y-CL-4), may have the smallest time constant. Accordingly, the touch sensing circuit (TSC) may supply a touch driving signals (TDS6) having the lowest frequency to the Y-touch electrode line (Y-TEL-6) having the largest time constant, and may supply a touch driving signals (TDS4) having the highest frequency to the Y-touch electrode line (Y-TEL-4) having the smallest time constant, among the three Y-touch electrode lines (Y-TEL-4, Y-TEL-5, and Y-TEL-6) in the second area.

For example, when the Y-touch electrode line has a longer Y-touch electrode connecting line or has a longer Y-touch routing line for a connection with the touch sensing circuit (TSC) in the six Y-touch electrode lines (Y-TEL-1 to Y-TEL-6), the frequency of the touch driving signal may be lowered. The length of the signal transmission path may correspond to a value obtained by adding all the lengths of the Y-touch electrodes, the lengths of the Y-touch electrode connecting lines, and the lengths of the Y-touch routing lines.

According to embodiments of the present disclosure described above, it may be possible to provide a touch display device having a touch sensor structure that enables a simple manufacturing process, a high manufacturing yield, and a low manufacturing cost, and a touch sensing method thereof. According to embodiments of the present disclosure, it may be possible to provide a touch display device having a single-layered touch sensor structure and a touch sensing method thereof.

According to embodiments of the present disclosure, it may be possible to provide a touch display device having a touch sensor structure capable of reducing the number of mask processes and a touch sensing method thereof. According to embodiments of the present disclosure, it may be possible to provide a touch display device having a touch sensor structure capable of reducing the number of touch pads and a touch sensing method thereof. According to embodiments of the present disclosure, it may be possible to provide a touch display device capable of preventing deterioration of touch sensitivity, even if there is the difference in the length between the signal transmission paths in a touch sensor structure and a touch sensing method thereof.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A touch display device, comprising:
    a display panel comprising:
        a plurality of subpixels;
        a plurality of touch electrodes; and
        a touch sensing circuit configured to:
            supply a touch driving signal to the display panel; and
            detect a touch sensing signal to sense a touch,
    wherein the plurality of touch electrodes comprises:
        a plurality of X-touch electrode lines, each comprising a plurality of X-touch electrodes, the plurality of X-touch electrode connecting lines being configured to connect adjacent X-touch electrodes to each other in a same layer, among the plurality of X-touch electrodes, and
        a plurality of Y-touch electrode lines intersecting the plurality of X-touch electrode lines, each Y-touch electrode line comprising a plurality of Y-touch electrodes, the plurality of Y-touch electrode connecting lines being configured to connect adjacent Y-touch electrodes to each other in the same layer,
    wherein at least two Y-touch electrode connecting lines, among the plurality of Y-touch electrode connecting lines, are between two neighboring subpixels of the plurality of subpixels,
    wherein the X-touch electrode connecting line and the Y-touch electrode connecting line are in the same layer, and
    wherein the at least two Y-touch electrode connecting lines are disposed spaced apart from each other in the same layer.

2. The touch display device of claim 1, wherein:
    the plurality of subpixels comprises a plurality of light-emitting surfaces surrounded by a bank; and
    the at least two Y-touch electrode connecting lines are on a bank between:
        one light-emitting surface of the plurality of light-emitting surfaces; and
        another light-emitting surface adjacent to the one light-emitting surface.

3. The touch display device of claim 1, wherein one Y-touch electrode connecting line configured to electrically connect adjacent Y-touch electrodes, among a plurality of Y-touch electrodes included in a Y-touch electrode line at an outermost position on a first side, among the plurality of Y-touch electrode lines, surrounds the whole or a part of one X-touch electrode line.

4. The touch display device of claim 3, wherein one Y-touch electrode connecting line configured to electrically connect adjacent Y-touch electrodes, among a plurality of Y-touch electrodes included in a Y-touch electrode line at an outermost position on a second side, among the plurality of Y-touch electrode lines, surrounds the whole or a part of one X-touch electrode line.

5. The touch display device of claim 1, wherein:
    the touch electrode comprises a plurality of touch electrode pattern lines; and
    the plurality of touch electrode pattern lines are arranged as a mesh, such that an interval between the Y-touch electrode connecting lines is less than an interval between the touch electrode pattern lines.

6. The touch display device of claim 1, wherein:
    a blank area, in which no Y-touch electrode connecting line is disposed, is provided around a plurality of X-touch electrodes included in a first X-touch electrode line among the plurality of X-touch electrode lines; and
    one or more additional patterns are in the blank area.

7. The touch display device of claim 6, wherein:
    numbers of Y-touch electrode connecting lines, respectively arranged around each of a plurality of first X-touch electrodes included in the first X-touch electrode line, are different from each other; and
    numbers of additional patterns, respectively arranged in the blank area around the plurality of first X-touch electrodes included in the first X-touch electrode line, are different from each other, depending on the different numbers of Y-touch electrode connecting lines.

8. The touch display device of claim 6, wherein the one or more additional patterns are in a voltage state corresponding to the touch driving signal or the touch sensing signal, in a voltage state in which a ground voltage or a specific voltage is applied, or in a floating voltage state.

9. The touch display device of claim 1, wherein a width of the X-touch electrode connecting line is greater than a width of the Y-touch electrode connecting line.

10. The touch display device of claim 1, wherein:
    the display panel further comprises an encapsulation layer on a light-emitting device in each of the plurality of subpixels; and
    the plurality of X-touch electrode lines and the plurality of Y-touch electrode lines are in a same layer over the encapsulation layer.

11. A touch display device, comprising:
    a display panel comprising:
        a plurality of subpixels;
        a plurality of touch electrodes; and
        a touch sensing circuit configured to:
            supply a touch driving signal to the display panel; and
            detect a touch sensing signal to sense a touch,
    wherein the plurality of touch electrodes comprises:
        a plurality of X-touch electrode lines, each comprising a plurality of X-touch electrodes, the plurality of X-touch electrode lines comprising a plurality of X-touch electrode connecting lines configured to connect adjacent X-touch electrodes to each other in a same layer, among the plurality of X-touch electrodes, and
        a plurality of Y-touch electrode lines intersecting the plurality of X-touch electrode lines, each comprising a plurality of Y-touch electrodes, the plurality of Y-touch electrode lines comprising a plurality of Y-touch electrode connecting lines configured to connect adjacent Y-touch electrodes to each other in the same layer, wherein a width of one X-touch electrode connecting line, among the plurality of X-touch electrode connecting lines in one of the plurality of X-touch electrode lines, is greater than a width of another X-touch electrode connecting line, wherein the X-touch electrode connecting line and the Y-touch electrode connecting line are in the same layer, and wherein the at least two Y-touch electrode connecting lines are disposed spaced apart from each other in the same layer.

12. The touch display device of claim 11, wherein a size of the Y-touch electrode corresponds to a width of the X-touch electrode connecting line.

13. The touch display device of claim 11, wherein:
the plurality of subpixels comprises a plurality of light-emitting surfaces surrounded by a bank; and
the Y-touch electrode connecting line is on the bank.

14. The touch display device of claim 11, wherein one Y-touch electrode connecting line configured to electrically connect adjacent Y-touch electrodes, among a plurality of Y-touch electrodes in a Y-touch electrode line at an outermost position on a first side, among the plurality of Y-touch electrode lines, surrounds the whole or a part of one X-touch electrode line.

15. The touch display device of claim 14, wherein one Y-touch electrode connecting line configured to electrically connect adjacent Y-touch electrodes, among a plurality of Y-touch electrodes in a Y-touch electrode line at an outermost position on a second side, among the plurality of Y-touch electrode lines, surrounds the whole or a part of one X-touch electrode line.

16. The touch display device of claim 11, wherein:
a blank area, in which no Y-touch electrode connecting line is disposed, is provided around a plurality of X-touch electrodes included in a first X-touch electrode line among the plurality of X-touch electrode lines; and
one or more additional patterns are in the blank area.

17. The touch display device of claim 11, wherein:
the touch electrode comprises a plurality of touch electrode pattern lines; and
the plurality of touch electrode pattern lines is arranged as a mesh, such that an interval between the Y-touch electrode connecting lines is less than an interval between the touch electrode pattern lines.

\* \* \* \* \*